US012674889B2

(12) United States Patent
Jo

(10) Patent No.: US 12,674,889 B2
(45) Date of Patent: Jul. 7, 2026

(54) RANGING DEVICE AND LIGHT RECEPTION METHOD THEREOF

(71) Applicant: Sony Semiconductor Solutions Corporation, Kanagawa (JP)

(72) Inventor: Kensei Jo, Tokyo (JP)

(73) Assignee: Sony Semiconductor Solutions Corporation, Kanagawa (JP)

( * ) Notice: Subject to any disclaimer, the term of this patent is extended or adjusted under 35 U.S.C. 154(b) by 973 days.

(21) Appl. No.: 17/639,523

(22) PCT Filed: Oct. 5, 2020

(86) PCT No.: PCT/JP2020/037691
§ 371 (c)(1),
(2) Date: Mar. 1, 2022

(87) PCT Pub. No.: WO2021/075287
PCT Pub. Date: Apr. 22, 2021

(65) Prior Publication Data
US 2022/0268930 A1      Aug. 25, 2022

(30) Foreign Application Priority Data
Oct. 15, 2019    (JP) ................................. 2019-188699

(51) Int. Cl.
*G01S 17/10* (2020.01)
*G01S 7/00* (2006.01)
(Continued)

(52) U.S. Cl.
CPC .............. *G01S 17/10* (2013.01); *G01S 7/003* (2013.01); *G01S 7/4815* (2013.01); *G01S 7/4865* (2013.01)

(58) Field of Classification Search
CPC ........ G01S 17/10; G01S 7/003; G01S 7/4815; G01S 7/4865; G01S 17/36; G01S 17/89;
(Continued)

(56) References Cited

U.S. PATENT DOCUMENTS

| | | | |
|---|---|---|---|
| 8,988,662 B1 | 3/2015 | Haskin | |
| 2003/0198271 A1 | 10/2003 | Matveev | |

(Continued)

FOREIGN PATENT DOCUMENTS

| | | | |
|---|---|---|---|
| CN | 105652282 A | 6/2016 | |
| CN | 107329145 A | 11/2017 | |

(Continued)

OTHER PUBLICATIONS

International Search Report (PCT/ISA/210), International Application No. PCT/JP2020/037691, dated Dec. 4, 2020.

*Primary Examiner* — Isam A Alsomiri
*Assistant Examiner* — Joseph C Fritchman
(74) *Attorney, Agent, or Firm* — Michael Best & Friedrich LLP

(57) ABSTRACT

Ranging devices and light reception methods wherein the modulation frequencies of a light source and a ToF sensor are synchronized are disclosed. In one example, a ranging device includes a reception section that generates, by executing a synchronization process on a transmission signal transmitted from a separate device through wireless communication, a signal synchronized with a synchronization clock signal of the separate device, a reference clock generation section that generates, on the basis of the synchronization clock signal, a reference clock signal to be used as a reference for light emission from the light source, and a ToF sensor that receives, on the basis of the reference clock signal, reflection light resulting from irradiation light applied from the light source and reflected by an object.

18 Claims, 36 Drawing Sheets

(51) Int. Cl.
    *G01S 7/48*         (2006.01)
    *G01S 7/481*      (2006.01)
    *G01S 7/4865*     (2020.01)

(58) Field of Classification Search
    CPC .......... G01S 7/481; G01S 7/483; G01S 17/08;
                                    G01S 17/93; G01C 3/06
    See application file for complete search history.

(56)              References Cited

U.S. PATENT DOCUMENTS

| | | |
|---|---|---|
| 2005/0180149 A1 | 8/2005 | Albou |
| 2009/0078817 A1 | 3/2009 | Williams |
| 2011/0037849 A1 | 2/2011 | Niclass |
| 2015/0043309 A1* | 2/2015 | Calvarese ................. G01S 1/80 |
| | | 367/117 |
| 2016/0352388 A1 | 12/2016 | Lane |
| 2017/0082737 A1* | 3/2017 | Slobodyanyuk ........ G01S 7/497 |
| 2018/0003822 A1 | 1/2018 | Li |
| 2018/0224548 A1 | 8/2018 | Hariyama |
| 2019/0129014 A1 | 5/2019 | Merritt |
| 2019/0355145 A1* | 11/2019 | Bruner .................... H04W 4/38 |
| 2020/0109698 A1* | 4/2020 | Pedersen ................ G05D 1/104 |
| 2023/0121106 A1* | 4/2023 | Simon ................... G01S 17/931 |
| | | 356/5.01 |

FOREIGN PATENT DOCUMENTS

| | | |
|---|---|---|
| CN | 107505622 A | 12/2017 |
| CN | 108027416 A | 5/2018 |
| CN | 110192120 A | 8/2019 |
| CN | 110291414 A | 9/2019 |
| DE | 102017105142 A1 | 9/2018 |
| DE | 102017222043 A1 | 6/2019 |
| JP | H09096528 A | 4/1997 |
| JP | H10-213432 A | 8/1998 |
| JP | 2004309367 A | 11/2004 |
| JP | 2008187340 A | 8/2008 |
| JP | 2014-153160 A | 8/2014 |
| JP | 2017173246 A | 9/2017 |
| JP | 2018-031607 A | 3/2018 |
| JP | 2018059879 A | 4/2018 |
| JP | 2019-505818 A | 2/2019 |
| JP | 2019095216 A | 6/2019 |

* cited by examiner

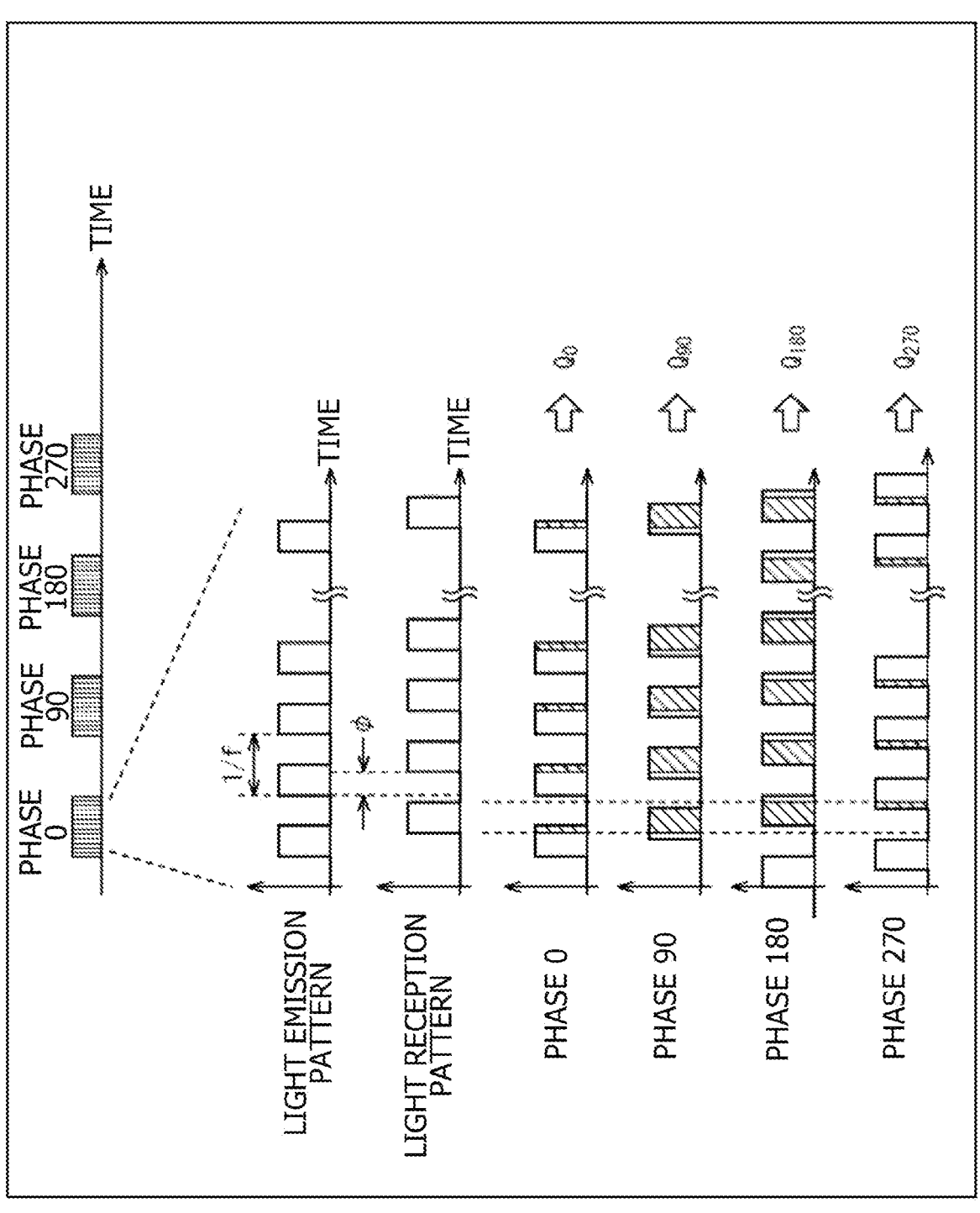
F I G . 3

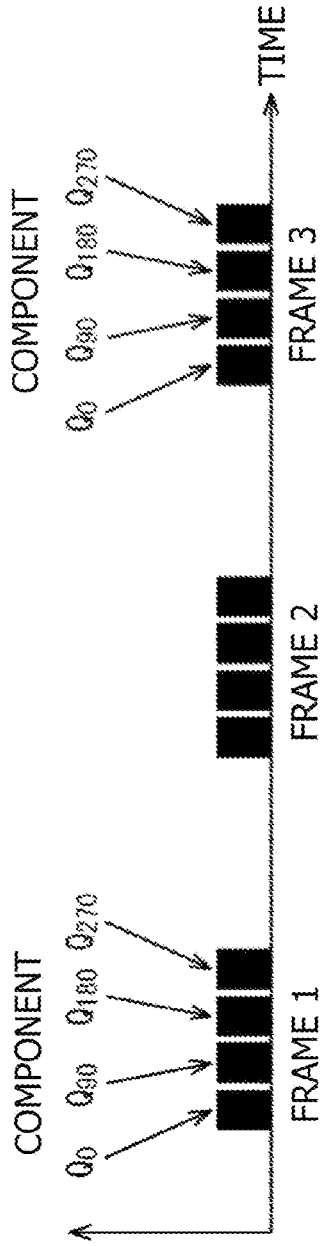
F I G . 4

FIG. 10

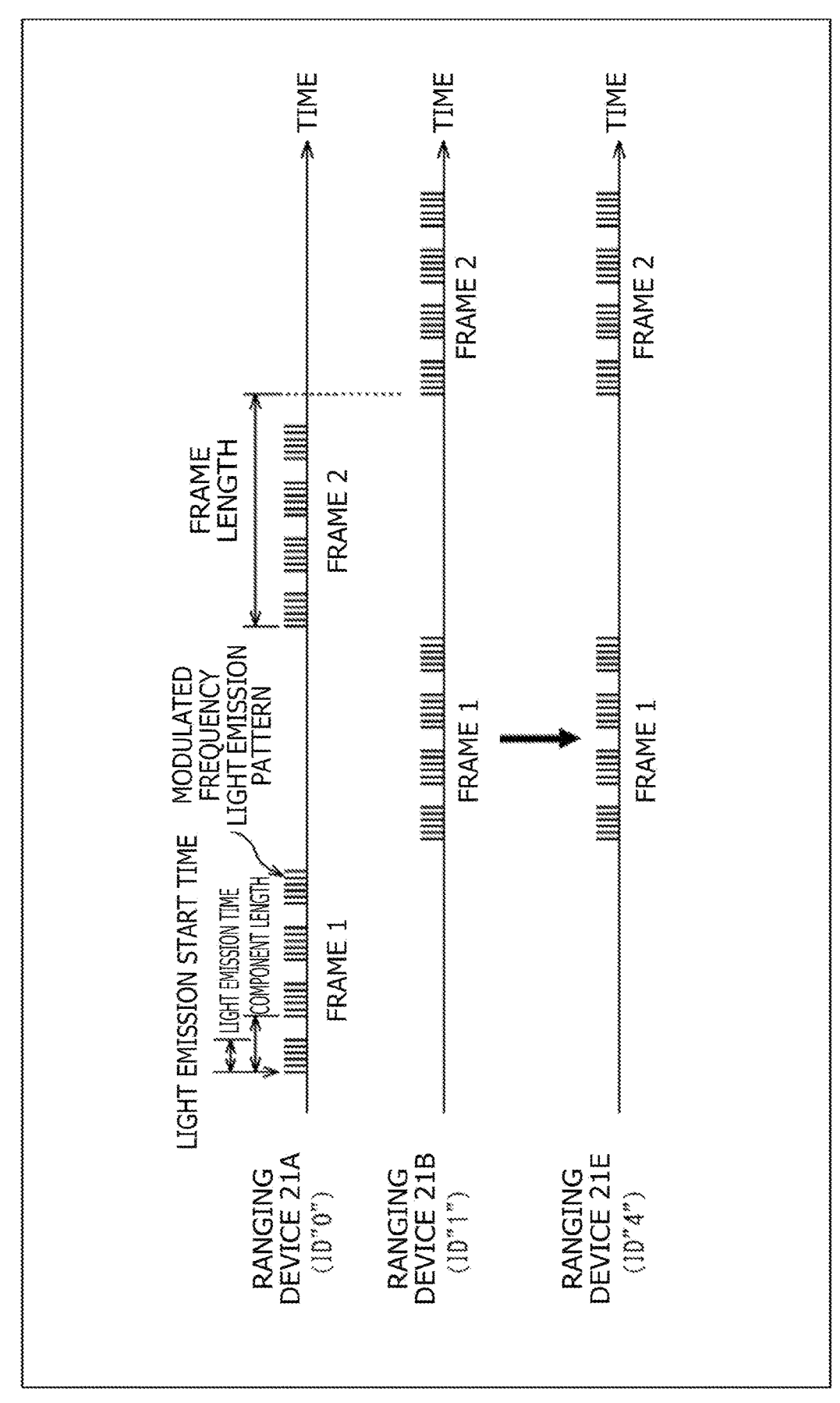
F I G . 1 1

F I G . 1 2
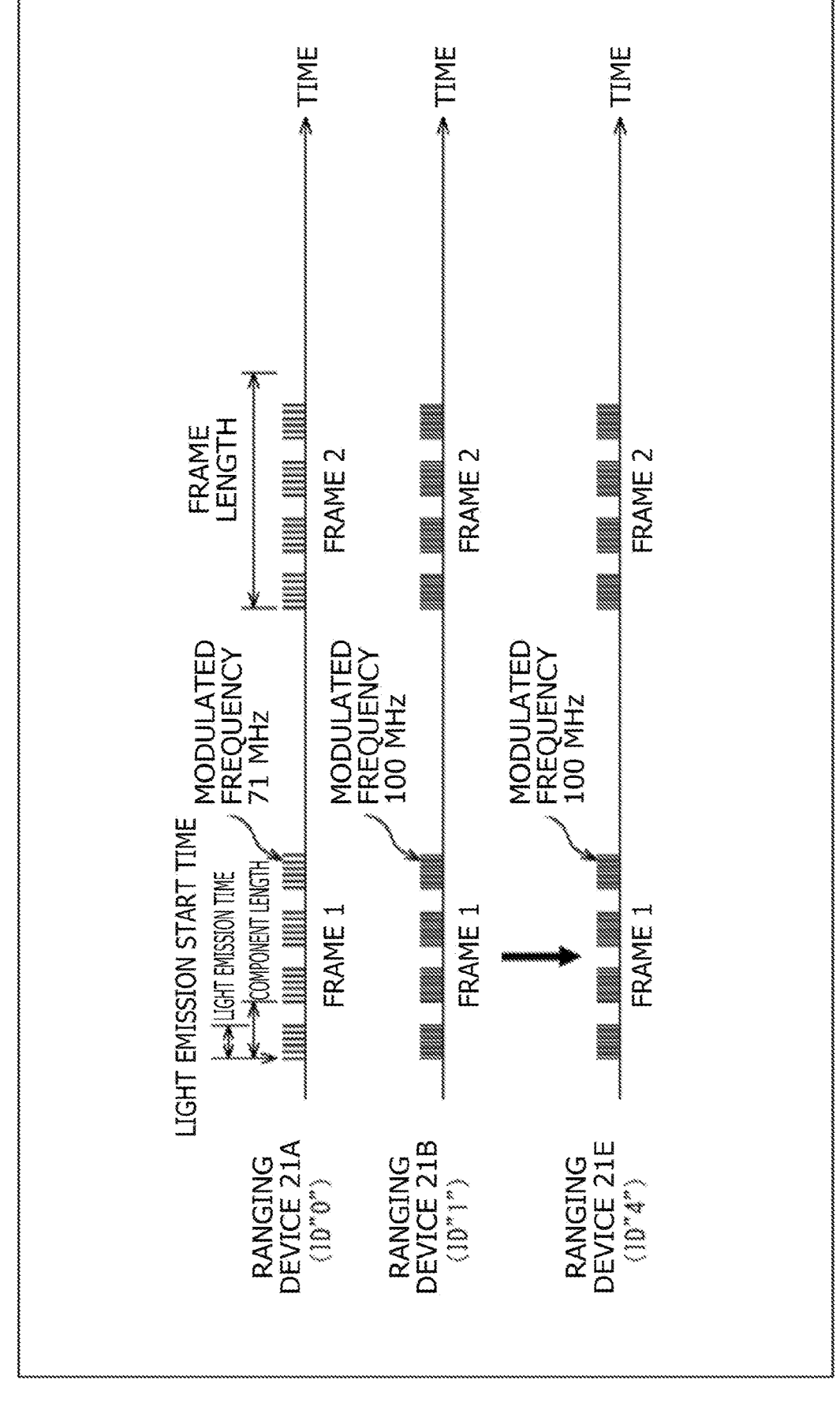

F I G . 1 3
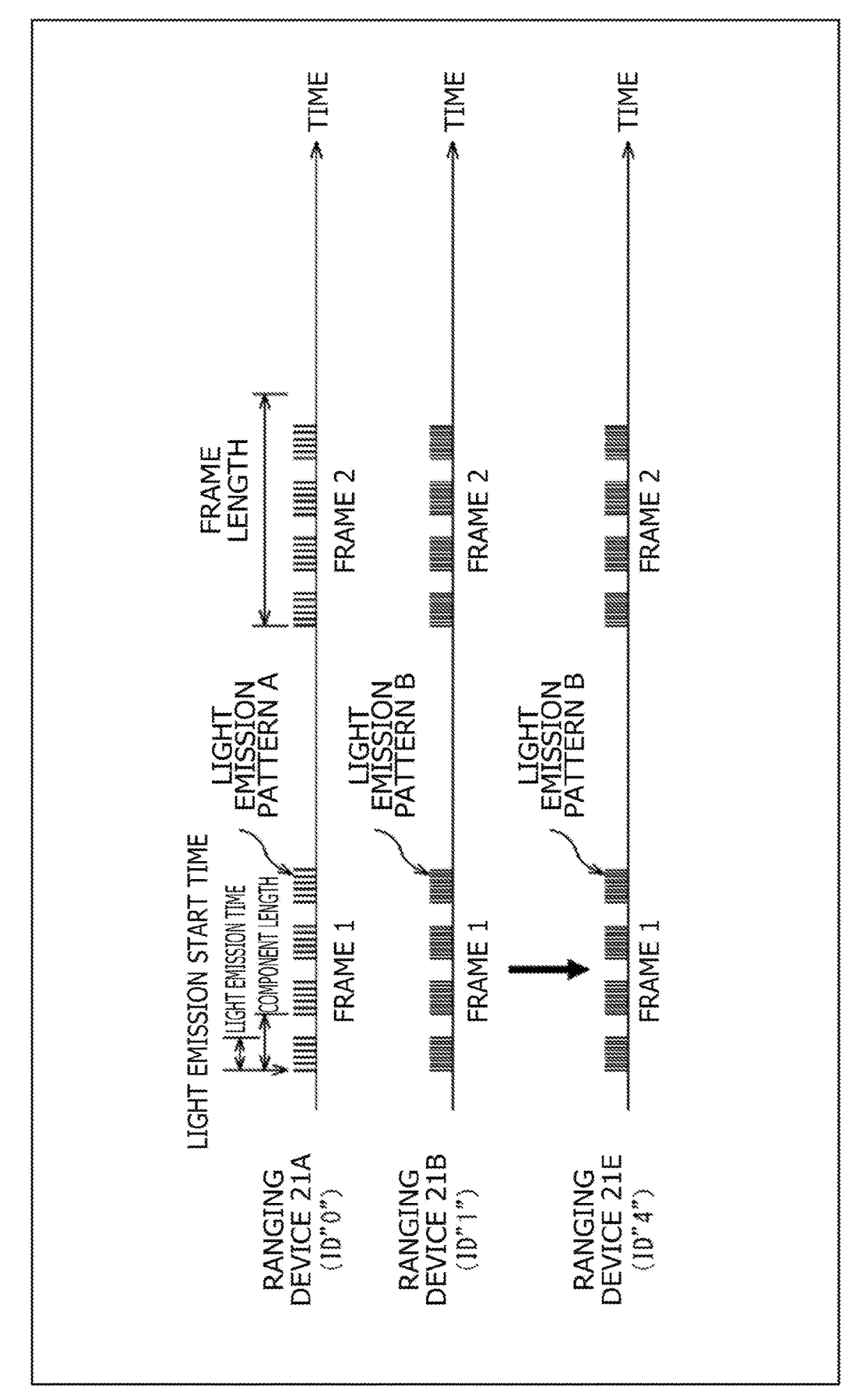

F I G . 1 4
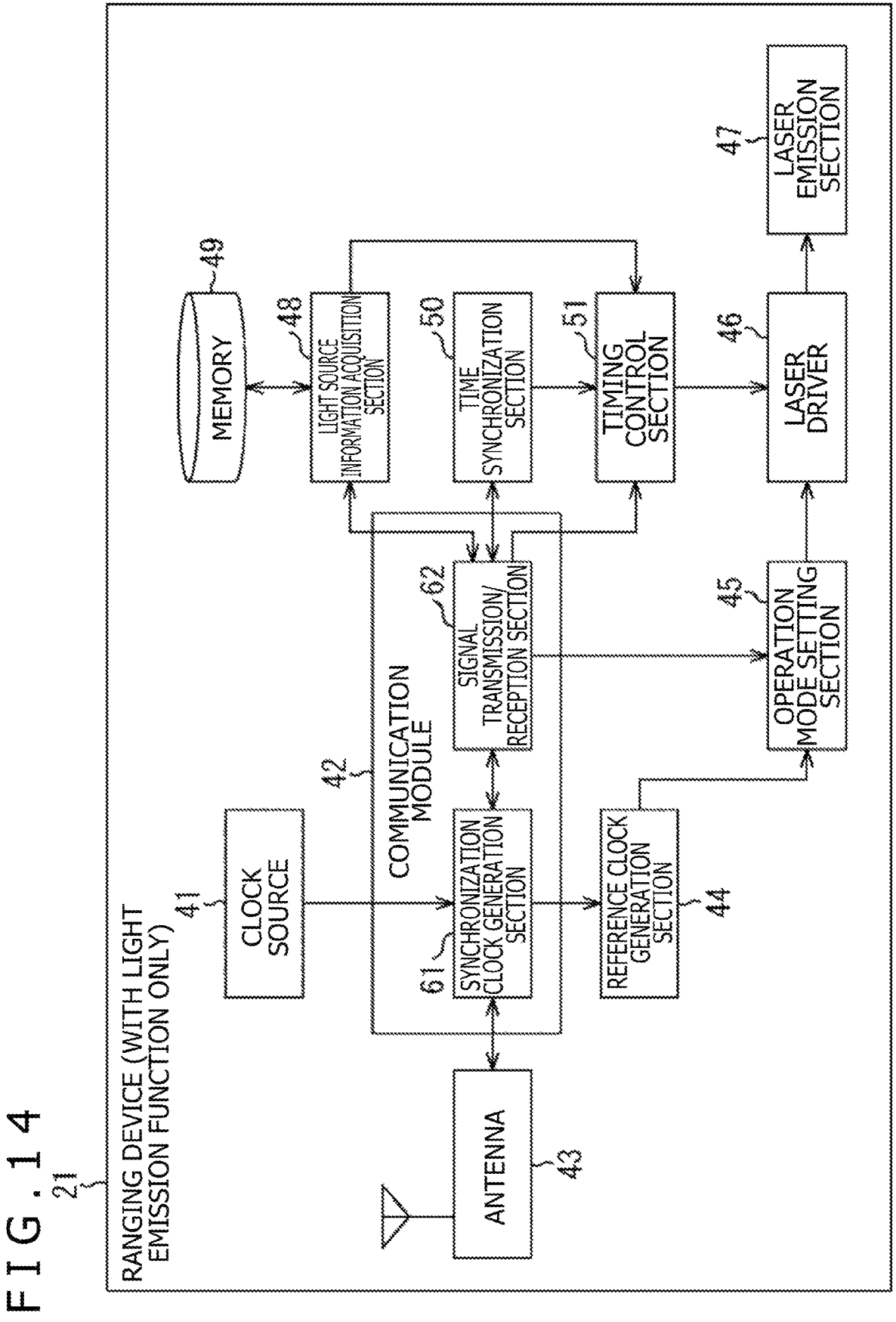

F I G . 1 5
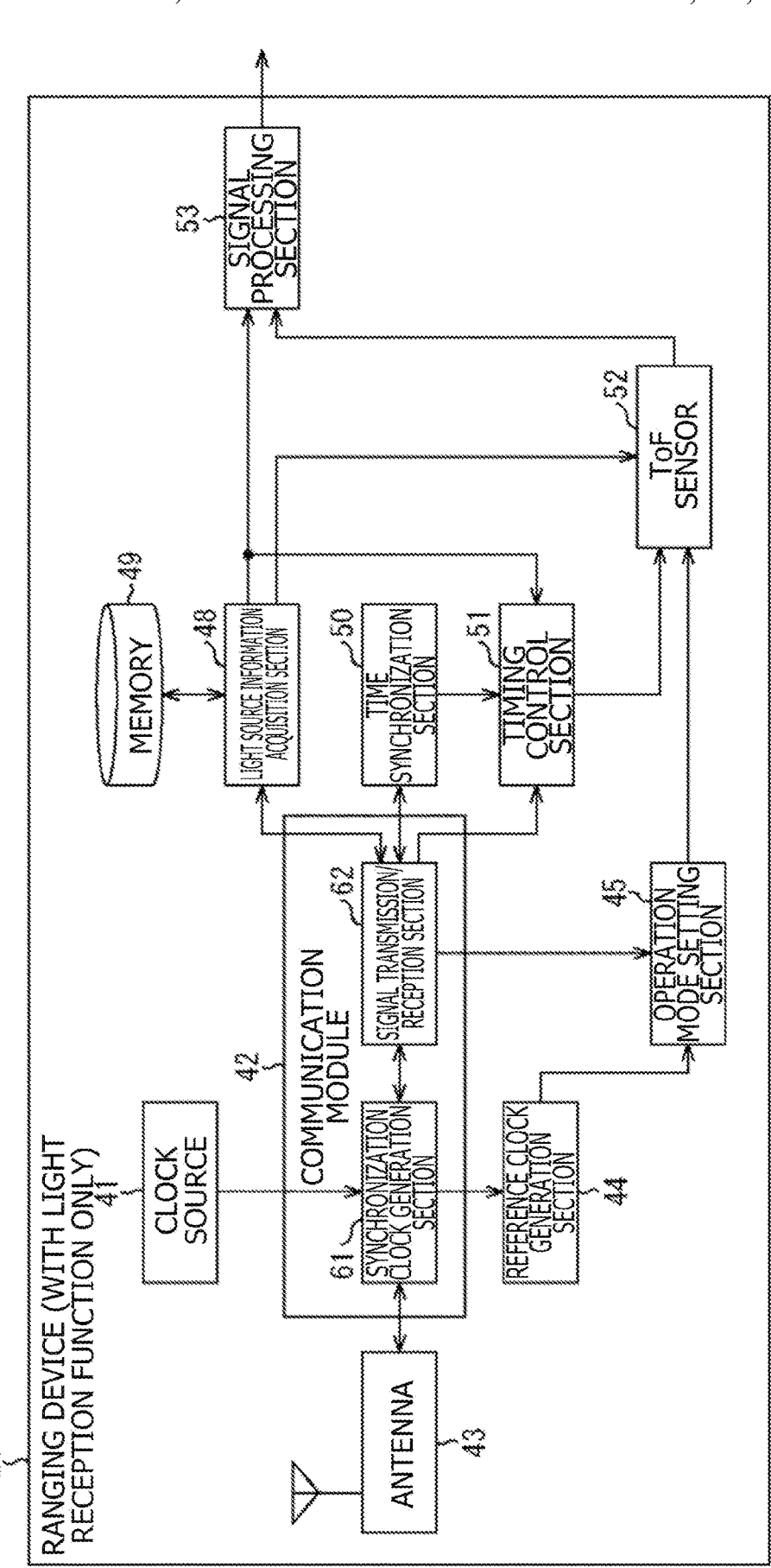

F I G . 1 6
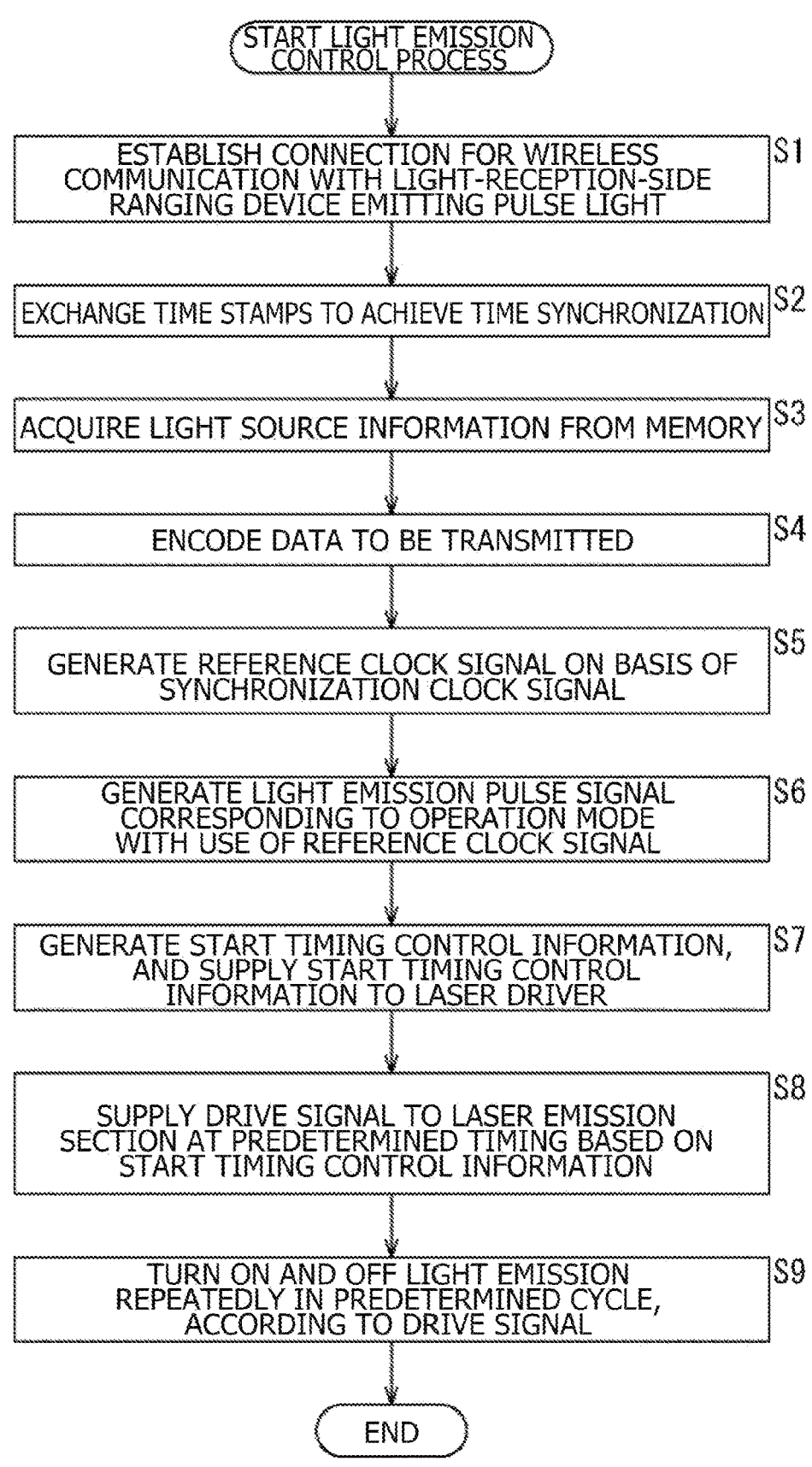

F I G . 1 8
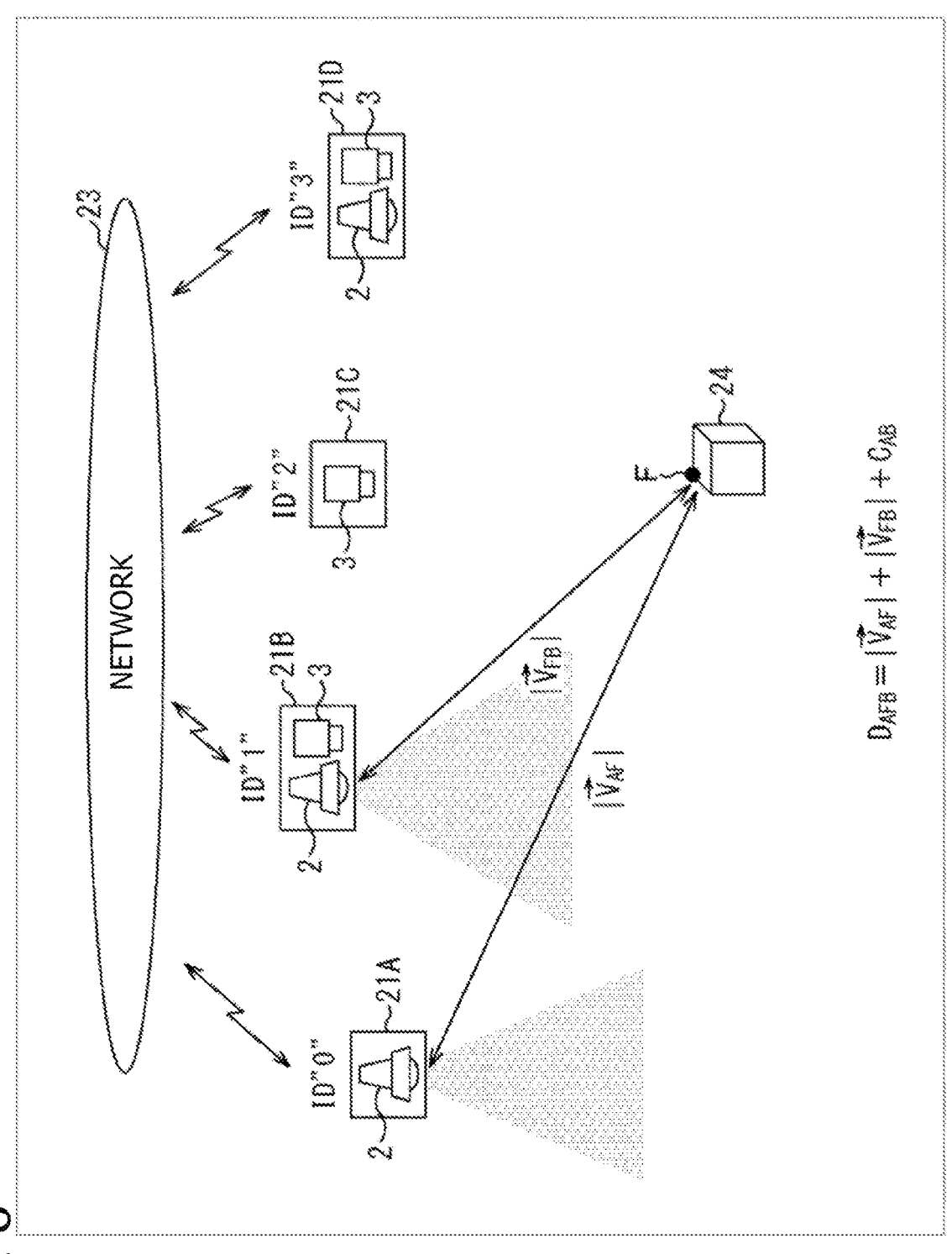

FIG. 19

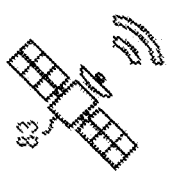

RANGING DEVICE (LIGHT EMISSION SIDE) 21'-1

- GNSS RECEPTION SECTION (81)
- TIME INFORMATION SETTING SECTION (82)
- REFERENCE CLOCK GENERATION SECTION (44)
- MEMORY (49)
- LIGHT SOURCE INFORMATION ACQUISITION SECTION (48)
- OPERATION MODE SETTING SECTION (45)
- TIMING CONTROL SECTION (51)
- SIGNAL PROCESSING SECTION (53)
- ToF SENSOR (52)
- LASER DRIVER (46)
- LASER EMISSION SECTION (47)

RANGING DEVICE (LIGHT RECEPTION SIDE) 21'-2

- GNSS RECEPTION SECTION (81)
- TIME INFORMATION SETTING SECTION (82)
- REFERENCE CLOCK GENERATION SECTION (44)
- MEMORY (49)
- LIGHT SOURCE INFORMATION ACQUISITION SECTION (48)
- OPERATION MODE SETTING SECTION (45)
- TIMING CONTROL SECTION (51)
- SIGNAL PROCESSING SECTION (53)
- ToF SENSOR (52)
- LASER DRIVER (46)
- LASER EMISSION SECTION (47)

83

FIG.20
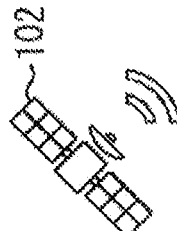
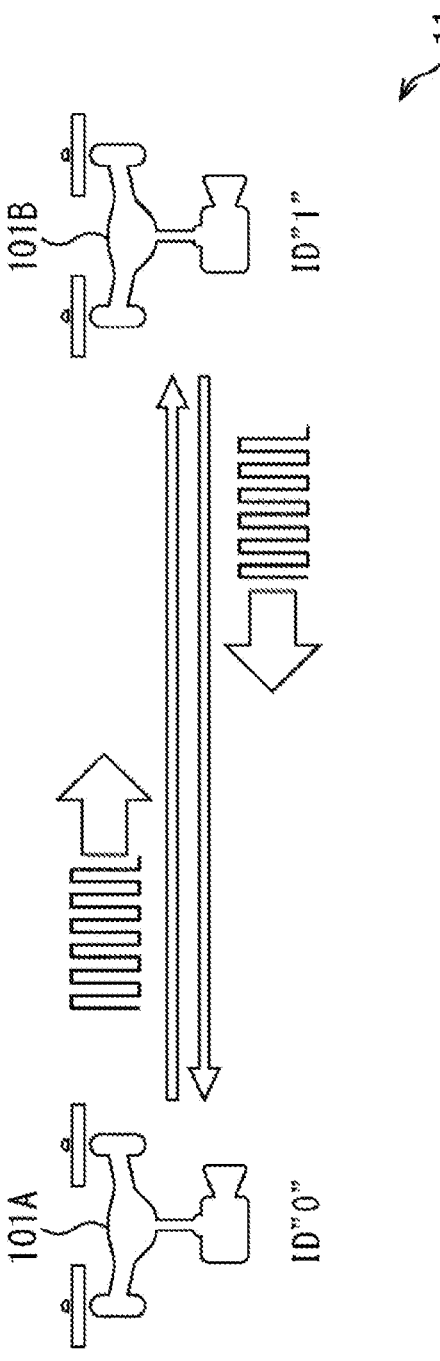

F I G . 2 2
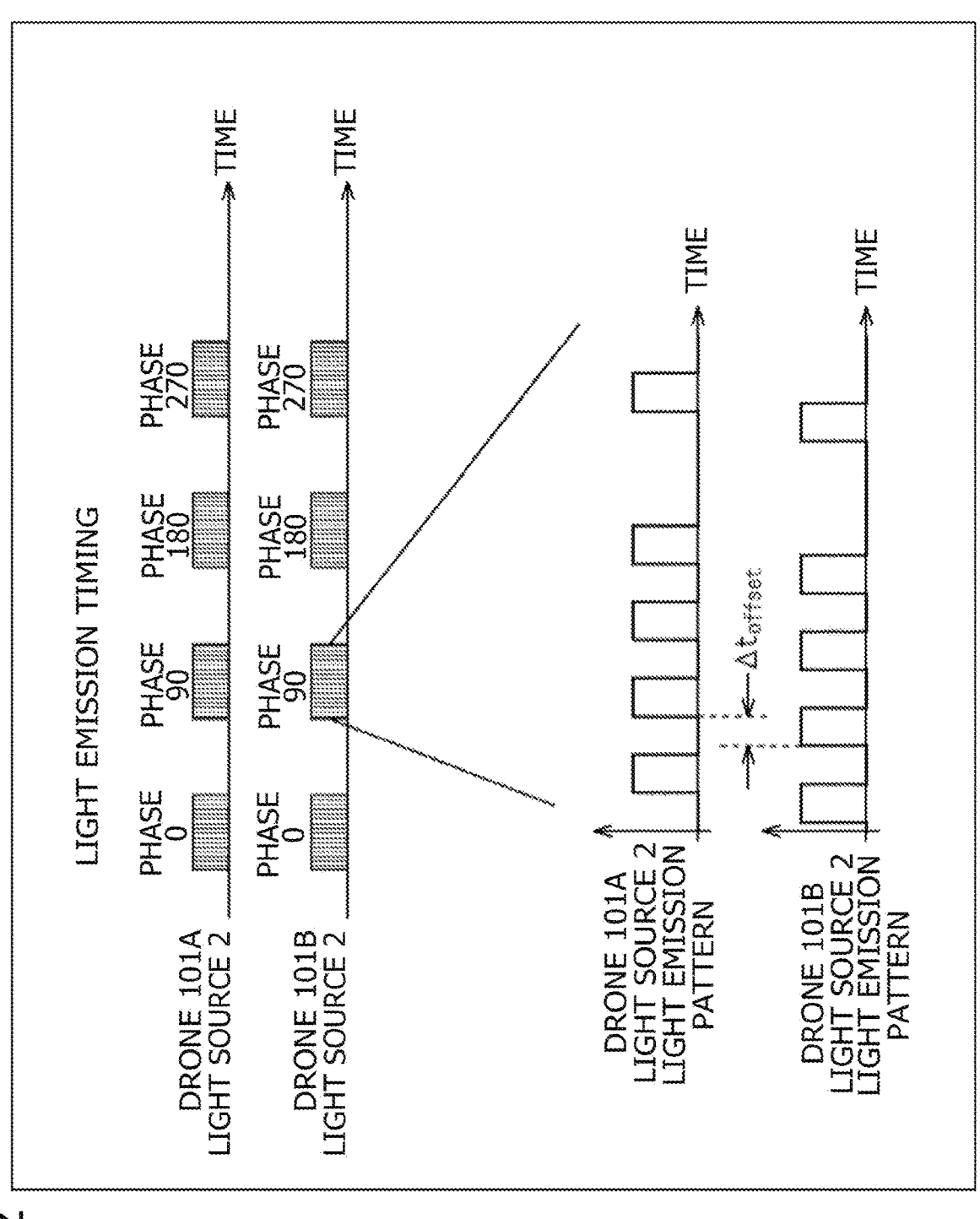

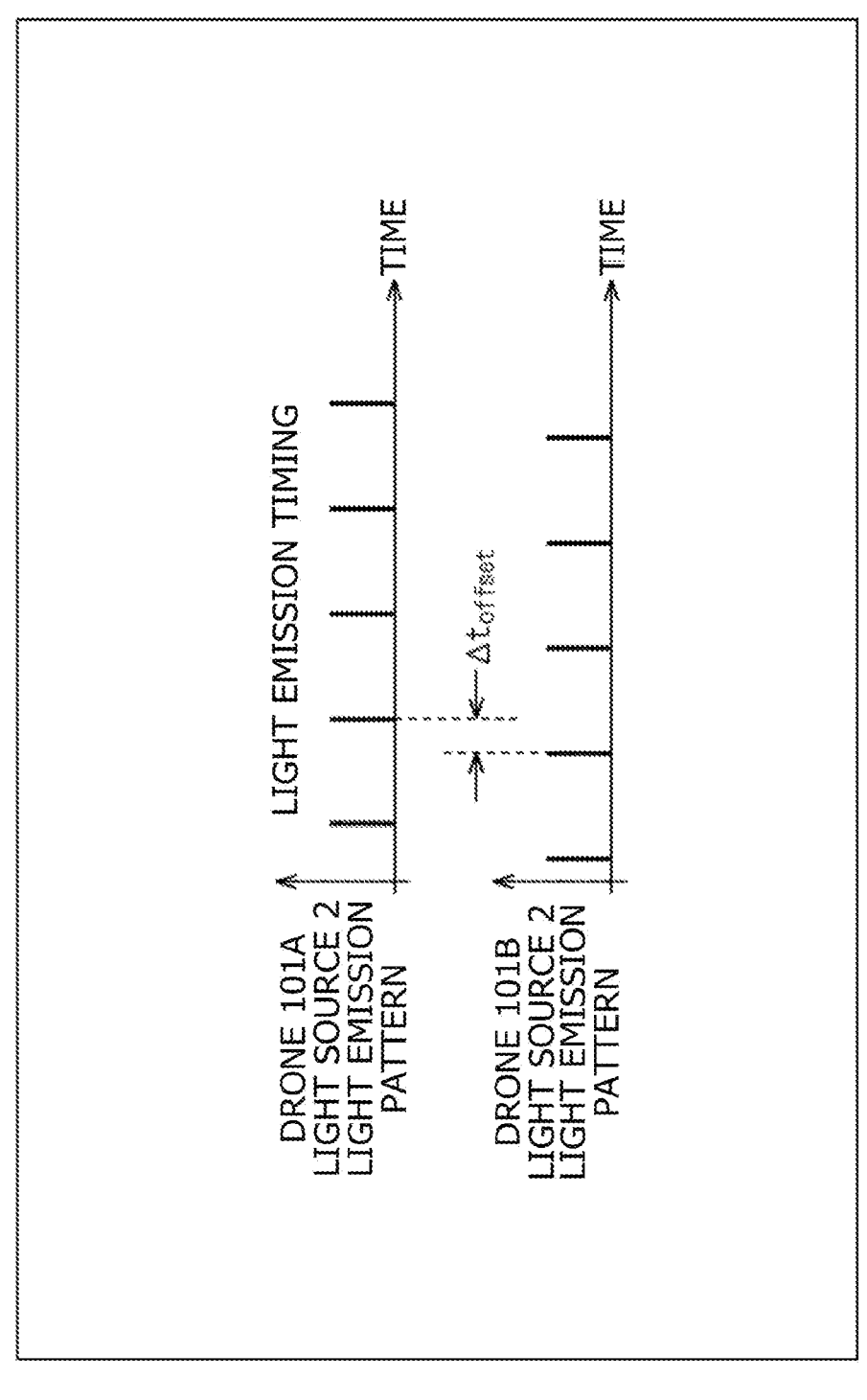
F I G . 2 3

FIG. 24

F I G . 2 6
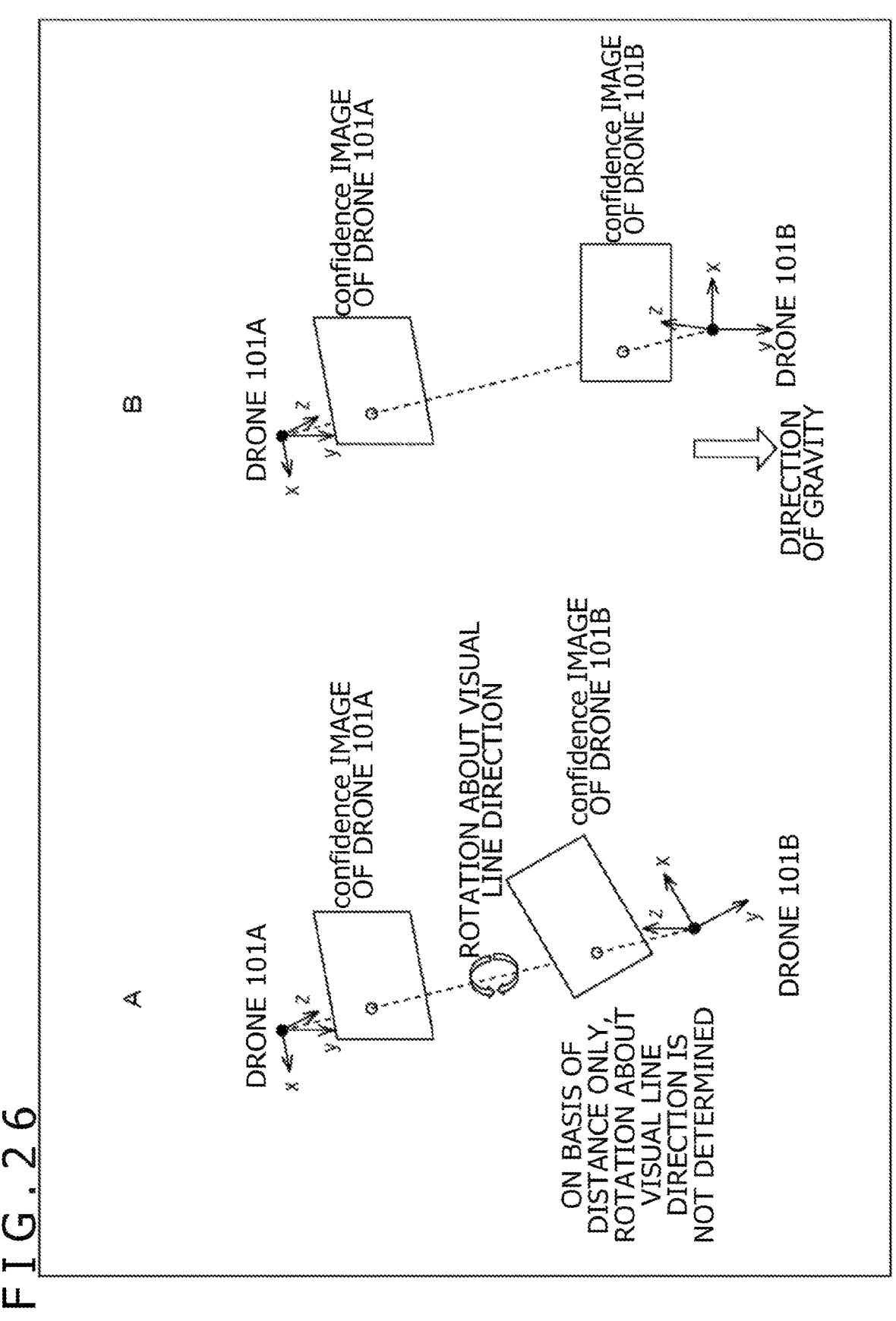

F I G . 2 7
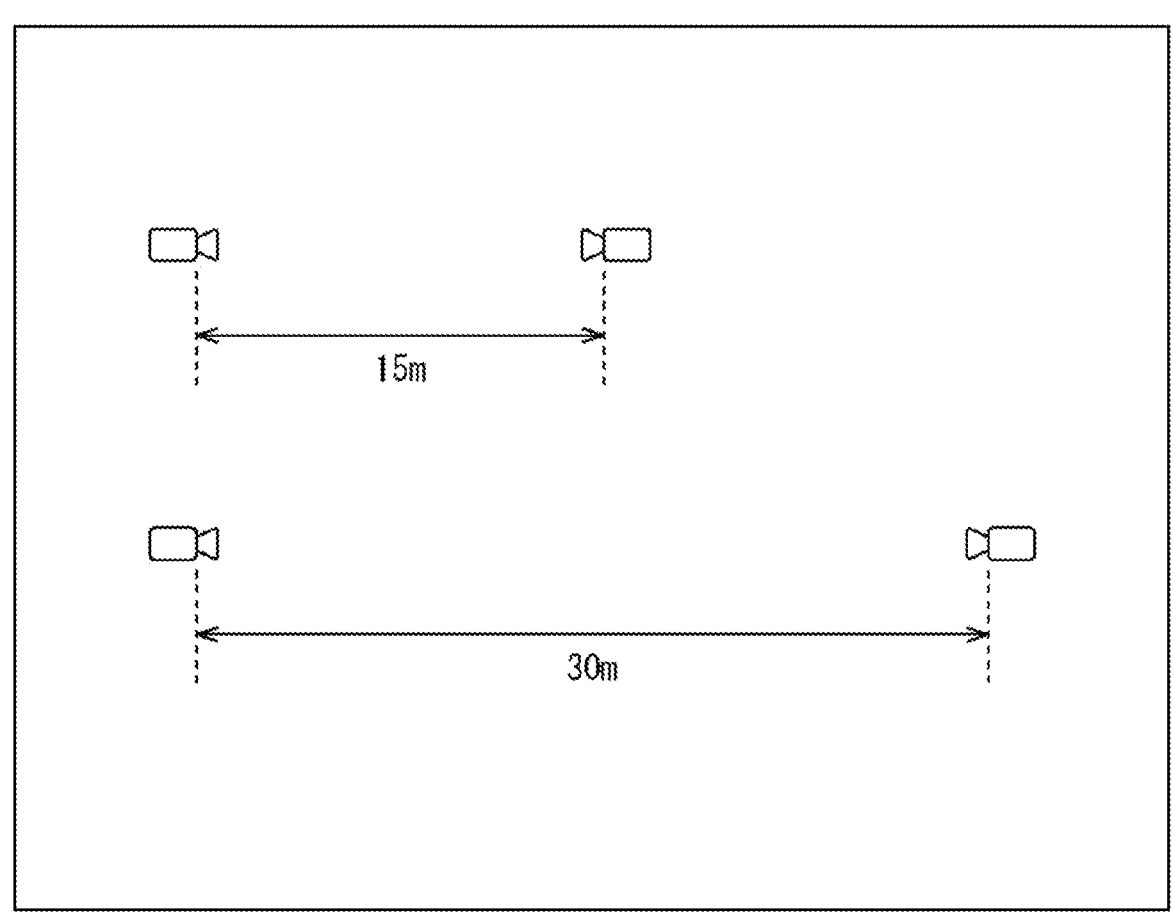

F I G . 2 8

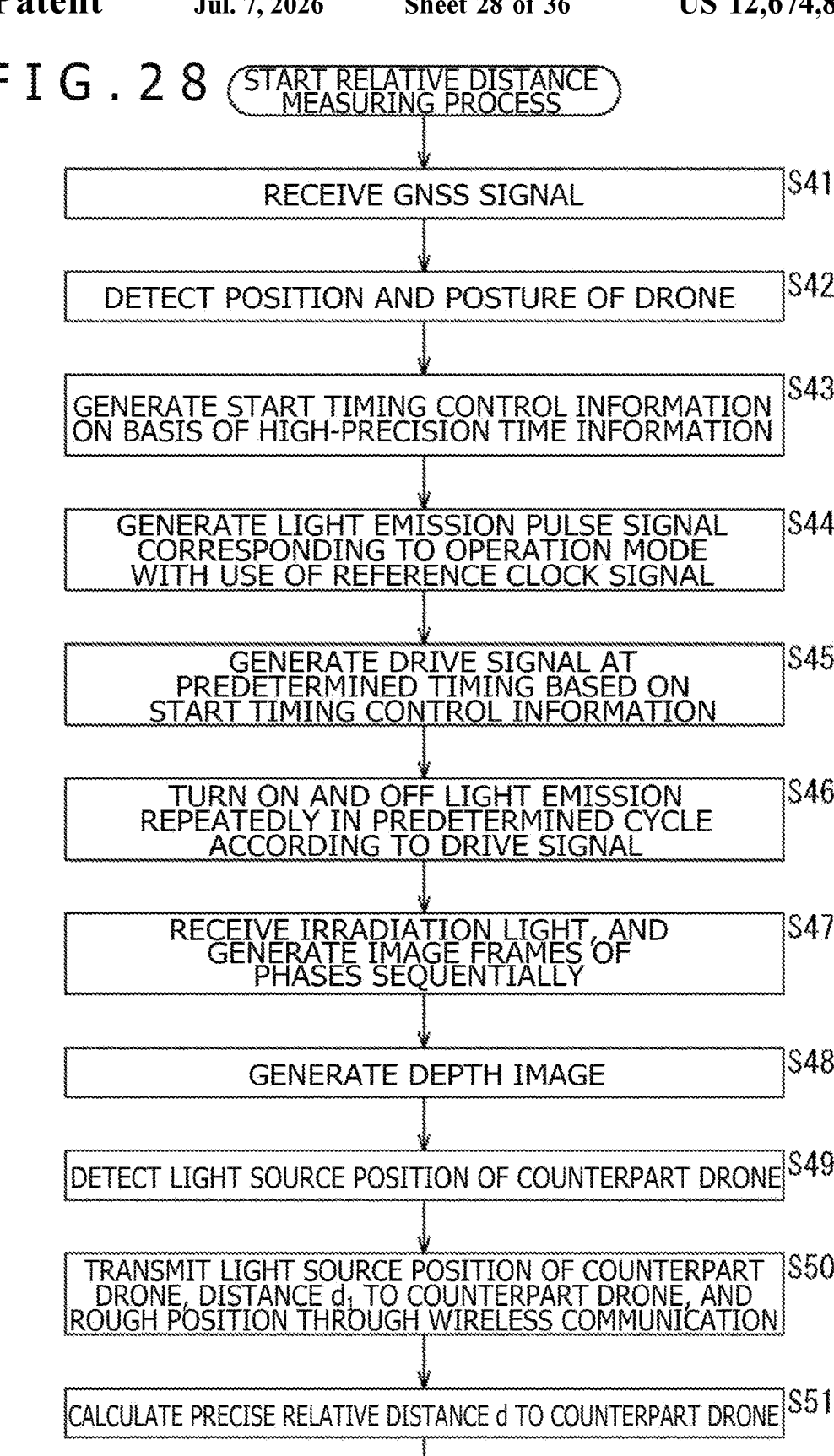

START RELATIVE DISTANCE
MEASURING PROCESS

RECEIVE GNSS SIGNAL | S41

DETECT POSITION AND POSTURE OF DRONE | S42

GENERATE START TIMING CONTROL INFORMATION
ON BASIS OF HIGH-PRECISION TIME INFORMATION | S43

GENERATE LIGHT EMISSION PULSE SIGNAL
CORRESPONDING TO OPERATION MODE
WITH USE OF REFERENCE CLOCK SIGNAL | S44

GENERATE DRIVE SIGNAL AT
PREDETERMINED TIMING BASED ON
START TIMING CONTROL INFORMATION | S45

TURN ON AND OFF LIGHT EMISSION
REPEATEDLY IN PREDETERMINED CYCLE
ACCORDING TO DRIVE SIGNAL | S46

RECEIVE IRRADIATION LIGHT, AND
GENERATE IMAGE FRAMES OF
PHASES SEQUENTIALLY | S47

GENERATE DEPTH IMAGE | S48

DETECT LIGHT SOURCE POSITION OF COUNTERPART DRONE | S49

TRANSMIT LIGHT SOURCE POSITION OF COUNTERPART
DRONE, DISTANCE $d_1$ TO COUNTERPART DRONE, AND
ROUGH POSITION THROUGH WIRELESS COMMUNICATION | S50

CALCULATE PRECISE RELATIVE DISTANCE d TO COUNTERPART DRONE | S51

END

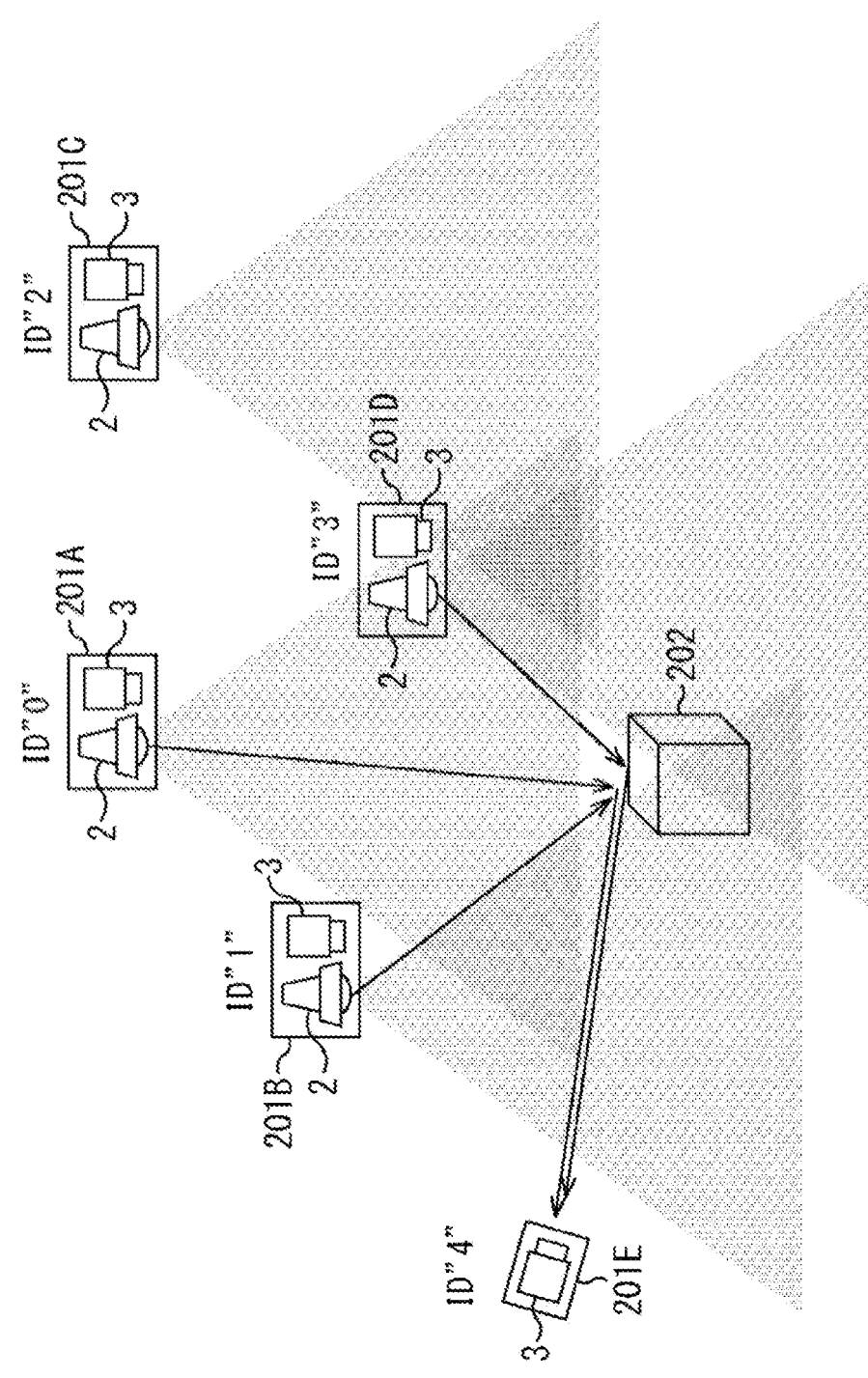
F I G . 2 9

F I G . 3 0
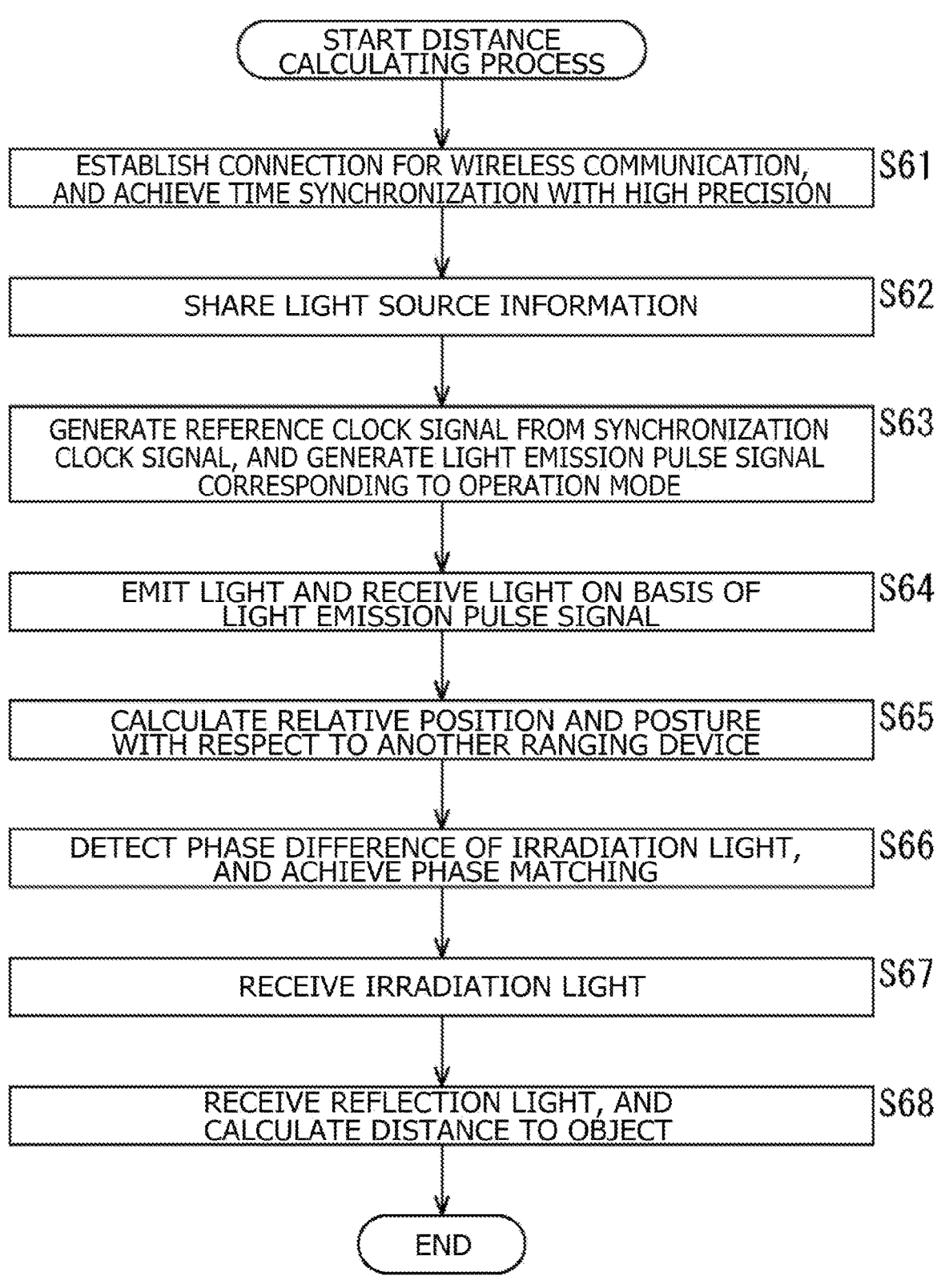

FIG. 31

F I G . 3 2
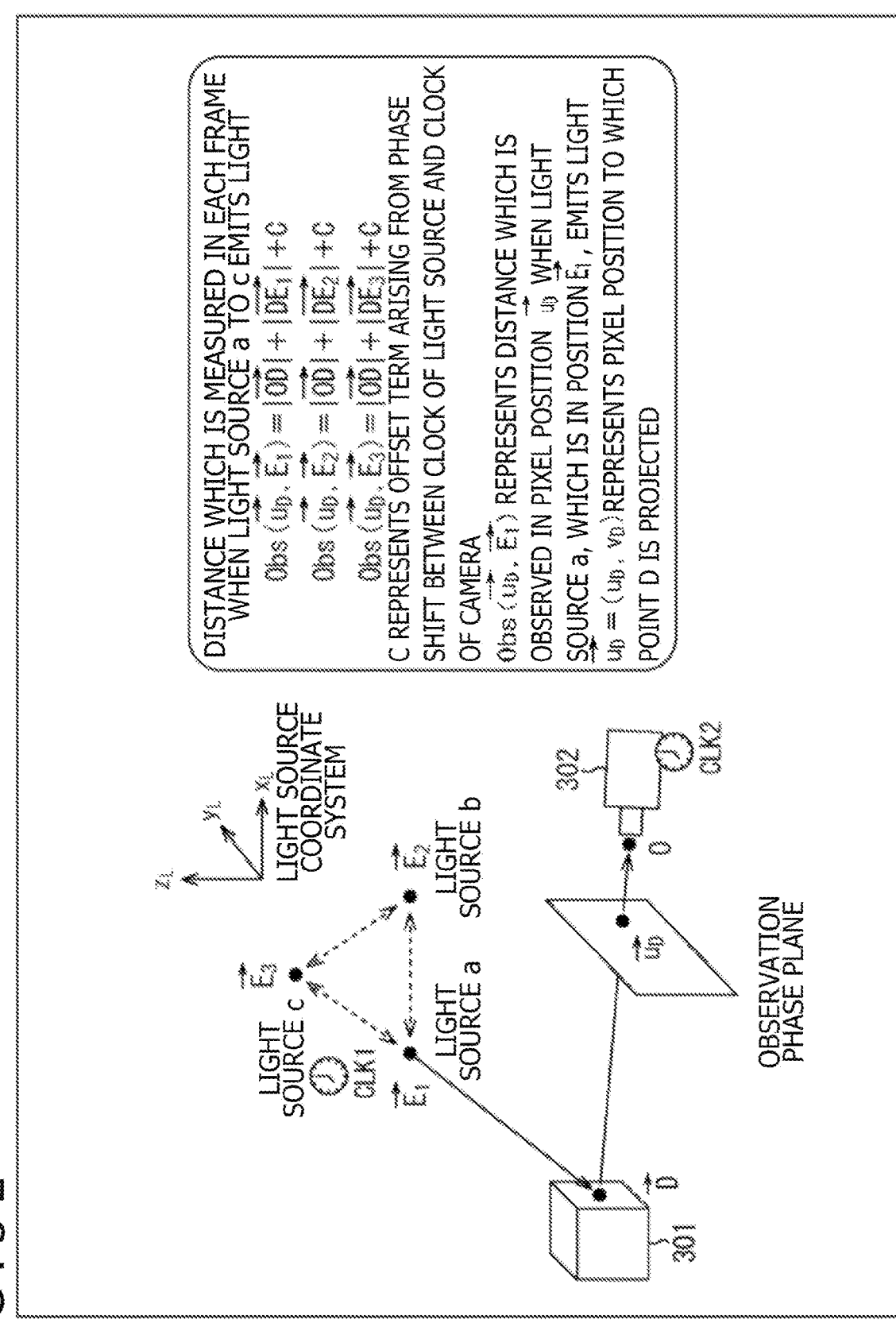

FIG. 34

F I G . 3 5
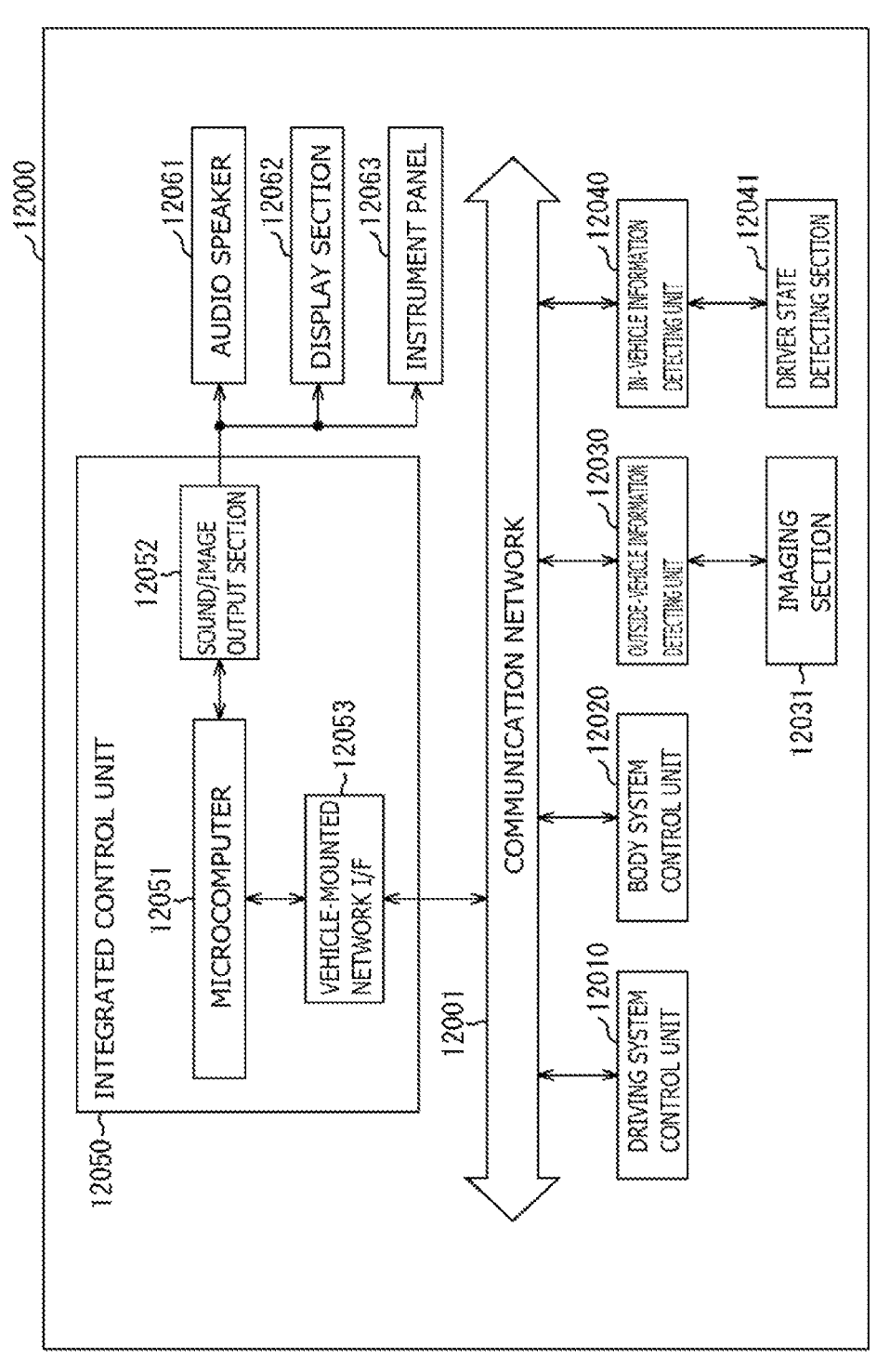

RANGING DEVICE AND LIGHT RECEPTION METHOD THEREOF

TECHNICAL FIELD

The present technology relates to a ranging device and a light reception method thereof, and particularly, relates to a ranging device and a light reception method thereof in which, in a case where a light source and a ToF sensor are separately prepared, the modulation frequency of the light source is synchronized with the modulation frequency of the ToF sensor.

BACKGROUND ART

A ranging method which is called a ToF (Time of Flight) method has been known as one ranging method for measuring the distance to a target object with use of light. In the ToF method, a light source is used to irradiate an object with light, reflection light from the object is received by a ToF sensor, and the distance to the object is measured through analysis of the light reception result.

In addition, there has also been proposed a technology of measuring the distance to an object or the like by irradiating the object with light emitted from a light source which is prepared separately from a ToF sensor and by receiving the resultant reflection light by the ToF sensor (see PTL 1, for example).

CITATION LIST

Patent Literature

[PTL 1]
Japanese Patent Laid-Open No. 2018-31607

SUMMARY

Technical Problems

However, in a case where a light source and a ToF sensor are prepared separately from each other, a light source clock for the light source is different from a sensor clock for the ToF sensor. Therefore, the modulation frequency of the light source does not necessarily synchronize with the modulation frequency of the ToF sensor. This has caused a frequency deviation in some cases. Further, in a case where the modulation frequency of the ToF sensor is deviated from the modulation frequency of the light source, there is a possibility that an error occurs in a result of distance measurement.

The present technology has been made in view of the above circumstances, and is provided to achieve synchronization between the modulation frequency of a light source and the modulation frequency of a ToF sensor in a case where the light source and the ToF sensor are prepared separately from each other.

Solution to Problems

A ranging device according to a first aspect of the present technology includes a reception section that generates, by executing a synchronization process on a transmission signal transmitted from a separate device through wireless communication, a signal synchronized with a synchronization clock signal of the separate device, a reference clock generation section that generates, on the basis of the synchronization clock signal, a reference clock signal to be used as a reference for light emission from a light source, and a ToF sensor that receives, on the basis of the reference clock signal, reflection light resulting from irradiation light applied from the light source and reflected by an object.

A ranging device according to a second aspect of the present technology includes a communication section that transmits a transmission signal through wireless communication, a reference clock generation section that generates, on the basis of a synchronization clock signal synchronized with the transmission signal, a reference clock signal to be used as a reference for light emission from a light source, and a light source that applies irradiation light on the basis of the reference clock signal.

A ranging device according to a third aspect of the present technology includes a communication section that transmits and receives a transmission signal through wireless communication, a reference clock generation section that generates, on the basis of a synchronization clock signal synchronized with the transmission signal, a reference clock signal to be used as a reference for light emission from a light source, a light source that applies irradiation light on the basis of the reference clock signal, and a ToF sensor that receives, on the basis of the reference clock signal, reflection light resulting from irradiation light applied from a separate device and reflected by an object.

A light reception method for a ranging device according to a fourth aspect of the present technology, includes, by the ranging device, generating, by executing a synchronization process on a transmission signal transmitted from a separate device through wireless communication, a signal synchronized with a synchronization clock signal of the separate device, generating, on the basis of the synchronization clock signal, a reference clock signal to be used as a reference for light emission from a light source, and receiving, on the basis of the reference clock signal, reflection light resulting from irradiation light applied from the light source and reflected by an object.

According to the first, third, and fourth aspects of the present technology, a reference clock signal to be used as a reference for light emission from the light source is generated on the basis of a synchronization clock signal synchronized with a transmission signal of wireless communication, and reflection light resulting from irradiation light applied from the light source and reflected by an object is received on the basis of the reference clock signal.

According to the second aspect of the present technology, a reference clock signal to be used as a reference for light emission from the light source is generated on the basis of a synchronization clock signal synchronized with the transmission signal of wireless communication, and irradiation light is applied from the light source on the basis of the reference clock signal.

The ranging device may be an independent device, or may be a module included in another device.

BRIEF DESCRIPTION OF DRAWINGS

FIG. 3 is a diagram for explaining a method of calculating a phase difference $\varphi$.

FIG. 4 is a diagram for explaining a component and a frame according to the present disclosure.

FIG. 10 is a block diagram illustrating a functional configuration example of a ranging device including a light source and a ranging unit.

FIG. 11 is a diagram illustrating an operation example in which an operation mode is set to a time division mode.

FIG. 12 is a diagram illustrating an operation example in which an operation mode is set to a modulation frequency mode.

FIG. 13 is a diagram illustrating an operation example in which an operation mode is set to a light emission pattern mode.

FIG. 14 is a functional block diagram of a ranging device that has a light emission function only.

FIG. 15 is a functional block diagram of a ranging device that has a light reception function only.

FIG. 16 is a flowchart depicting a light emission control process in a light-emission-side ranging device.

FIG. 18 is a diagram for explaining a process of achieving phase synchronization.

FIG. 19 is a block diagram of a ranging device that achieves time synchronization on the basis of a GNSS signal.

FIG. 20 is a diagram illustrating a configuration example of a ranging system according to a second embodiment of the present disclosure.

FIG. 22 is a diagram for explaining a principle of calculating a relative distance.

FIG. 23 is a diagram for explaining a principle of calculating a relative distance.

FIG. 24 is a block diagram concerning a ranging device that is incorporated in a drone.

FIG. 26 depicts diagrams for explaining a process of increasing the precision of a position and a posture with use of a precise relative distance.

FIG. 27 is a diagram for explaining the relation between a modulation frequency and a measured distance.

FIG. 28 is a flowchart depicting a process of measuring a relative distance of drones.

FIG. 29 is a diagram illustrating a configuration example of a ranging system according to a third embodiment of the present disclosure.

FIG. 30 is a flowchart depicting a distance calculation process in the ranging system according to the third embodiment.

FIG. 31 is a diagram for explaining phase difference detection in step S66 in FIG. 30.

FIG. 32 is a diagram for explaining a distance calculation method involving reception of reflection light from a plurality of light sources.

FIG. 34 is a diagram illustrating a configuration example of a light reception section of a ToF sensor.

FIG. 35 is a block diagram depicting an example of schematic configuration of a vehicle control system.

DESCRIPTION OF EMBODIMENTS

Hereinafter, modes for carrying out the present technology (hereinafter, referred to as embodiments) will be explained with reference to the attached drawings. It is to be noted that constituent elements having substantially the same functional configuration are denoted by the same reference signs throughout the present specification and the drawings. Thus, an overlapping explanation thereof will be omitted. The explanation will be given in the following order.

1. Summary of Ranging Process Using ToF Method
2. First Embodiment of Ranging System
3. Block Diagram of Ranging Device
4. Process Flow of Ranging Device
5. Modification of First Embodiment
6. Second Embodiment of Ranging System
7. Third Embodiment of Ranging System
8. Distance Calculation Method Involving Reception of Reflection Light from Plurality of Light Sources
9. Configuration of ToF Sensor
10. Examples of Application to Mobile Body <1. Summary of Ranging Process Using ToF Method>

As one ranging method for measuring the distance to a measurement target object with use of light, a ranging method which is called a ToF (Time of Flight) method has been known. In the ToF method, a light source is used to irradiate an object with light, the resultant reflection light is received by a ToF sensor, and the light reception result is analyzed, whereby the distance to the object or the like is measured.

The present disclosure relates to a ranging technology using the ToF method. For easy comprehension of the embodiments according to the present disclosure, the basic principles of ranging processing using the ToF method will be explained with reference to FIGS. 1 to 7.

In the ToF method, light is applied to an object, and the resultant reflection light is analyzed, whereby the distance (depth) to the object and the shape of the object are measured. It is to be noted that the following explanation does not include any particular mention of measurement of a three-dimensional shape. However, measurement of the distance to an object surface is carried out for all the surfaces of the object, so that the three-dimensional shape of the object can be measured.

(Configuration of Ranging System)

Figure 1:
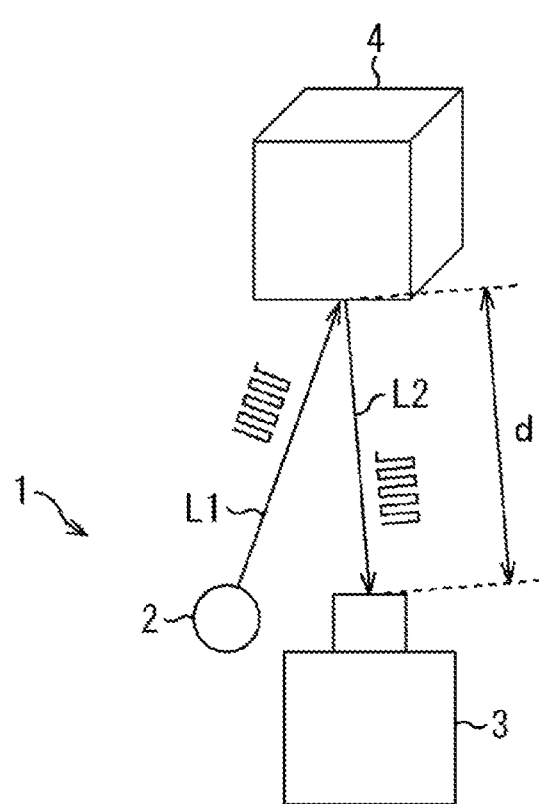
FIG. 1 is a diagram for explaining a basic principle of a distance measuring process using a direct ToF method.

FIG. 1 illustrates a configuration of a ranging system.

A ranging system 1 in FIG. 1 includes a light source 2 and a ranging unit 3. The light source 2 applies light to an object 4 which is a measurement target object. Irradiation light L1 applied from the light source 2 is reflected by the object 4, and then, becomes reflection light L2 and enters the ranging unit 3.

The arrangement positions of the light source 2 and the ranging unit 3 are substantially the same. In this case, the distance (depth) d from the ranging unit 3 to the object 4 can be calculated by the following expression (1).

[Math. 1]

$$d = \tfrac{1}{2} \cdot c \cdot \Delta t \qquad (1)$$

In the expression (1), $\Delta t$ represents time that is taken for the irradiation light L1 emitted from the light source 2 to enter the ranging unit 3 after being reflected by the object 4, and c represents the speed of the light ($2.9979 \times 10^8$ [m/sec])

Figure 2:
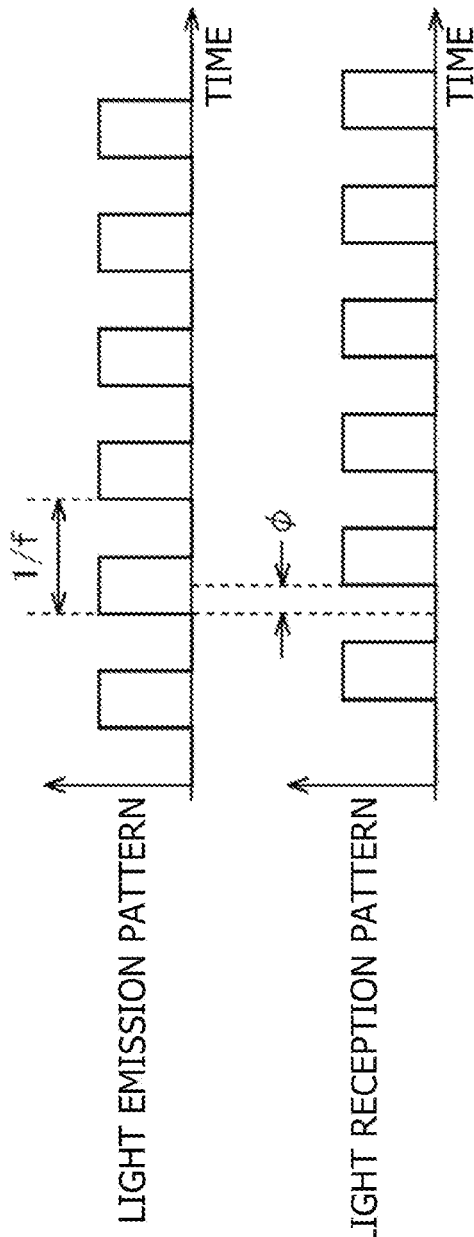
FIG. 2 is a diagram for explaining a basic principle of a distance measuring process using the direct ToF method.

As the irradiation light L1 applied from the light source 2, pulse light having a light emission pattern in which the ON state and the OFF state are repeated at high speed in a predetermined frequency f (modulation frequency), as illustrated in FIG. 2, is adopted. One cycle of the light emission pattern is 1/f. The ranging unit 3 detects the reflection light L2 the phase of which is shifted, according to the time $\Delta t$ that is taken for the light to travel from the light source 2 to the ranging unit 3. When the amount of this phase shift (phase difference) is defined as $\varphi$, the time $\Delta t$ can be calculated by the following expression (2).

[Math. 2]

$$\Delta t = \frac{1}{f} \cdot \frac{\phi}{2\pi} \qquad (2)$$

Therefore, on the basis of the expression (1) and the expression (2), the distance d from the ranging unit 3 to the object 4 can be calculated by the following expression (3).

[Math. 3]

$$d = \frac{c\phi}{4\pi f} \qquad (3)$$

Next, a method for calculating the phase difference p will be explained with reference to FIG. 3.

The ranging unit 3 includes a ToF sensor in which pixels that perform photoelectric conversion of incident light are two-dimensionally arranged. Each of the pixels in the ToF sensor repetitively switches between the ON state and the OFF state at high speed, and an electric charge is accumulated only during the ON period.

In a case where the ToF sensor is used to measure the distance to an object, the ranging unit 3 sequentially performs switching between the ON executing timing and the OFF executing timing of the ToF sensor, accumulates an electric charge at the ON executing timing and an electric charge at the OFF executing timing, and outputs a detection signal according to the accumulated electric charge.

There are four types of the ON/OFF executing timings, which are a 0-degrees phase, a 90-degrees phase, a 180-degrees phase, and a 270-degrees phase, for example.

At the executing timing of the 0-degrees phase, an ON timing (light reception timing) of the ToF sensor matches the phase of pulse light emitted by the light source 2, that is, the phase of a light emission pattern.

At the executing timing of the 90-degrees phase, the phase of an ON timing (light reception timing) of the ToF sensor is delayed, by 90 degrees, from pulse light (light emission pattern) emitted by the light source 2.

At the executing timing of the 180-degrees phase, the phase of an ON timing (light reception timing) of the ToF sensor is delayed, by 180 degrees, from pulse light (light emission pattern) emitted by the light source 2.

At the executing timing of the 270-degrees phase, the phase of an ON timing (light reception timing) of the ToF sensor is delayed, by 270 degrees, from pulse light (light emission pattern) emitted by the light source 2.

The ToF sensor sequentially switches the executing timing among these four types, and acquires a reception amount of reflection light L2 (accumulated electric charge) at each light reception timing. In FIG. 3, in an ON timing (light reception timing) of each phase, an incident timing of the reflection light L2 is hatched.

In FIG. 3, electric charges accumulated when the light reception timing is set to the 0-degrees phase, the 90-degrees phase, the 180-degrees phase, and the 270-degrees phase are defined as $Q_0$, $Q_{90}$, $Q_{180}$, and $Q_{270}$, respectively. A phase difference $\varphi$ can be calculated by the following expression (4) using $Q_0$, $Q_{90}$, $Q_{180}$, and $Q_{270}$.

[Math. 4]

$$\phi = \mathrm{Arctan} \frac{Q_{90} - Q_{270}}{Q_{180} - Q_0} \qquad (4)$$

The phase difference $\varphi$ calculated from the expression (4) is substituted into the expression (3). As a result, the distance d from the ranging unit 3 to the object 4 can be calculated.

Further, a value that indicates the intensity of light received at each pixel in the ToF sensor is referred to as a confidence value. The confidence value is calculated by the following expression (5) or expression (6).

[Math. 5]

$$\text{Confidence value} = \sqrt{(Q_{180} - Q_0)^2 + (Q_{90} - Q_{270})^2} \qquad (5)$$

$$\text{Confidence value} = |Q_{180} - Q_0| + |Q_{90} - Q_{270}| \qquad (6)$$

As depicted in FIG. 4, the light reception timing of the ToF sensor is sequentially switched among the 0-degrees phase, the 90-degrees phase, the 180-degrees phase, and the 270-degrees phase, and a detection signal according to the accumulated electric charge (the electric charge $Q_0$, the electric charge $Q_{90}$, the electric charge $Q_{180}$, and the electric charge $Q_{270}$) in the corresponding phase is sequentially outputted.

In the present disclosure, an image frame of any one of the 0-degrees phase, the 90-degrees phase, the 180-degrees phase, and the 270-degrees phase, which is outputted from the ToF sensor is referred to as a "component," while a set including four components (image frames of four phases) of the 0-degrees phase, the 90-degrees phase, the 180-degrees phase, and the 270-degrees phase is referred to as a "frame." (Correcting Cyclic Error)

Calculation of the above expression (4) is carried out on the assumption that an intensity change of irradiation light L1 emitted from the light source 2 is a sine wave. However, light emitted from the light source 2 is actually a rectangular wave, as depicted in FIG. 2. Thus, an error cyclically occurs (hereinafter, referred to as a cyclic error) in the distance d because the rectangular wave is handled as a sine wave. Therefore, it is common to perform a correction process of correcting the cyclic error on detection signals of the phases outputted from the ToF sensor.

Figure 5:
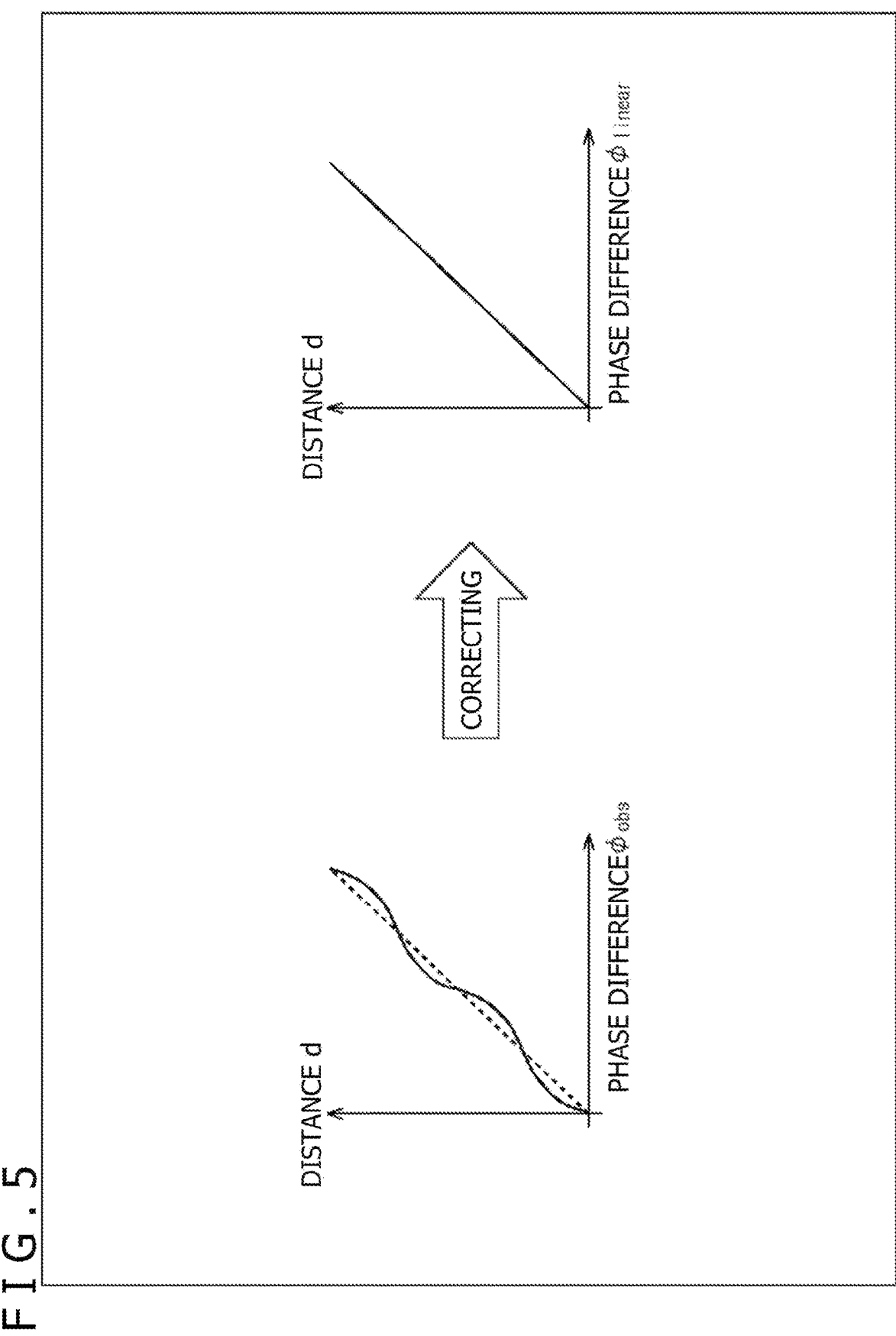
FIG. 5 is a diagram for explaining the concept of a process of correcting a cyclic error.

FIG. 5 is a diagram illustrating the concept of a process of correcting a cyclic error.

A graph on the left side in FIG. 5 depicts the relation between the phase difference $\varphi_{obs}$ and the distance d outputted from a ToF sensor. A linear relation which is indicated by the broken line is ideal for the relation between the phase difference $\varphi_{obs}$ and the distance d. However, the relation actually has a non-linear shape including a cyclic error, which is indicated by the solid line.

Therefore, a signal processing section on a later stage that processes detection signals outputted by the ToF sensor executes a correction process of correcting the cyclic error. As a result, the corrected relation between the phase difference D and the distance d has a linear shape, as depicted on the right side in FIG. 5.

Specifically, in the correction process, measurement of an object the distance d to which is already known is carried out by the ToF sensor, and then, a correction function f ($\varphi_{obs}$) for converting the phase difference $\varphi_{obs}$ obtained by the actual measurement to a phase difference $\varphi$ which is a true value corresponding to the distance d to the object is calculated on the basis of the relation between the phase difference $\varphi_{obs}$ and the phase difference $\varphi$. The correction function f ($\varphi_{obs}$) is previously stored in a memory of the signal processing section. Upon receiving supply of the phase difference $\varphi_{obs}$ as a measured value from the ToF sensor, the signal processing section executes the correction process on the phase difference $\varphi_{obs}$.

It is to be noted that, besides the method of storing the correction function f($\varphi_{obs}$) in the memory and carrying out the calculation using the correction function f($\varphi_{obs}$), examples of the correction process also include a method of storing pairs each including a phase difference $\varphi_{obs}$ which is a measured value and a phase difference $\varphi$ which is a true value in a lookup table or the like, and reading out and outputting the phase difference $\varphi$ which is a true value corresponding to a measured value from the lookup table.

Alternatively, a correction function f(x) obtained by actual measurement may be approximated to another parameter function, and only a few of correction coefficients may be stored in the memory. For example, as indicated by the expression (7), a correction function f(x) may be expanded to Fourier series, so that correction coefficients ($a_k$, $b_k$) in which k represents 0 to N-th order terms can be stored in the memory.

[Math. 7]

$$f(x) \approx \frac{a_0}{2} + \sum_{k=0}^{N} \{a_k \cos kx + b_k \sin kx\} \qquad (7)$$

(Method for Preventing Interference Among Multiple Light Sources)

In the ranging system 1, in a case where there are a plurality of sets of light sources 2 and ranging units 3 within the measurement range of a certain ranging unit 3, precise measurement of the phase difference y may fail due to irradiation light emitted from a separate light source 2.

Figure 6:
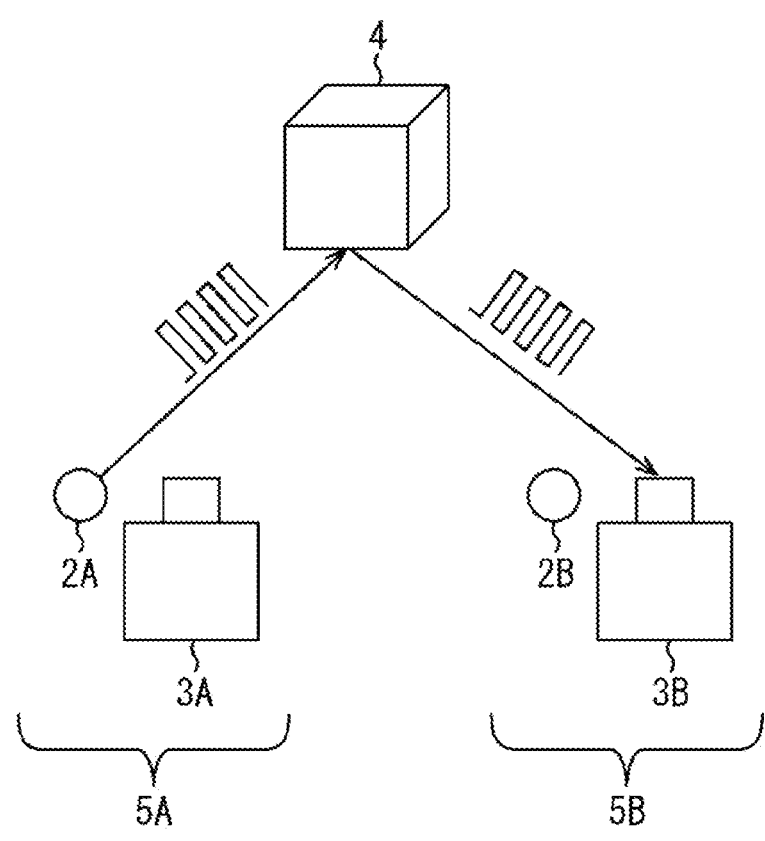
FIG. 6 is a diagram for explaining a method for preventing interference between a plurality of light sources.

For example, it is assumed that a set 5A including a light source 2A and a ranging unit 3A and a set 5B including a light source 2B and a ranging unit 3B are disposed within a range (measurement range) where the light sources 2 can receive light from each other, as illustrated in FIG. 6.

The ranging unit 3A receives reflection light resulting from irradiation light applied from the light source 2A and reflected by the object 4, and calculates a phase difference $\varphi_A$. The ranging unit 3B receives reflection light resulting from irradiation light applied from the light source 2B and reflected by the object 4, and calculates a phase difference $\varphi_B$. In this case, there is a possibility that the irradiation light applied from the light source 2A affects the light reception at the ranging unit 3B and that the irradiation light applied from the light source 2B affects the light reception at the ranging unit 3A.

For measures against such interference with irradiation light applied from a separate light source 2 as described above, there are three methods, i.e. a method (1) of causing the light sources 2 to emit pulse light in a time-division manner, a method (2) of making the modulation frequencies of pulse light from the light sources 2 different from each other, and a method (3) of making the light emission patterns of pulse light from the light sources 2 different from each other.

In the method (1) of causing the light sources 2 to emit pulse light in a time-division manner, no influence is provided by irradiation light applied from a separate light source 2 because pulse light of one type is emitted from the light sources 2 at any time point.

Figure 7:
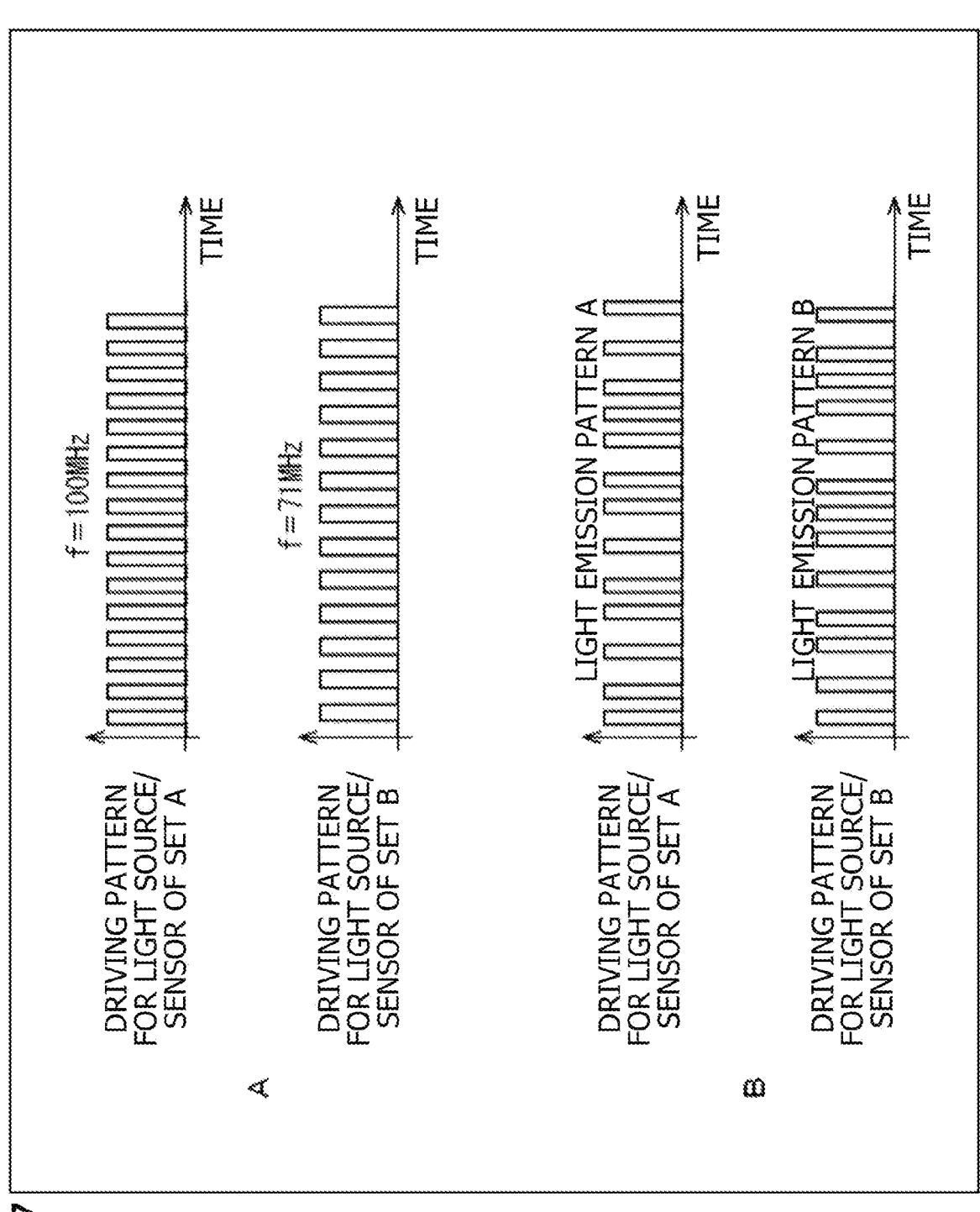
FIG. 7 depicts diagrams for explaining a method for preventing interference between a plurality of light sources.

A of FIG. 7 depicts an example of the method (2) of making the modulation frequencies of pulse light from the light sources 2 different from each other.

In the method of making the modulation frequencies of pulse light from the light sources 2 different from each other, the light source 2A of the set A applies pulse light at a modulation frequency f of 100 MHz, while the light source 2B of the set B applies pulse light at a modulation frequency f of 71 MHz, for example.

The ranging unit 3A of the set A drives the ToF sensor at a drive frequency that is equal to a modulation frequency f=100 MHz. The ranging unit 3B of the set B drives the ToF sensor at a drive frequency that is equal to the modulation frequency f=71 MHz. The drive frequency of the ToF sensor corresponds to the frequency of an ON period during which the electric charge is accumulated in FIG. 3.

Since the ranging unit 3A is driven at the drive frequency that is equal to the modulation frequency f of the pulse light emitted from the light source 2A, the light emitted from the light source 2A can be received with high correlation. That is, a signal having a high confidence value can be detected.

On the other hand, in a case where the ranging unit 3B receives pulse light emitted from the light source 2A, a phase difference $\varphi$ cannot be calculated due to the difference in drive frequencies. That is, in the ranging unit 3B, the values of electric charges $Q_0$, $Q_{90}$, $Q_{180}$, and $Q_{270}$ corresponding to reflection light from the light source 2A become roughly equal. Accordingly, the light source 2A is not observed as a modulation light source, so that no influence is exerted on calculation of a phase difference p. Consequently, even when a plurality of the light sources 2A and 2B simultaneously emit irradiation light, the ranging units 3A and 3B can measure the respective precise distances d independently of each other.

B of FIG. 7 depicts an example of the method (3) of making the light emission patterns of pulse light from the light sources 2 different from each other.

The light source 2A of the set A applies pulse light in a predetermined light emission pattern A, while the light source 2B of the set B applies pulse light in a predetermined light emission pattern B. The ranging unit 3A of the set A drives the ToF sensor in the light emission pattern A, while the ranging unit 3B of the set B drives the ToF sensor in the light emission pattern B. The light emission pattern A and the light emission pattern B differ from each other.

Between the ranging units 3A and 3B, there is a high correlation for reflection light of the same light emission pattern, and further, a high confidence value is obtained. On the other hand, there is a low correlation for reflection light of different light emission patterns, so that no influence is exerted on calculation of a phase difference y. Consequently, even when the plurality of light sources 2A and 2B simultaneously emit irradiation light, the ranging units 3A and 3B can measure the respective precise distances d independently of each other.

Selecting, as a measure against interference by irradiation light, the method (1) of identifying pulse light from the light sources 2 by time division, the method (2) of identifying pulse light from the light sources 2 by the modulation frequencies, or the method (3) of identifying pulse light from the light sources 2 by the light emission patterns thereof can be set in a manner depending on an operation mode. Operation modes corresponding to the method (1) of identifying pulse light from the light sources 2 by time division, the method (2) of identifying pulse light from the light sources 2 by the modulation frequencies, and the method (3) of identifying pulse light from the light sources 2 by the light emission patterns thereof are referred to as a (1) time division mode, a (2) modulation frequency mode, and a (3) light emission pattern mode, respectively.

(Direct ToF Method)

A ToF method in which a phase difference y is detected on the basis of electric charges $Q_0$, $Q_{90}$, $Q_{180}$, and $Q_{270}$ which are detected in different phases at the irradiation timing of irradiation light L1 and the distance d to the object 4 is calculated, as in the above-mentioned manner, is called an indirect ToF method.

On the other hand, there is another method called a direct ToF method in which time Δt that is taken for light emitted from the light source 2 to reach the ranging unit 3 is directly counted.

Figure 8:
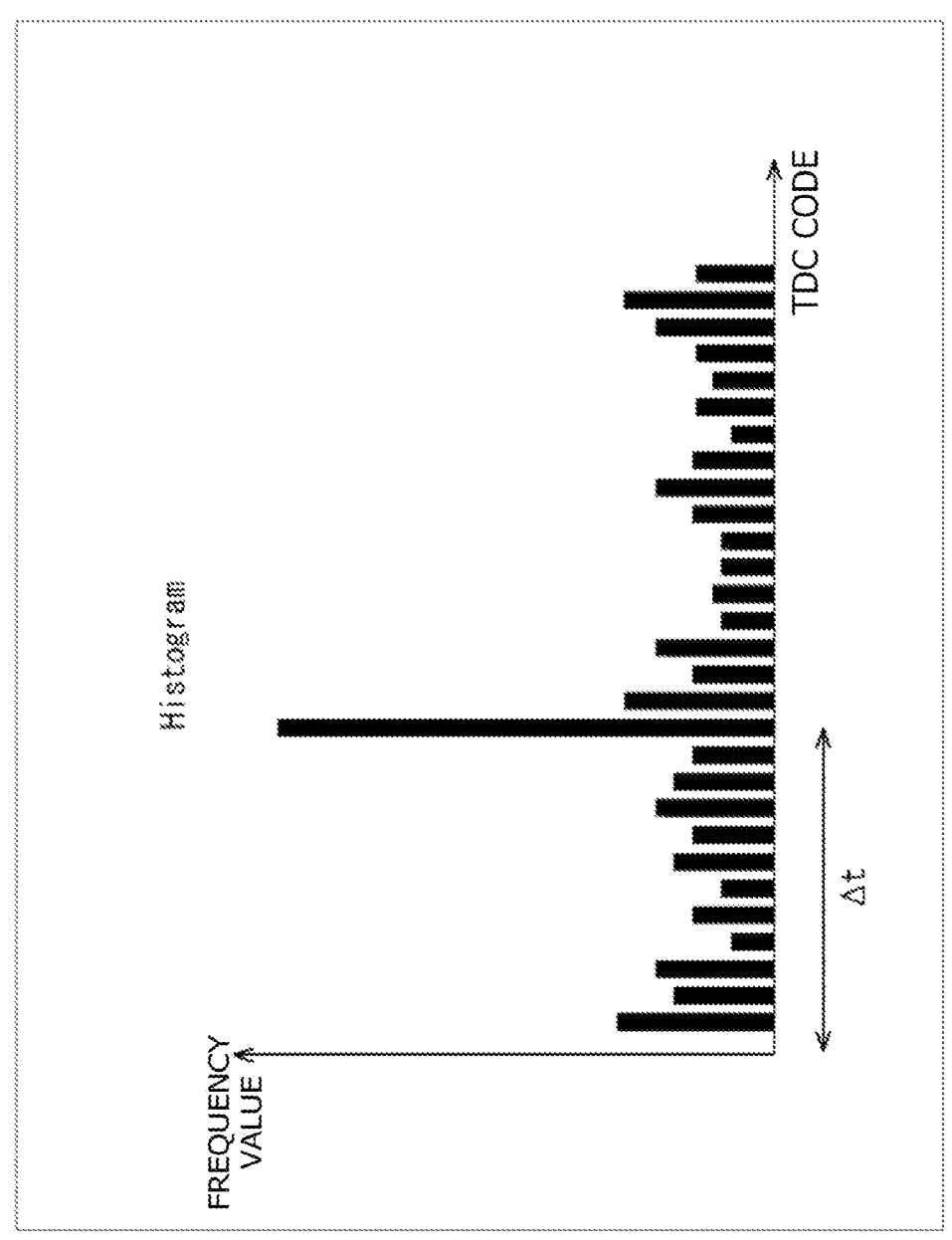
FIG. 8 is a diagram for explaining the direct ToF method.

With reference to FIG. 8, the direct ToF method will briefly be explained.

In a ToF sensor using the direct ToF method, pixels that are two-dimensionally arranged in a matrix form each include a SPAD (Single Photon Avalanche Diode) or an APD (Avalanche photodiode) as a light reception element. The SPAD or the APD is a light reception element that performs avalanche amplification of an electron which is generated by incident light incident on the pixel, and then, outputs a signal. A TDC (time to digital converter) converts time-of-flight of light from a time when the light source 2 starts applying light to a time when the ranging unit 3 receives the reflection light, to a digital count value (hereinafter, referred to as a TDC code). Light application and light reception are carried out multiple times in order to eliminate the influences of disturbance light and multipath.

Subsequently, a histogram of TDC codes of multiple times is generated, as depicted in FIG. 8. A TDC code having the highest frequency value is decided as final time-of-flight Δt, and then, the distance d can be calculated according to the above expression (1).

Therefore, also in a ToF sensor using the direct ToF method, it is necessary to notify the ToF sensor side of a light emission timing because time is counted on the basis of a time when the light source 2 starts applying light.

The summery of ranging processing using the ToF method has been explained so far.

In the ToF method, the light source 2 and the ranging unit 3 are usually integrated into one module or the like in such a manner as to be located in the substantially same position, as described above.

However, the light source 2 may be separated from the ranging unit 3, the object 4 may be irradiated with light applied from the light source 2 placed in a separate position, the ranging unit 3 may receive the resultant reflection light, and the distance to the object 4 may be measured.

In a case where the light source 2 and the ranging unit 3 are separately placed in different positions, the light source 2 can be placed near the object 4. Therefore, the light reception amount at the ToF sensor can be increased, compared to a case where the light source 2 and the ranging unit 3 are integrally formed. As a result, the ranging accuracy of the ranging unit 3 can be enhanced.

In measurement of the distance d by the ToF method, however, the ranging unit 3 needs to achieve high-precision synchronization with a light emission timing of the light source 2, as described above. Accordingly, in a case where the light source 2 and the ranging unit 3 are separately placed, whether the ToF sensor of the ranging unit 3 can achieve high-precision frequency synchronization and phase synchronization with a light emission timing of the light source 2 is a matter of concern.

Therefore, an explanation will be given below of a ranging system in which synchronization between a light source and a ranging unit that are separately placed is achieved with high precision.

<2. First Embodiment of Ranging System>

Figure 9:
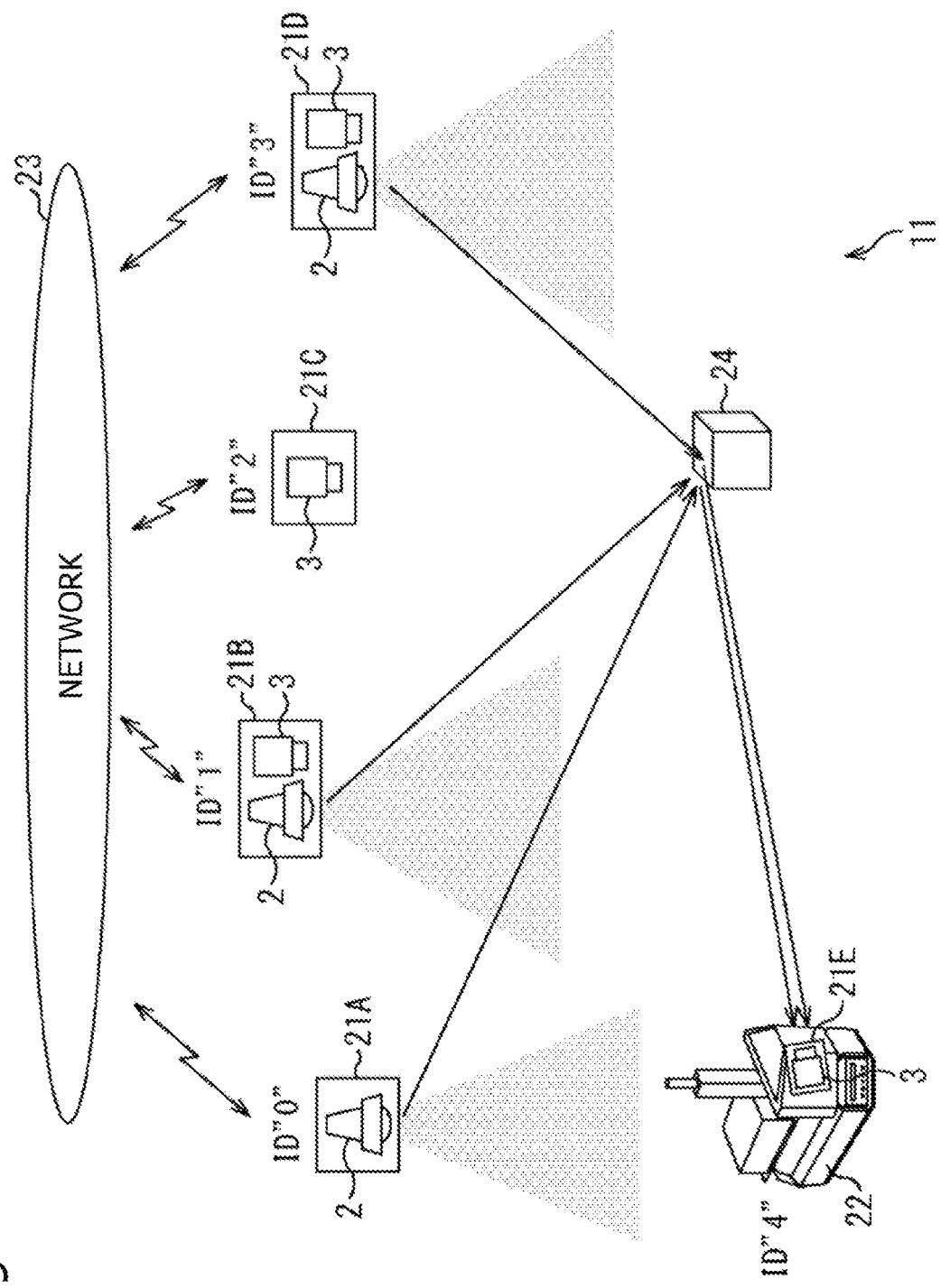
FIG. 9 is a diagram illustrating a configuration example of a ranging system according to a first embodiment of the present disclosure.

FIG. 9 is a diagram illustrating a configuration example of a ranging system according to a first embodiment of the present disclosure.

A ranging system 11 according to the first embodiment in FIG. 9 includes a plurality of ranging devices 21. FIG. 9 illustrates the configuration of the ranging system 11 including five ranging devices 21 that are ranging devices 21A to 21E. However, it is not necessary to set the number of the ranging devices 21 to five. The ranging device 21 can be prepared in any number.

Some of the ranging devices 21 have a configuration including both the light source 2 and the ranging unit 3. The other ranging devices 21 have a configuration including the light source 2 only or have a configuration including the ranging unit 3 only. Specifically, the ranging device 21A includes the light source 2 only, and the ranging device 21B includes the light source 2 and the ranging unit 3. The ranging device 21C includes the ranging unit 3 only, and the ranging device 21D includes the light source 2 and the ranging unit 3. The ranging device 21E includes the ranging unit 3 only.

The ranging devices 21 are identified by respective unique IDs that are respectively given to the ranging devices 21. In the present embodiment, the unique ID of the ranging device 21A is "0" (ID0). The unique ID of the ranging device 21B is "1" (ID1). The unique ID of the ranging device 21C is "2" (ID2). The unique ID of the ranging device 21D is "3" (ID3). The unique ID of the ranging device 21E is "4" (ID4).

The ranging unit 3 includes a ToF sensor 52 (FIG. 10) that measures a distance d to an object with use of the indirect ToF method or the direct ToF method. It is to be noted that, for convenience sake, the following explanation will be given on the assumption that the ToF sensor 52 of each ranging unit 3 is a ToF sensor using the indirect ToF method. A supplementary explanation will be given for the ToF sensor 52 that uses the direct ToF method, if needed.

The ranging devices 21A to 21D are fixedly mounted on a ceiling, for example. The ranging device 21E is mounted in a predetermined position on a mobile carrier vehicle 22. The travel direction of the mobile carrier vehicle 22 can be changed according to the distance measurement result, e.g. the distance to an object 24 obtained by the ranging device 21E.

These five ranging devices 21A to 21E can perform communication (wireless communication) using predetermined wireless signals over a network 23. Alternatively, each of the five ranging devices 21A to 21E may perform wireless communication directly with the counterpart ranging device 21 without the network 23.

The network 23 includes WiFi (registered trademark), Bluetooth (registered trademark), or a wide area communication network such as what is generally called a 4G or 5G line for wireless mobile bodies, for example.

The ranging device 21A including only the light source 2 emits irradiation light when a separate ranging device 21 (e.g. the ranging device 21C) including the ranging unit 3 conducts distance measurement.

The ranging devices 21C and 21E each including only the ranging unit 3 receive reflection light resulting from irradiation light applied from the light source 2 of a separate ranging device 21, and then, measure the distance d to the object.

The ranging devices 21B and 21D each including the light source 2 and the ranging unit 3 can receive reflection light of irradiation light applied from the light sources 2 of the ranging devices 21B and 21D, respectively, to measure the distance d to the object, or can receive reflection light of irradiation light applied from the light source 2 of a separate ranging device 21 (e.g. the ranging device 21C), to measure the distance d to the object.

For example, the ranging device 21E including only the ranging unit 3 measures the distance d from the ranging device 21E to the object 24 by achieving synchronization with a light emission timing of irradiation light applied from the light source 2 of the separate ranging device 21D.

More specifically, by achieving synchronization with a clock of a wireless signal outputted from the light source 2 of the separate ranging device 21D, the ranging device 21E achieves synchronization between a light emission timing of the light source 2 and a light reception timing of the ranging unit 3 of the ranging device 21E. For example, in a case where the ranging device 21E and the ranging device 21D wirelessly communicate with each other via WiFi (registered trademark) or Bluetooth (registered trademark), the ranging device 21E achieves synchronization between the light emission timing and the light reception timing of the ranging unit 3 of the ranging device 21E according to a 2.4-GHz clock signal, for example. Accordingly, even in a case where the light source 2 and the ranging unit 3 are separately placed, high-precision distance measurement can be performed.

<3. Block Diagram of Ranging Device>

Figure 10:
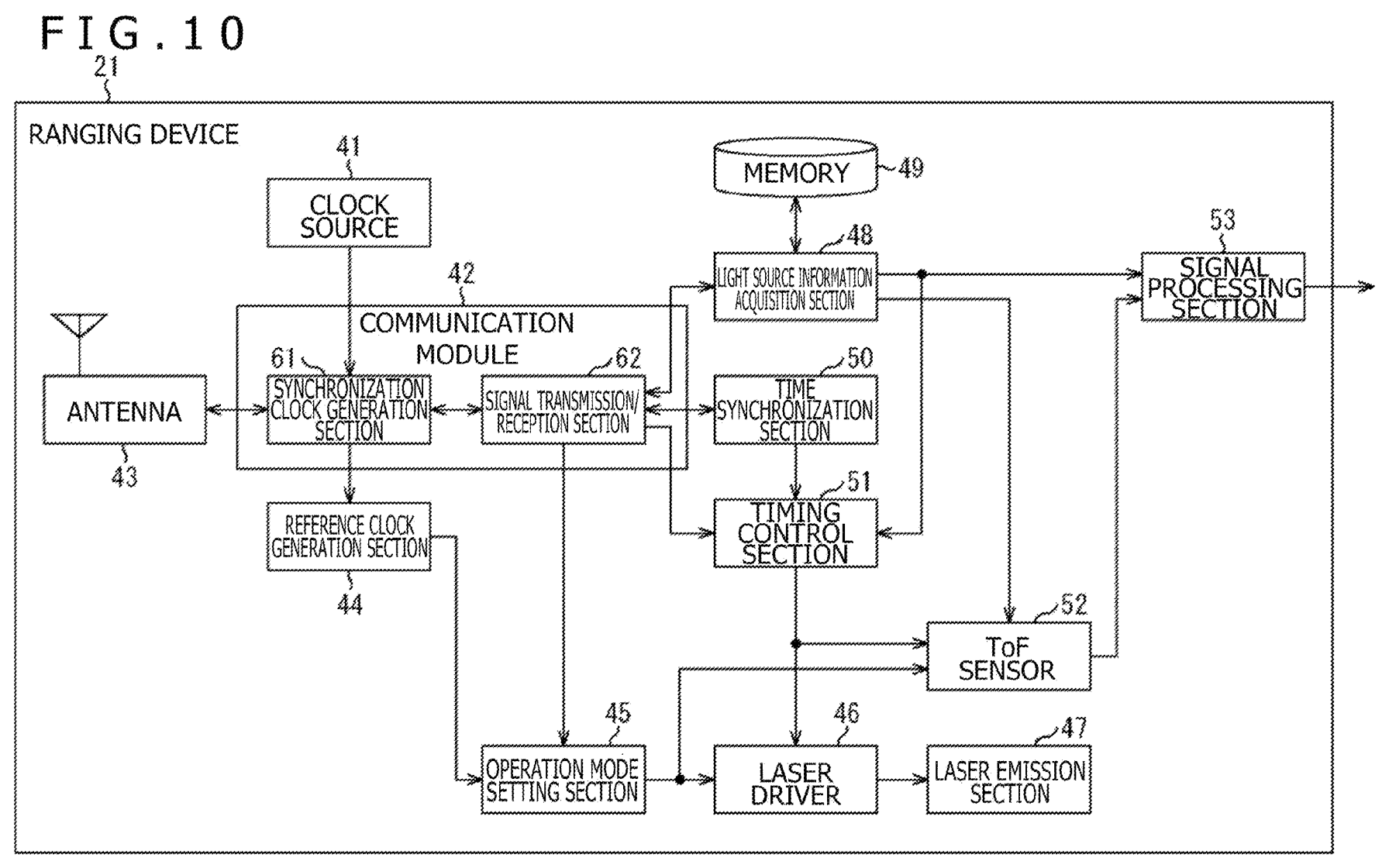

FIG. 10 is a block diagram illustrating a functional configuration example of a ranging device 21 that includes the light source 2 and the ranging unit 3.

The ranging device 21 includes a clock source 41, a communication module 42, an antenna 43, a reference clock generation section 44, an operation mode setting section 45, a laser driver 46, and a laser emission section 47.

In addition, the ranging device 21 includes a light source information acquisition section 48, a memory (storage section) 49, a time synchronization section 50, a timing control section 51, a ToF sensor 52, and a signal processing section 53.

The clock source 41 includes a crystal oscillator, for example. The clock source 41 generates a master clock to be used as a reference for both wireless communication and a light emission timing, and supplies the master clock to the communication module 42.

The communication module 42 controls wireless communication that is performed by the ranging device 21, and processes data based on a wireless signal transmitted and received via the antenna 43.

For example, during data transmission, the communication module 42 performs encoding and modulation, etc. with use of an encoding method and a modulation method which are decided in advance, etc. according to transmitted data, and causes the resultant transmission signal to be transmitted from the antenna 43. The transmitted data is supplied from the light source information acquisition section 48, the time synchronization section 50, the timing control section 51, or the like.

Further, during data reception, the communication module 42 performs reversed processing (decoding and demodulation) of the processing executed during data transmission, according to data received via the antenna 43, and supplies the resultant data to any one of blocks on the later stage. Specifically, the data is supplied to the operation mode setting section 45, the light source information acquisition section 48, the time synchronization section 50, the timing control section 51, or the like.

The communication module 42 includes a synchronization clock generation section 61 and a signal transmission/reception section 62.

During data transmission, the synchronization clock generation section 61 generates a transmission signal for which the frequency of a carrier wave is modulated to a predetermined modulation frequency, and transmits the transmission signal via the antenna 43. In addition, the synchronization clock generation section 61 generates a synchronization clock signal corresponding to the carrier wave frequency or the modulation frequency, and supplies the synchronization clock signal to the reference clock generation section 44.

During data reception, the synchronization clock generation section 61 generates a signal (synchronization clock signal) corresponding to a synchronization clock signal of a data transmission time, by executing a synchronization process on a signal received via the antenna 43, and supplies the generated signal to the reference clock generation section 44.

During data transmission, the signal transmission/reception section 62 encodes to-be-transmitted data by a predetermined encoding method, and supplies the encoded data to the synchronization clock generation section 61. Examples of the to-be-transmitted data include a unique ID for identifying the ranging device 21, the unique ID being supplied from the light source information acquisition section 48, light emission start time information regarding irradiation light to be emitted by the laser emission section 47, a light emission time of the irradiation light, and light source information that includes an operation mode, etc.

During data reception, the signal transmission/reception section 62 demodulates a signal supplied from the synchronization clock generation section 61, acquires transmitted data, and supplies the demodulated data to any one of the operation mode setting section 45, the light source information acquisition section 48, the time synchronization section 50, or the timing control section 51. For example, the signal transmission/reception section 62 supplies, to the operation mode setting section 45, an operation mode which is a part of the light source information acquired from a received signal, and supplies the whole light source information to the light source information acquisition section 48.

During data transmission, the antenna 43 amplifies a transmission signal supplied from the communication module 42, and transmits the amplified signal as an electromagnetic wave. Further, during data reception, the antenna 43 receives a transmission signal transmitted from a separate device, and supplies the transmission signal as the reception signal to the communication module 42.

The reference clock generation section 44 includes a PLL (Phase Locked Loop) circuit, etc. The reference clock generation section 44 generates, on the basis of a synchronization clock signal supplied from the synchronization clock generation section 61, a reference clock signal to be used as a reference for light emission from the laser emission section 47, and supplies the reference clock signal to the operation mode setting section 45.

With use of a reference clock signal supplied from the reference clock generation section 44, the operation mode setting section 45 generates a light emission pulse signal corresponding to an operation mode supplied from the signal transmission/reception section 62, and supplies the light emission pulse signal to the laser driver 46 and the ToF sensor 52.

In a case where the time division mode is set as the operation mode, for example, the operation mode setting section 45 supplies, as a light emission pulse signal, a reference clock signal supplied from the reference clock generation section 44, to the laser driver 46 and the ToF sensor 52 in a period of time during which light emission (or light reception) is performed by the corresponding ranging device 21 itself.

Alternatively, in a case where the modulation frequency mode is set as the operation mode, for example, the operation mode setting section 45 adjusts a frequency of a reference clock signal supplied from the reference clock generation section 44, to a modulation frequency of light to be emitted or received by the corresponding ranging device 21 itself, and supplies, as a light emission pulse signal, the reference clock signal of which frequency has been adjusted to the laser driver 46 and the ToF sensor 52.

Alternatively, in a case where the light emission pattern mode is set as the operation mode, for example, the operation mode setting section 45 generates a light emission pattern of light to be emitted or received by the corresponding ranging device 21 itself, on the basis of a reference clock signal supplied from the reference clock generation section 44, and supplies, as a light emission pulse signal, the light emission pattern to the laser driver 46 and the ToF sensor 52.

The laser driver 46 generates, on the basis of the light emission pulse signal supplied from the operation mode setting section 45, a drive signal for driving a VCSEL (Vertical Cavity Surface Emitting Laser) which is the light source of the laser emission section 47, and supplies the drive signal to the laser emission section 47.

Start timing control information defining a timing for starting light emission (or light reception) is supplied from the timing control section 51 to the laser driver 46. The start timing control information includes light emission start time information indicating a clock time for starting light emission or light reception, a light emission time of a VCSEL (exposure time of a pixel), the cycle of components and frames, and the like. At a predetermined timing based on the start timing control information, the laser driver 46 supplies a drive signal to the laser emission section 47.

The laser emission section 47 includes a VCSEL array (light source array) in which a plurality of VCSELs serving as light sources are arrayed on a plane, for example. The on/off of light emission from the laser emission section 47 is repeated in a predetermined cycle according to a drive signal supplied from the laser driver 46.

During light emission, the light source information acquisition section 48 acquires light source information from the memory 49, and supplies the light source information to the signal transmission/reception section 62. In addition, during light reception, the light source information acquisition section 48 acquires the received light source information from the signal transmission/reception section 62, and causes the memory 49 to store the acquired light source information. The light source information is further supplied to the timing control section 51, the ToF sensor 52, and the signal processing section 53, if needed. For example, light source calibration data is supplied to the ToF sensor 52.

The memory 49 stores the light source information, and supplies the light source information to the light source information acquisition section 48, if needed.

Here, examples of information that is stored as the light source information in the memory 49 are as follows.

Unique ID

Light emission time/exposure time

Light emission start time information/exposure start time information

Repetition frequency (direct ToF method)

Modulation frequency (indirect ToF method)

Component length (indirect ToF method)

Position and posture of a ranging device

Frame length

Wavelength of a light source

Light emission pattern

Light source calibration data (indirect ToF method)

Operation mode

The unique ID is information for identifying the ranging device 21. The light emission time indicates the length (the above-mentioned ON period) of time of one time light emission from the laser emission section 47 (light source 2). The light emission time on the light reception side corresponds to exposure time of the ToF sensor 52. The light emission start time information indicates a clock time for starting light emission of irradiation light from the laser emission section 47. The light emission start time information on the light reception side corresponds to a clock time for starting exposure of the ToF sensor 52.

The repetition frequency indicates a time interval of irradiation in the direct ToF method in which light irradiation and reception are repeated multiple times, or a time interval from the last irradiation start time to the next irradiation start time.

The modulation frequency indicates a modulation frequency in the indirect ToF method. The component length indicates the time length of one component in the indirect ToF method.

The position and the posture of the ranging device indicate the position and/or the posture of the ranging device 21 in a case where the ranging device 21 is equipped with an IMU (Inertial Measurement Unit), a magnetic sensor, a GNSS (Global Navigation Satellite System) receiver, or the like. This information may indicate either one of the position or the posture, or may indicate both the position and the posture.

The frame length indicates the time length of one frame in the indirect ToF method. The wavelength of a light source indicates the wavelength of irradiation light emitted by the laser emission section 47. For example, in a case where infrared rays are used as irradiation light, the wavelength thereof ranges from approximately 850 to 940 nm.

The light emission pattern indicates information for allowing the ranging device 21 to identify a light emission pattern of pulse light emitted from the light source 2.

The light source calibration data is provided for correcting a cyclic error in the indirect ToF method. For example, the calibration data includes a correction function, correction coefficient, or the like for correcting the non-linear relation depicted on the left side in FIG. 5 to the linear relation depicted on the right side of FIG. 5.

The operation mode indicates information indicating any one of the (1) time division mode, the (2) modulation frequency mode, and the (3) light emission pattern mode for taking measures against interference by irradiation light, and indicates details-of-operation-mode setting information that is required for each of the operation modes. For example, the details-of-operation-mode setting information for the (1) time division mode includes information indicating a time frame to be used by the corresponding ranging device 21, among divided time frames, and the details-of-operation mode setting information for the (3) light emission pattern mode includes information indicating a light emission pattern to be used by the corresponding ranging device 21, among a plurality of light emission patterns.

FIG. 11 depicts an operation example in which a plurality of light-emission-side ranging devices 21 and a light-reception-side ranging device 21 are operated in an operation mode set to the time division mode for preventing interference by irradiation light.

For example, the ranging device 21A and the ranging device 21B, which are light-emission-side ranging devices 21, emit light in a time-division manner. The light-reception-side ranging device 21E performs a light receiving operation in synchronization with a light emission timing of the ranging device 21B, so that interference by irradiation light is prevented. Accordingly, the ranging device 21E can receive reflection light resulting from irradiation light emitted by the ranging device 21B. A light emission timing at which reception target light is emitted by the ranging device 21B can be confirmed from the light emission start time information which indicates the light emission start time and which is a part of the light source information.

FIG. 12 depicts an operation example in which a plurality of light-emission-side ranging devices 21 and a light-reception-side ranging device 21 are operated in an operation mode set to the modulation frequency mode for preventing interference by irradiation light.

The ranging device 21A and the ranging device 21B are light-emission-side ranging devices 21, and the ranging device 21E is a light-reception-side ranging device 21, as in FIG. 11.

The ranging device 21A emits irradiation light at a modulation frequency of 71 MHz. The ranging device 21B emits irradiation light at a modulation frequency of 100 MHz. The light-reception-side ranging device 21E performs a light receiving operation in synchronization with the modulation frequency of the ranging device 21B, so that interference by irradiation light is prevented. Accordingly, the ranging device 21E can receive reflection light resulting from the irradiation light emitted by the ranging device 21B. The modulation frequency of reception target light emitted by the ranging device 21B can be confirmed from the modulation frequency information which indicates the modulation frequency and which is a part of the light source information.

FIG. 13 depicts an operation example in which a plurality of light-emission-side ranging devices 21 and a light-reception-side ranging device 21 are operated in an operation mode set to the light emission pattern mode for preventing interference by irradiation light.

The ranging device 21A and the ranging device 21B are light-emission-side ranging devices 21, and the ranging device 21E is the light-reception-side ranging device 21, as in FIG. 11.

The ranging device 21A emits irradiation light in a light emission pattern A. The ranging device 21B emits irradiation light in a light emission pattern B. The light-reception-side ranging device 21E performs a light receiving operation in synchronization with the light emission pattern B of the ranging device 21B, so that the light-reception-side ranging device 21E can receive reflection light resulting from the irradiation light emitted by the ranging device 21B while interference by irradiation light is prevented. The light emission pattern of to-be-received light from the ranging device 21B can be confirmed from the light emission pattern information which indicates the light emission pattern and which is a part of the light source information.

Referring back to FIG. 10, the time synchronization section 50 exchanges time stamps between a ranging device 21 that emits pulse light and a ranging device 21 that receives the pulse light, and achieves time synchronization with high precision. For example, with use of such a protocol as PTP (Precision Time Protocol), the time synchronization section 50 achieves time synchronization with precision that does not affect emission and reception of light at a light source and a sensor that are located in remote positions. Alternatively, the time synchronization section 50 may adopt, for example, a method of achieving synchronization among shutter timings of multiple cameras with use of wireless communication, the method being disclosed in "Sameer Ansari; Neal Wadhwa; Rahul Garg; Jiawen Chen, 'Wireless Software Synchronization of Multiple Distributed Cameras,' 2019 IEEE International Conference on Computational Photography, ICCP 2019," to achieve time synchronization.

The timing control section 51 generates start timing control information on the basis of the time information supplied from the time synchronization section 50 or the like, and supplies the start timing control information to the laser driver 46 and the ToF sensor 52.

The ToF sensor 52 receives refection light resulting from irradiation light emitted from the laser emission section 47 of the same ranging device 21 or of a separate ranging device 21 and reflected by an object, generates an image signal of a component, and supplies the image signal to the signal processing section 53. To the ToF sensor 52, a part of the light source information is supplied from the light source information acquisition section 48, if needed.

The ToF sensor 52 controls exposure of the pixels in the pixel array section on the basis of the light emission pulse signal corresponding to the operation mode supplied from the operation mode setting section 45, the light source information supplied from the light source information acquisition section 48, and the start timing control information supplied from the timing control section 51, and supplies image frames of the 0-degrees phase, the 90-degrees phase, the 180-degrees phase, or the 270-degrees phase to the signal processing section 53. In a case where light source calibration data is supplied from the light source information acquisition section 48 to the ToF sensor 52, the ToF sensor 52 executes a correction process of correcting a cyclic error, and calculates an image frame of each phase.

The signal processing section 53 acquires, from the ToF sensor 52, image frames of the 0-degrees phase, the 90-degrees phase, the 180-degrees phase, and the 270-degrees phase. Further, the signal processing section 53 acquires, from the light source information acquisition section 48, information regarding the modulation frequency of received reflection light, etc.

Then, for each pixel, the signal processing section 53 calculates the distance (depth value) d from the ranging unit 3 to the object 24 with use of the above expression (3) on the basis of the acquired image frames of the four phases and information regarding the acquired modulation frequency, etc. The signal processing section 53 generates a depth image in which the distances d from the ranging unit 3 to the object 24, the distances d being calculated for respective pixels, are stored as pixel values of the pixels, and outputs the depth image to a unit or block on the latter stage.

In a case where the ranging device 21 includes both the light source 2 and the ranging unit 3, that is, in a case where the ranging device 21 has both a light emission function and a light reception function, the ranging device 21 has the configuration explained so far.

It is to be noted that, in a case where the ranging device 21 has either one of a light emission function or a light reception function only, a block that is necessary only for the light emission function or light reception function is omitted, as appropriate.

Specifically, in a case where the ranging device 21 has only a function of emitting irradiation light, like the ranging device 21A, for example, a functional block diagram of the ranging device 21 is as depicted in FIG. 14.

On the other hand, in a case where the ranging device 21 has only a function of receiving reflection light, like the ranging device 21C, for example, a functional block diagram of the ranging device 21 is as depicted in FIG. 15.

<4. Process Flow of Ranging Device>

Next, an explanation will be given of control for achieving frequency synchronization and phase synchronization with pulse light outputted from each of the light sources 2 of the ranging devices 21 having the light emission function, specifically, the ranging device 21A, the ranging device 21B, and the ranging device 21D. As a result of achievement of frequency synchronization and phase synchronization with each of the ranging devices 21 having the light emission function, the ranging unit 3 of a freely-selected ranging device 21 receives irradiation light emitted from the light source 2 of a separate ranging device 21, so that the distance to a freely-selected object 24 can be measured.

First, a light emission control process in a light-emission-side ranging device 21 that emits pulse light will be explained with reference to the flowchart in FIG. 16. This process starts when the light-emission-side ranging device 21 is turned on, for example.

Figure 17:
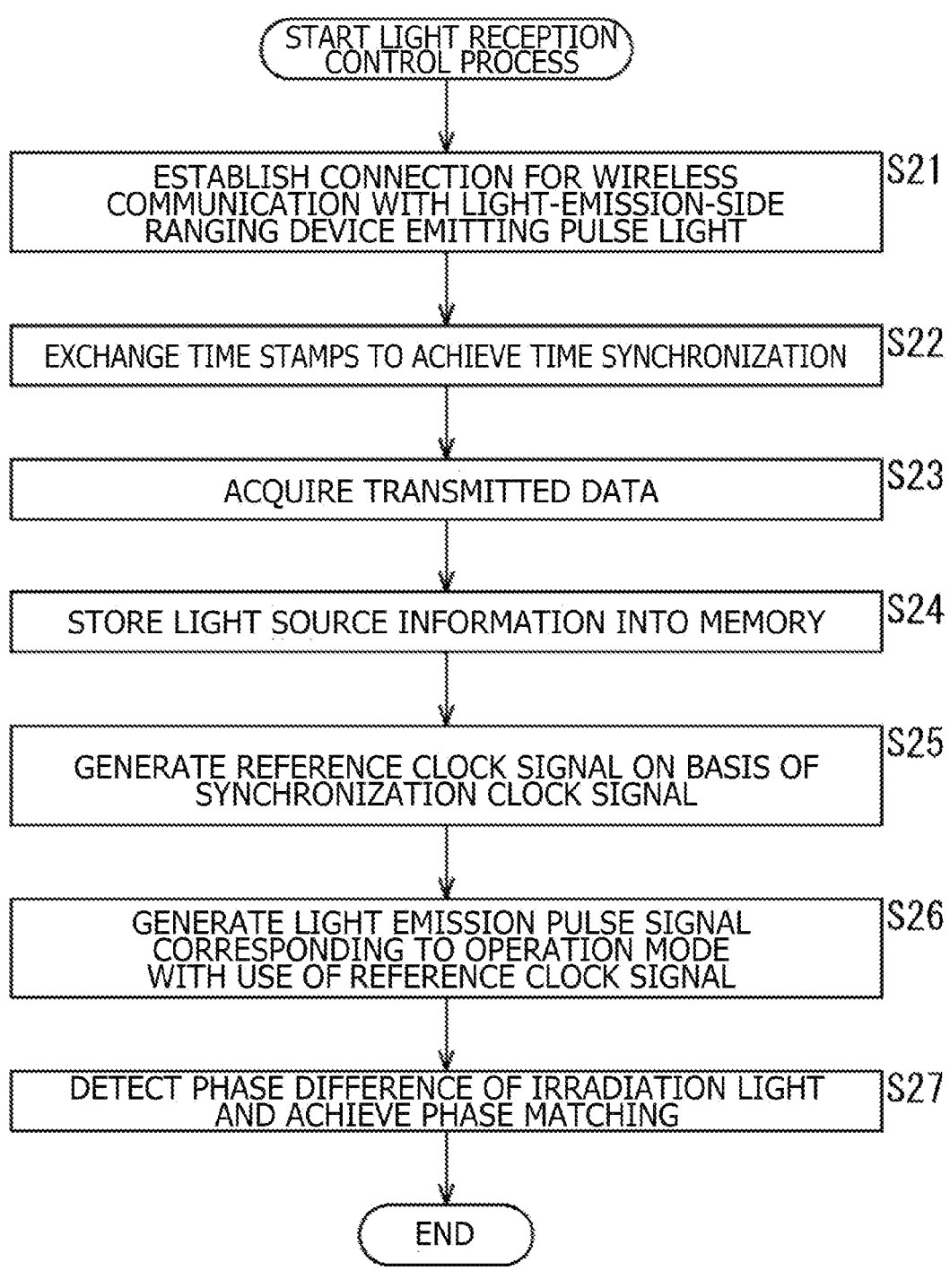
FIG. 17 is a flowchart depicting a light emission control process in a light-reception-side ranging device.

It is to be noted that such a condition that information regarding previously measured positions (relative positions) of the ranging devices 21 is stored as light source information in the memory 49 of the ranging device 21 is a prerequisite for the light emission control process in FIG. 16 which is executed by the light-emission-side ranging device 21 and the light reception control process in FIG. 17 which is executed by the light-reception-side ranging device 21.

First, in step S1, the communication module 42 establishes wireless communication connection through the network 23 or directly with a light-reception-side ranging device 21 that receives pulse light emitted from the light-emission-side ranging device 21. For example, in a wireless LAN (Local Area Network) standardized by IEEE (The Institute of Electrical and Electronic Engineers) 802.11, a transmission opportunity is obtained by a mechanism called CSMA/CA (Carrier Sense Multiple Access/Collision Avoidance) which is a mechanism for avoiding mutual interference between terminals, so that connection with a communication partner is established.

During connection of wireless communication, the synchronization clock generation section 61 of the communication module 42 generates a transmission signal on the basis of a master clock supplied from the clock source 41, and transmits the transmission signal via the antenna 43. In addition, the synchronization clock generation section 61 generates a synchronization clock signal corresponding to the frequency (carrier wave frequency or modulation frequency) of the transmission signal, and supplies the synchronization clock signal to the reference clock generation section 44.

In step S2, the time synchronization section 50 exchanges time stamps with the light-reception-side ranging device 21 that receives pulse light, and achieves time synchronization with high precision. Information regarding the synchronized time is supplied to the timing control section 51.

In step S3, the light source information acquisition section 48 acquires light source information from the memory 49, and supplies the light source information to the signal transmission/reception section 62.

In step S4, the signal transmission/reception section 62 of the communication module 42 encodes to-be-transmitted data by a predetermined encoding method, and supplies the encoded data to the synchronization clock generation section 61. For example, the to-be-transmitted data includes at least one of a unique ID, a light emission time, light emission start time information, an operation mode, etc. which are included in the light source information supplied from the light source information acquisition section 48. In addition, the signal transmission/reception section 62 supplies the operation mode to the operation mode setting section 45.

In step S5, the reference clock generation section 44 generates a reference clock signal on the basis of the synchronization clock signal supplied from the synchronization clock generation section 61, and supplies the reference clock signal to the operation mode setting section 45.

In step S6, the operation mode setting section 45 generates a light emission pulse signal corresponding to the operation mode supplied from the signal transmission/reception section 62, with use of the reference clock signal supplied from the reference clock generation section 44, and supplies the light emission pulse signal to the laser driver 46.

In step S7, the timing control section 51 generates start timing control information on the basis of the time information supplied from the time synchronization section 50, etc., and supplies the start timing control information to the laser driver 46.

In step S8, the laser driver 46 supplies a drive signal to the laser emission section 47 at a predetermined timing based on the start timing control information.

In step S9, the on and off of light emission by the laser emission section 47 are repeated in a predetermined cycle, according to the drive signal supplied from the laser driver 46.

Thus, the light emission control process is completed.

Next, a light reception control process in which a light-reception-side ranging device 21 that receives pulse light will be explained with reference to a flowchart in FIG. 17. This process starts when the light-reception-side ranging device 21 is turned on, for example.

First, in step S21, the communication module 42 establishes wireless communication through the network 23 or directly with a light-emission-side ranging device 21 that emits pulse light.

The synchronization clock generation section 61 of the communication module 42 generates a signal corresponding to a synchronization clock signal of a data transmission time by executing a synchronization process on a transmission signal received via the antenna 43 through the wireless communication connection, and supplies the generated signal to the reference clock generation section 44. As a result, an operation on the light reception side is controlled on the basis of the synchronization clock signal for which one clock source 41 on the light emission side is used as a reference, and frequency synchronization is achieved between the light emission side and the light reception side.

In step S22, the time synchronization section 50 exchanges time stamps with the light-emission-side ranging device 21 that emits pulse light, and achieves time synchronization with high precision. Information regarding the synchronized time is supplied to the timing control section 51.

In step S23, the signal transmission/reception section 62 demodulates the signal supplied from the synchronization clock generation section 61, and acquires transmitted data. The signal transmission/reception section 62 supplies an operation mode acquired from a received signal, for example, to the operation mode setting section 45, and supplies the remaining light source information to the light source information acquisition section 48.

In step S24, the light source information acquisition section 48 causes the memory 49 to store the light source information acquired from the signal transmission/reception section 62, and further, supplies a part of the light source information to the ToF sensor 52 and the signal processing section 53.

In step S25, the reference clock generation section 44 generates a reference clock signal on the basis of the synchronization clock signal supplied from the synchronization clock generation section 61, and supplies the reference clock signal to the operation mode setting section 45.

In step S26, the operation mode setting section 45 generates a light emission pulse signal corresponding to the operation mode supplied from the signal transmission/reception section 62, with use of the reference clock signal supplied from the reference clock generation section 44, and supplies the light emission pulse signal to the ToF sensor 52.

In step S27, the ToF sensor 52 receives reflection light reflected by the predetermined object 24, on the basis of the light emission pulse signal, and the signal processing section 53 detects, on the basis of the light reception result, the phase difference in the irradiation light from the separate ranging device 21, and performs phase matching.

Even when the frequency synchronization is achieved, timings of light emission pulses applied by the respective ranging devices 21 are slightly deviated from each other. Therefore, the phase difference needs to be compensated.

For example, the ranging device 21B emits irradiation light from the light source 2 of the ranging device 21B, as illustrated in FIG. 18, and acquires the three-dimensional position of a point F on the object 24 in a light source coordinate system.

Next, in order to prevent interference by irradiation light, for example, the ranging device 21B receives reflection light resulting from irradiation light emitted from the light source 2 of the ranging device 21A in a time-division manner and reflected by a point F on the object 24, and acquires a distance $D_{AFB}$ on the basis of the light reception result. Here, the acquired distance $D_{AFB}$ is expressed by the following expression.

$$D_{AFB}=|\vec{V}_{AF}|+|\vec{V}_{FB}|+C_{AB} \qquad \text{[Math. 7]}$$

That is, the distance $D_{AFB}$ is equal to the total value of the distance $|V_{AF}|$ from the ranging device 21A to the point F on the object 24, $|V_{FB}|$ from the point F on the object 24 to the ranging device 21B, and the distance $C_{AB}$ corresponding to the phase deviation of the light source 2 of the ranging device 21A from the phase of the ranging device 21B. Here, $V_{AF}$ represents a vector from the ranging device 21A to the point F of the object 24, and $V_{FB}$ represents a vector from the point F on the object 24 to the ranging device 21B. It is to be noted that symbols (arrow symbols ($\rightarrow$) which are put above $V_{AF}$ and $V_{FB}$ in FIG. 18) indicating vectors will be omitted in the present specification. $|V|$ represents the absolute value of the vector V.

The signal processing section 53 transforms the distance $C_{AB}$ to the phase deviation $T_{AB}$ with use of the light speed. Then, a command for deviating the phase of the light source 2 of the ranging device 21A by the phase deviation $T_{AB}$ is issued through wireless communication, so that the phase difference between the ranging devices 21A and 21B can be compensated.

Thus, the light reception control process is completed.

According to the light emission control process in the light-emission-side ranging device 21 and the light reception control process in the light-reception-side ranging device 21, the light-reception-side ranging device 21 can generate a synchronization clock signal in frequency synchronization with the synchronization clock signal generated by the light-emission-side ranging device 21, by executing a synchronization process on a transmission signal transmitted by the light emission side through wireless communication. Subsequently, time synchronization is achieved, and a reference clock signal which serves as a reference clock for a light emission timing and a light reception timing is generated.

That is, a light emission timing of the light-emission-side ranging device 21 and a light reception timing of the light-reception-side ranging device 21 are both controlled on the basis of one clock source 41 on the light emission side.

Consequently, even when the light-emission-side ranging device 21 and both the light-reception-side ranging devices 21 are separately located in remote positions, frequency synchronization between the laser emission section 47 (light source) and the ToF sensor 52 can be achieved. Accordingly, an error in a distance measurement result can be reduced.

In a case where there are a plurality of the ranging devices 21 that emit pulse light, and where three or more ranging devices 21 are simultaneously operated in any one operation mode among the (1) time division mode, the (2) modulation frequency mode, and the (3) light emission pattern mode, as depicted in FIGS. 11 to 13, the ranging devices 21 each generate a synchronization clock signal or a reference clock signal in synchronization with a master clock of the clock source 41 of any one of the ranging devices 21.

It is to be noted that, in a case where the operation mode is set to the modulation frequency mode or the light emission pattern mode, frequency synchronization is necessary but time synchronization is unnecessary.

In addition, according to the above-mentioned light reception control process, the phase difference between the light-emission-side ranging device 21 and the light-reception-side ranging device 21 can be detected, and the phase difference can be compensated.

In the ranging system 11, a state in which frequency synchronization and phase synchronization of light emission pulses from a plurality of the ranging devices 21 each having a light emission function are achieved is constructed. Accordingly, for example, the ranging unit 3 of the ranging device 21E mounted on the mobile carrier vehicle 22 can measure the distance to the freely-selected object 24 on the basis of irradiation light emitted from the light sources 2 of the plurality of ranging devices 21. A method by which the ranging unit 3 of the ranging device 21E mounted on the carrier vehicle 22 measures the distance to the freely-selected object 24 will be explained later.

The light-emission-side ranging device 21 and the light-reception-side ranging device 21 can transmit and receive light source information through wireless communication. Examples of information that can be transmitted and received as light source information include a unique ID, a light emission time, light emission start time information, a repetition frequency, a modulation frequency, a component length, the position and posture of a ranging device, a frame length, the wavelength of a light source, a light emission pattern, light source calibration data, an operation mode, and the like as previously explained. However, not all the types of the information are needed to be transmit and receive. Some parts of the information may be previously stored as fixed data in the memory 49.

In a case where the separate ranging devices 21 are provided on a light emission side and a light reception side, it may be difficult for the light-reception-side ranging device 21 which is a separate device to hold in advance light source calibration data. In such a case, light source calibration data is transmitted as a part of the light source information from the light emission side to the light reception side, so that the light reception side can detect a phase difference precisely.

<5. Modification of First Embodiment>

In the above-mentioned first embodiment, the plurality of ranging devices 21 constituting the ranging system 11 are configured to achieve synchronization of synchronization clock signals and reference clock signals with the clock source 41 of any one of the ranging devices 21.

However, a clock source of a device other than the plurality of ranging devices 21 constituting the ranging system 11 may be used as a clock source with which the ranging devices 21 achieve synchronization.

For example, a signal (hereinafter, referred to as a GNSS signal) of a global navigation satellite system (GNSS) such as the GPS (Global Positioning System), the GLONASS (Global Navigation Satellite System), the Galileo, or the quasi-zenith satellite system (QZSS) has a function of outputting a high-precision clock signal and high-precision time information. The plurality of ranging devices 21 constituting the ranging system 11 may each be configured to receive a GNSS signal and achieve synchronization with the same clock signal and time information acquired from the GNSS signal.

FIG. 19 is a block diagram of a ranging device 21' that achieves time synchronization on the basis of a GNSS signal.

Sections in FIG. 19 corresponding to those in FIG. 10 are denoted by the same reference signs, and an explanation thereof is omitted, as appropriate.

FIG. 19 illustrates two ranging devices 21' each having both a light emission function and a light reception function. Then, a ranging device 21'-1 that is one of the two ranging devices 21' is disposed on a light emission side, and a ranging device 21'-2 that is the other of the two ranging devices 21' is disposed on a light reception side. The ranging devices 21' of the same configuration each operate as a light emission side or a light reception side, according to pre-defined setting information (light source information), for example.

The ranging device 21' includes a GNSS reception section 81, a time information setting section 82, the reference clock generation section 44, the operation mode setting section 45, the laser driver 46, the laser emission section 47, the light source information acquisition section 48, the memory 49, the time synchronization section 50, the timing control section 51, the ToF sensor 52, and the signal processing section 53.

In other words, the ranging device 21' is obtained by modifying the ranging device 21 in FIG. 10 in such a manner as to include the GNSS reception section 81 and the time information setting section 82 in place of the clock source 41, the communication module 42, and the antenna 43.

The GNSS reception section 81 receives a GNSS signal from a GNSS satellite 83, and supplies the GNSS signal to the time information setting section 82 and the reference clock generation section 44.

The time information setting section 82 acquires high-precision time information from the GNSS signal supplied from the GNSS reception section 81, and performs time setting according to a standard time.

The reference clock generation section 44 extracts a clock signal from the GNSS signal, generates, on the basis of the clock signal, a reference clock signal to be used as a reference for light emission from the laser emission section 47, and supplies the reference clock signal to the operation mode setting section 45.

The memory 49 stores light source information, and supplies the light source information to the light source information acquisition section 48, if needed. The light source information stored in the memory 49 includes information that is necessary for the corresponding ranging device 21' to operate as a light emission side or a light reception side. For example, data regarding the operation mode, the light emission pattern, light source calibration data, etc. of the light-emission-side ranging device 21' is previously stored in the memory 49 of the light-reception-side ranging device 21'-2.

Since the ranging device 21' has the above-mentioned configuration, a light emission timing and a light reception timing can be synchronized with use of a clock source of another device (GNSS satellite 83) that is separate from the light-emission-side ranging device 21' and the light-reception-side ranging device 21'. That is, frequency synchronization between the laser emission section 47 on the light emission side and the ToF sensor 52 on the light reception side can be achieved. Accordingly, an error in a distance measurement result can be reduced.

In the above modification, a GNSS signal is received, synchronization of a time with a clock is achieved on the basis of the received GNSS signal, and transmission and reception of data regarding the light source information, etc. are not additionally performed because such transmission and reception are previously set. However, data regarding the light source information, etc. may be transmitted and received through another wireless communication such as WiFi (registered trademark) or Bluetooth (registered trademark).

It is to be noted that, besides the above-mentioned GNSS signal, a wireless signal of UWB (Ultra Wide Band) communication may be used as a signal for outputting a high-precision clock signal and high-precision time information. In this case, the GNSS reception section 81 of the ranging device 21' serves as a UWB reception section 81 that receives a wireless signal of UWB (Ultra Wide Band) communication.

Further, in FIG. 19, the light-emission-side ranging device 21' and the light-reception-side ranging device 21' have the same configuration, and each ranging device 21' can be set as either the light emission side or the light reception side. However, in a case where the ranging device 21' is limited to the light emission side or the light reception side, an unnecessary section therefor can be omitted, as in FIGS. 14 and 15.

<6. Second Embodiment of Ranging System>

FIG. 20 illustrates a configuration example of a ranging system according to a second embodiment of the present disclosure.

A ranging system 11 according to the second embodiment in FIG. 20 includes a plurality of drones 101. Each drone 101 is a mobile flight body equipped with a plurality of rotors. Each drone 101 includes a ranging device including both the light source 2 and the ranging unit 3.

For convenience of explanation, it is assumed that the ranging system 11 includes two drones 101A and 101B, as illustrated in FIG. 20, although the ranging system 11 can include three or more drones 101. The drones 101A and 101B have the same configuration, and each have a different unique ID for identifying the respective drone bodies. For example, the unique ID of the drone 101A is "0" (ID0), and the unique ID of the drone 101B is "1" (ID1).

The drone 101A applies, to the drone 101B, irradiation light at a predetermined modulation frequency, and further, receives irradiation light applied from the drone 101B. Also, the drone 101B applies, to the drone 101A, irradiation light at a predetermined modulation frequency, and further, receives irradiation light applied from the drone 101A.

A synchronization clock signal and a reference clock signal for the drones 101A and 101B are controlled to be synchronized with each other on the basis of a GNSS signal supplied from a GNSS satellite 102, as in the modification of the first embodiment.

The drones 101A and 101B report, to each other, light propagation time or distances measured by each of the drones 101A and 101B. Accordingly, the distance (hereinafter, referred to as a relative distance) to the counterpart drone can be precisely measured.

The principle of calculating a relative distance will be explained with reference to FIGS. 21 to 23.

Figure 21:
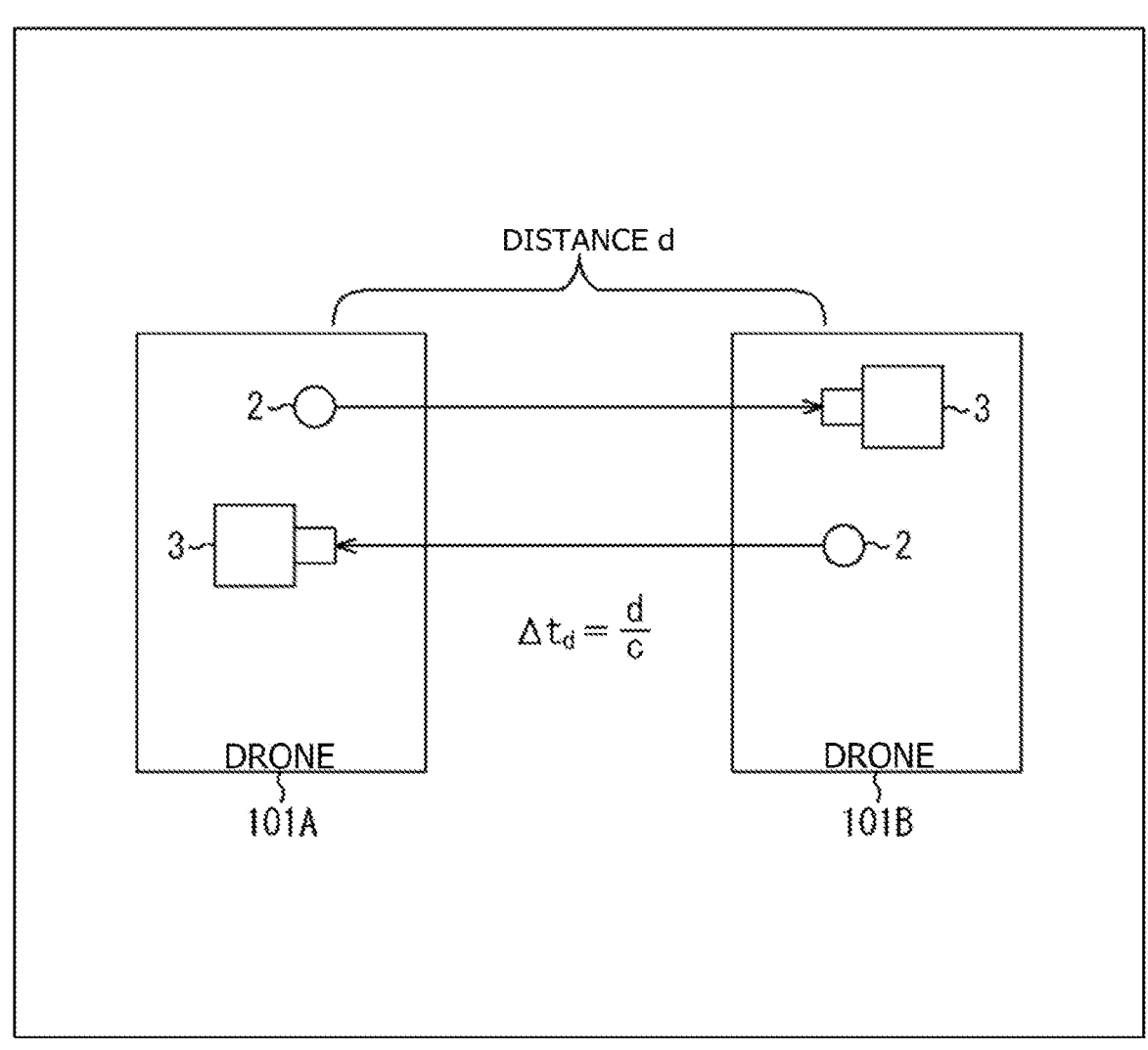
FIG. 21 is a diagram for explaining a principle of calculating a relative distance.

First, as illustrated in FIG. 21, the drone 101A and 101B each include the light source 2 and the ranging unit 3.

The light source 2 of the drone 101A applies, to the drone 101B, irradiation light at a predetermined modulation frequency. In addition, the ranging unit 3 of the drone 101A receives irradiation light applied from the light source 2 of the drone 101B.

The light source 2 of the drone 101B applies, to the drone 101A, irradiation light at a predetermined modulation frequency. In addition, the ranging unit 3 of the drone 101B receives irradiation light applied from the light source 2 of the drone 101A.

When a relative distance between the drones 101A and 101B is defined as d, light propagation time $\Delta t_d$ between the drones 101A and 101B is expressed by an expression (8).

[Math. 8]

24

-continued $$\Delta t_d = \frac{d}{c} \qquad (8)$$

In the expression (8), c represents a light speed.

FIG. 22 is a diagram schematically depicting pulse light applied by the drones 101A and 101B in the indirect ToF method.

The drones 101A and 101B share high-precision time information on the basis of a GNSS signal supplied from the GNSS satellite 102, so that irradiation light emission timings can be matched. However, it is difficult to match timings of emission pulses.

Specifically, even in a case where matching of light emission timings of the drones 101A and 101B is made, the drone 101B considers that, in some cases, a light emission pulse from the drone 101A is delayed by $\Delta t_{offset}$, as depicted in FIG. 22.

That is, the light propagation time $\Delta t_{1-2}$ between the drones 101 which is observed by the ranging unit 3 of the drone 101B is expressed by the following expression (9) because the light propagation time is affected by the offset $\Delta t_{offset}$ corresponding to the deviation of a light emission timing.

$$\Delta t_{1-2} = \Delta t_d + \Delta t_{offset} \qquad (9)$$

On the other hand, the drone 101A considers that a light emission pulse from the drone 101B is advanced by $\Delta t_{offset}$. Thus, light propagation time $\Delta t_{2-1}$ between the drones 101 which is observed by the ranging unit 3 of the drone 101A is expressed by the following expression (10).

$$\Delta t_{2-1} = \Delta t_d - \Delta t_{offset} \qquad (10)$$

Then, the drones 101A and 101B report, to each other, propagation time $\Delta t$ measured by each of the drones 101A and 101B, so that precise light propagation time $\Delta t_d$ from which the influence of the offset $\Delta t_{offset}$ has been removed can be obtained by the following expression (11). Then, a precise relative distance d can be obtained by an expression (12) which is a modification of the expression (8).

[Math. 9]

$$\Delta t_d = \frac{1}{2}(\Delta t_{1-2} + \Delta t_{2-1}) \qquad (11)$$

$$d = c \cdot \Delta t_d \qquad (12)$$

It is to be noted that the drones 101A and 101B may report the propagation time $\Delta t$ to each other, or may report, to each other, the distances d each obtained by multiplying the propagation time $\Delta t$ and the light speed c and may calculate the average of the distances d. Also in the latter case, a precise relative distance d can be obtained.

FIG. 23 is a diagram schematically depicting pulse light applied from the drone 101A and 101B in the direct ToF method.

Also in the direct ToF method, an expression can be defined as in the same manner as that in the indirect ToF method explained in FIG. 22.

That is, as depicted in FIG. 23, in a case where the drone 101B considers that a light emission pulse from the drone 101A is delayed by $\Delta t_{offset}$ from that of the drone 101B, the light propagation time $\Delta t_{1-2}$ between the drones 101 which is observed by the ranging unit 3 of the drone 101B is expressed by the expression (9).

On the other hand, light propagation time $\Delta t_{2-1}$ between the drones 101 which is observed by the ranging unit 3 of the drone 101A is expressed by the expression (10).

Therefore, precise light propagation time $\Delta t_d$ from which the influence of the offset $\Delta t_{offset}$ has been removed can be obtained by the expression (11). A precise relative distance d can be obtained by the expression (12).

<Block Diagram of Drone>

Figure 24:
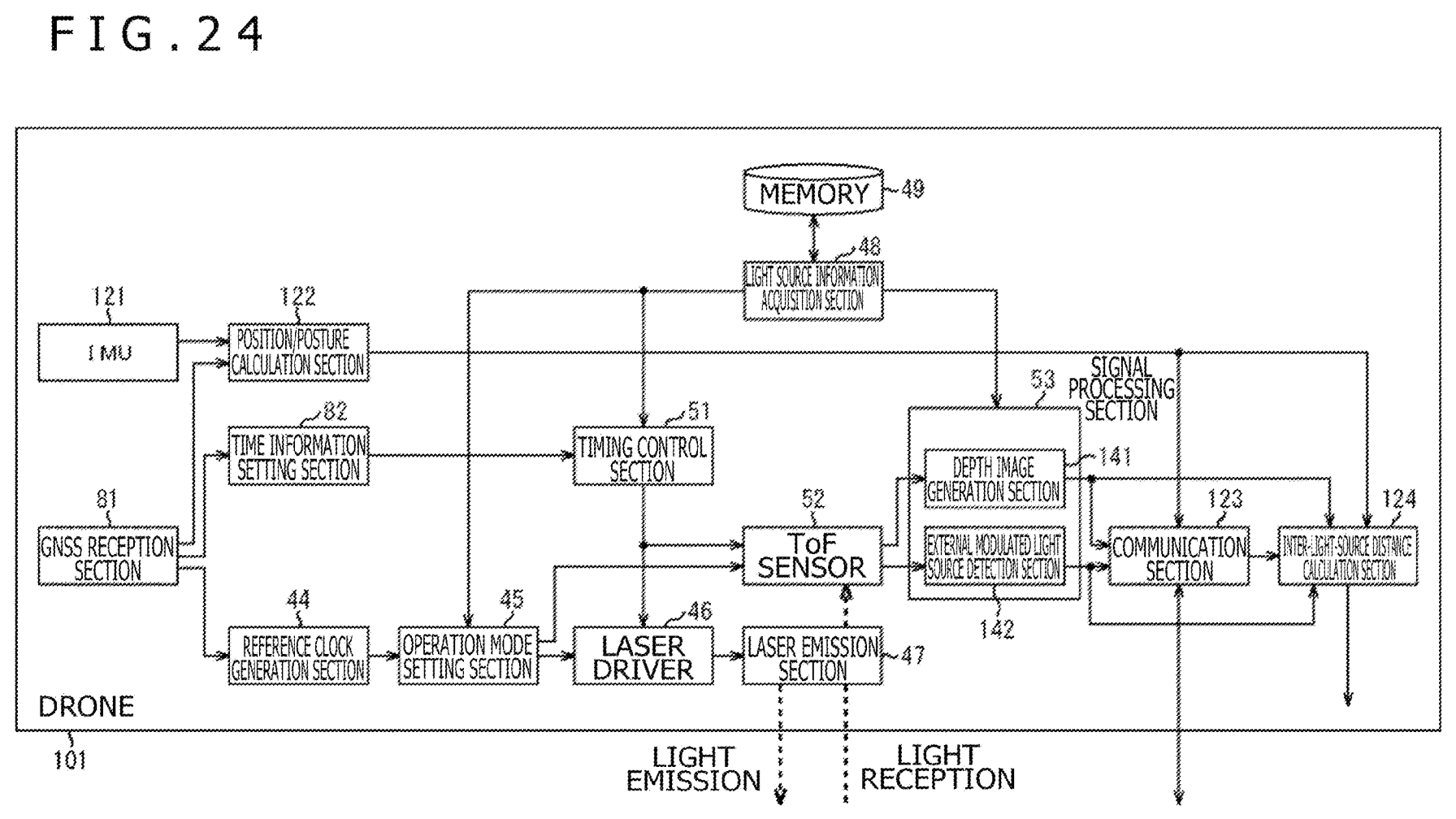

FIG. 24 is a block diagram concerning a ranging device that is incorporated in the drone 101.

Sections in FIG. 24 corresponding to those of the ranging device 21' in FIG. 19 are also denoted by the same reference signs, and an explanation thereof will be omitted, as appropriate.

The (ranging device of the) drone 101 has a configuration obtained by modifying the configuration of the ranging device 21' in FIG. 19 to further include an IMU 121, a position/posture calculation section 122, a communication section 123, and an inter-light-source distance calculation section 124.

In the second embodiment, the light source information acquisition section 48 acquires light source information, such as an operation mode, stored in the memory 49, and supplies the light source information to the operation mode setting section 45, the timing control section 51, and the signal processing section 53, etc., as appropriate.

The IMU 121 is configured to detect angles (or angular velocities) and accelerations in three-axis directions of the drone 101, and supplies a signal indicating the detection result to the position/posture calculation section 122.

The position/posture calculation section 122 detects the position and the posture of the drone 101 on the basis of the detection signal supplied from the IMU 121 and the positional information supplied from the GNSS reception section 81, and supplies the position and the posture to the communication section 123 and the inter-light-source distance calculation section 124. The position/posture calculation section 122 may detect either one of the position or the posture of the drone 101.

It is to be noted that the IMU 121 is not an essential section, and thus, may be omitted. In this case, the position/posture calculation section 122 detects the position and the posture of the drone 101 on the basis of the positional information supplied from the GNSS reception section 81. Further, a different type of sensor such as a magnetic sensor or a pressure sensor may be provided in place of the IMU 121 such that the position and the posture of the drone 101 are detected on the basis of a detection signal obtained by the sensor. Alternatively, both the IMU 121 and the magnetic sensor or the like may be provided.

The signal processing section 53 includes a depth image generation section 141 and an external modulated light source detection section 142.

The depth image generation section 141 generates a depth image in which the distance d to the counterpart drone 101, the distance d being calculated for each pixel, is stored as a pixel value of the pixel. The generated depth image is supplied to the communication section 123 and the inter-light-source distance calculation section 124.

The external modulated light source detection section 142 detects the position (light source position) of the light source 2 (laser emission section 47) of the counterpart drone 101 that is emitting light.

In the indirect ToF method, the external modulated light source detection section 142 detects the position of the light source with use of a confidence image in which a confidence value which indicates a light intensity is stored as a pixel value of each pixel.

Figure 25:
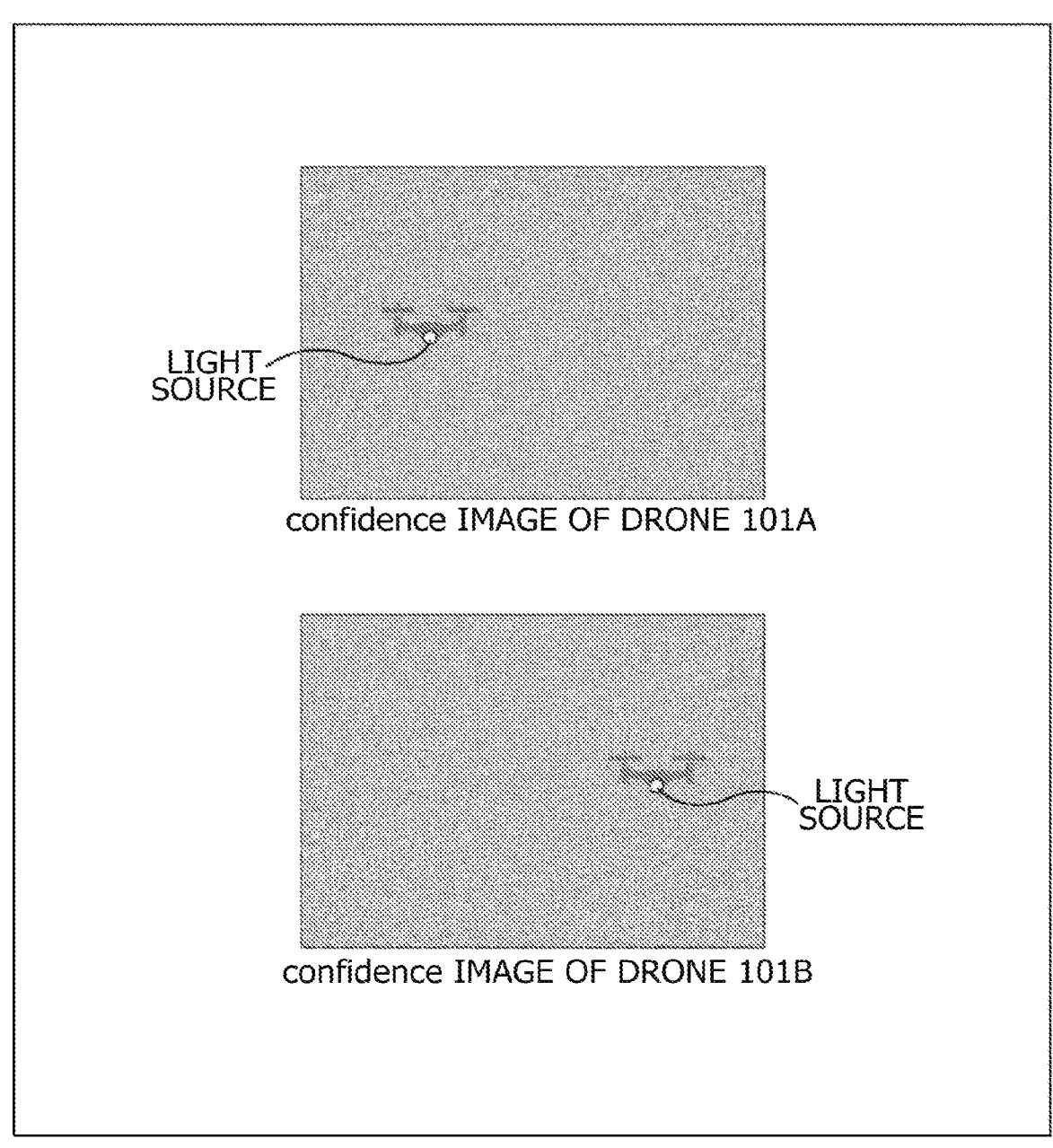
FIG. 25 is a diagram depicting an example of confidence images observed by drones.

FIG. 25 depicts an example of a confidence image obtained when the drone 101A observes the drone 101B, and an example of a confidence image obtained when the drone 101B observes the drone 101A.

The external modulated light source detection section 142 detects, as a light source position, the position of a pixel having a pixel value (confidence value) that is equal to or greater than a threshold decided in advance and is the highest of the pixels in a confidence image.

In contrast, in the direct ToF method, the external modulated light source detection section 142 detects, as a light source position, the position of a pixel having a peak value of a generated histogram, the peak value being equal to or greater than a threshold decided in advance and being the highest.

The drone 101A and the drone 101B can emit light in a time-division manner such that a light emission operation and a light reception operation are separately performed. Alternatively, in an environment where no object is located around the drone 101A and the drone 101B, e.g. in a case where the background excluding the drones 101 is the sky, the drone 101A and the drone 101B may simultaneously emit light and receive light.

Then, the signal processing section 53 supplies, to the communication section 123 and the inter-light-source distance calculation section 124, the light source position detected by the external modulated light source detection section 142 and a distance $d_1$ detected at the light source position.

The communication section 123 communicates with the counterpart drone 101 through wireless communication such as WiFi (registered trademark), Bluetooth (registered trademark), or a mobile body communication such as what is generally called a 4G or 5G line, for example. The communication section 123 transmits the light source position of the counterpart drone 101 and the distance $d_1$ to the counterpart drone 101 obtained by the signal processing section 53 and a rough self-position detected by the position/posture calculation section 122 to the counterpart drone 101 through wireless communication. In addition, the communication section 123 receives the light source position and a distance $d_2$ detected by the counterpart drone 101, and supplies the light source position and the distance $d_2$ to the inter-light-source distance calculation section 124.

The inter-light-source distance calculation section 124 acquirers, from the communication section 123, the light source position, the distance $d_2$, and the rough position received from the counterpart drone 101 through wireless communication. In addition, the inter-light-source distance calculation section 124 acquires, from the signal processing section 53, the distance $d_1$ to the counterpart drone 101 detected by self-measurement and the light source position of the counterpart drone. With use of the distance $d_1$ obtained by self-measurement and the distance $d_2$ measured by the counterpart drone 101, the inter-light-source distance calculation section 124 calculates a precise relative distance d from which the influence of the above offset $\Delta t_{offset}$ has been removed. In addition, the inter-light-source distance calculation section 124 increases the precision of the relative distance d with use of rough self-position and self-posture detected by the position/posture calculation section 122.

FIG. 26 depicts diagrams for explaining a process of increasing the precision of a relative distance d with use of a rough self-posture detected by the position/posture calculation section 122.

On the basis of the principle of a pinhole camera, the direction of a counterpart drone 101 is obtained from a light source position detected in a confidence image. In addition, a precise relative distance d is obtained from the selfdetected distance $d_1$ to the counterpart drone 101 and the distance $d_2$ transmitted from the counterpart drone 101.

On this condition, the position and the posture are not uniquely determined due to arbitrariness of rotation about a visual line direction, as illustrated in A of FIG. 26.

Therefore, with use of a detection result obtained by the IMU 121, the direction of gravity on the ToF sensor 52 is identified, as illustrated in B of FIG. 26. Accordingly, the detection result obtained by the IMU 121 is used to cancel the arbitrariness. That is, both an image observed by the ToF sensor 52 of the drone 101A and an image observed by the ToF sensor 52 of the drone 101B may be used to uniquely determine relative position and posture on the basis of the detection result obtained by the IMU 121. In a case where a magnetic sensor is provided in place of the IMU 121, the relative position and posture can be determined because the magnetic sensor can also detect the common azimuth of the drone 101A and the drone 101B.

Since the posture (inclination) of the drone 101 detected by the IMU 121 is used in place of a high-precision distance d obtained by the drone 101A and the drone 101B reporting the respective distances d to each other, the precision of the relative position and posture can be increased.

FIG. 27 is a diagram for explaining a process of increasing the precision of a relative distance d with use of the rough self-position detected by the position/posture calculation section 122 and the rough position of the counterpart drone 101 transmitted from the counterpart drone 101.

In the indirect ToF method, a measurable distance d is limited by the modulation frequency. For example, in a case where the modulation frequency is 20 MHz, one phase cycle corresponds to approximately 15 m. As illustrated in FIG. 27, a phase difference detected for a relative distance d of 15 m is equal to a phase difference detected for a relative distance of 30 m. Therefore, the distance of 15 m cannot be distinguished from the distance of 30 m.

As a measure against this, whether the relative distance d is 15 m or 30 m may be determined with use of the rough self-position of the drone 101 detected by the position/posture calculation section 122 and the rough position of the counterpart drone 101 transmitted from the counterpart drone 101. That is, with use of the rough self-position detected by the position/posture calculation section 122, the precision of the relative distance d can be increased.

It is noted that a method of setting a plurality of modulation frequencies and deciding a final distance from among the common distances obtained by results of measurement carried out at the respective modulation frequencies may be adopted for the determination on whether the relative distance d is 15 m or 30 m.

<Process Flow of Relative Distance Measuring Process>

Next, a process of measuring a relative distance between the drones 101 will be explained with reference to a flowchart in FIG. 28. This process is started after the drone 101 starts flying, for example.

First, in step S41, the GNSS reception section 81 receives a GNSS signal from the GNSS satellite 83, and supplies the GNSS signal to the time information setting section 82 and the reference clock generation section 44. The time information setting section 82 acquires high-precision time information from the GNSS signal supplied from the GNSS reception section 81, and performs time setting according to a standard time. The reference clock generation section 44 extracts a clock signal from the GNSS signal, generates a reference clock signal on the basis of the clock signal, and supplies the reference clock signal to the operation mode setting section 45. In addition, the GNSS reception section 81 supplies positional information acquired from the GNSS signal to the position/posture calculation section 122.

In step S42, the position/posture calculation section 122 detects the position and the posture of the drone 101 on the basis of the detection signal supplied from the IMU 121 and the positional information supplied from the GNSS reception section 81, and supplies the position and the posture to the communication section 123 and the inter-light-source distance calculation section 124. In a case where the IMU 121 is omitted, the position/posture calculation section 122 detects the position and the posture of the drone 101 on the basis of only the positional information supplied from the GNSS reception section 81.

In step S43, the timing control section 51 generates start timing control information on the basis of the high-precision time information supplied from the time information setting section 82 or the like, and supplies the start timing control information to the laser driver 46 and the ToF sensor 52.

In step S44, the operation mode setting section 45 generates a light emission pulse signal corresponding to the operation mode supplied from the light source information acquisition section 48, with use of the reference clock signal supplied from the reference clock generation section 44, and supplies the light emission pulse signal to the laser driver 46 and the ToF sensor 52.

In step S45, the laser driver 46 generates a drive signal and supplies the drive signal to the laser emission section 47 at a predetermined timing based on the start timing control information.

In step S46, the on and off of light emission from the laser emission section 47 are repeated in a predetermined cycle according to the drive signal supplied from the laser driver 46.

In step S47, the ToF sensor 52 receives irradiation light applied from the counterpart drone 101, on the basis of the start timing control information supplied from the timing control section 51 and the reference clock signal supplied from the operation mode setting section 45, sequentially generates image frames of the 0-degrees phase, the 90-degrees phase, the 180-degrees phase, and the 270-degrees phase, and supplies the image frames to the signal processing section 53.

In step S48, the depth image generation section 141 of the signal processing section 53 generates a depth image in which the distance $d_1$ to the counterpart drone 101 calculated in each pixel is stored as a pixel value of the pixel, and supplies the depth image to the communication section 123 and the inter-light-source distance calculation section 124.

In step S49, the external modulated light source detection section 142 detects the position (light source position) of the light source 2 (laser emission section 47) of the counterpart drone 101 which is emitting light, and supplies the detected position to the communication section 123 and the inter-light-source distance calculation section 124.

In step S50, the communication section 123 transmits the light source position of the counterpart drone 101 and the distance $d_1$ to the counterpart drone 101 obtained by the signal processing section 53 and the rough self-position detected by the position/posture calculation section 122 to the counterpart drone 101 through wireless communication. In addition, the communication section 123 receives a light source position and a distance $d_2$ detected by the counterpart drone 101 and the rough position of the counterpart drone 101, and supplies the light source position, the distance $d_2$, and the rough position to the inter-light-source distance calculation section 124.

In step S51, the inter-light-source distance calculation section 124 calculates a precise relative distance d with respect to the counterpart drone 101. Specifically, the inter-light-source distance calculation section 124 identifies the direction of gravity with use of the rough self-posture detected by the position/posture calculation section 122, and obtains relative position and posture. In addition, the inter-light-source distance calculation section 124 acquires, from the communication section 123, the light source position, the distance $d_2$, and the rough position received through wireless communication from the counterpart drone 101. Further, with use of the distance $d_1$ to the counterpart drone 101 obtained by self-detection and the distance $d_2$ transmitted from the counterpart drone 101, the inter-light-source distance calculation section 124 calculates a precise relative distance d from which the influence of the offset $\Delta t_{offset}$ has been removed. Moreover, the inter-light-source distance calculation section 124 increases the precision of the relative distance d with use of the rough position obtained by self-detection and the rough position detected by the counterpart drone 101.

Thus, the relative distance measurement process is completed. The drones 101A and 101B parallelly execute the relative distance measurement process described above.

According to the above-mentioned relative distance measurement process, the distances $d_1$ (or $d_2$) obtained by self-measurement are mutually reported, whereby the precise distance d can be calculated.

In the second embodiment, by achievement of synchronization based on a received wireless signal, frequency synchronization between the drones 101A and 101B is achieved, as in the first embodiment. However, a method of achieving frequency synchronization with use of reflection light (master irradiation light) of a master drone 101, as disclosed in PTL 1, may be adopted.

<7. Third Embodiment of Ranging System>

FIG. 29 illustrates a configuration example of a ranging system according to a third embodiment of the present disclosure.

The ranging system 11 according to the third embodiment in the example of FIG. 29 includes a plurality of ranging devices 201. In FIG. 29, the ranging system 11 includes five ranging devices 201 which are ranging devices 201A to 201E. However, the number of the ranging devices 201 is not limited to five, and the ranging device 201 can be provided in any number.

In the third embodiment, four ranging devices 201A to 201D each include both the light source 2 and the ranging unit 3, and are fixed to an upper side such as a ceiling. On the other hand, the ranging device 201E includes the ranging unit 3 only, and is disposed in a position, for example, on the ground, where the ranging device 201E can receive irradiation light applied from the four ranging devices 201A to 201D or reflection light thereof.

The configurations of the ranging devices 201A to 201D each including both the light source 2 and the ranging unit 3 are similar to the configuration of the first embodiment illustrated in FIG. 10. The configuration of the ranging device 201E including the ranging unit 3 only is similar to the configuration of the first embodiment illustrated in FIG. 15. Therefore, an explanation of these configurations is omitted.

In the third embodiment, a process in which the ranging device 201E including only the ranging unit 3 calculates the distance to an object 202 by receiving irradiation light applied from a plurality (four) of the ranging devices 201A to 201D which are fixed to a ceiling or the like will be explained.

FIG. 30 is a flowchart for explaining a distance calculating process in the ranging system 11 according to the third embodiment.

First, in step S61, the ranging devices 201A to 201E each establish connection for wireless communication. Then, the ranging devices 201A to 201E exchange time stamps with one another to achieve time synchronization with high precision.

In step S62, the ranging devices 201A to 201E each read out the light source information from the memory 49 of the corresponding ranging device 201, and transmits the light source information to the other ranging devices 201 through wireless communication. As a result, the light source information regarding the ranging devices 201A to 201E is shared.

In step S63, the ranging devices 201A to 201E each generate a reference clock signal from a synchronization clock signal generated by detecting a transmission signal from a master ranging device 201 (e.g. the ranging device 201A), and generate a light emission pulse signal corresponding to the operation mode.

In step S64, the ranging devices 201A to 201D which are fixed to the ceiling each emit light and receive light on the basis of respective light emission pulse signals. Specifically, the light sources 2 (laser emission sections 47) of the ranging devices 201A to 201D emit light according to the light emission pulse signals, and the ranging units 3 (the ToF sensors 52) receive reflection light according to the light emission pulse signals, and sequentially generate image frames of the 0-degrees phase, the 90-degrees phase, the 180-degrees phase, and the 270-degrees phase.

In step S65, the ranging devices 201A to 201D which are fixed to the ceiling calculate the positions and the postures of the ranging devices 201A to 201D themselves, respectively. In other words, the ranging devices 201A to 201D each calculate relative position and posture with respect to the other ranging devices 201.

A process in step S65 will be explained. Each of the ranging devices 201A to 201D is a depth camera that measures a distance d to a subject. Thus, with the ranging devices 201A to 201D, the three-dimensional position of a subject can be obtained in a camera coordinate system.

A method of obtaining relative position and posture of a known three-dimensional point and a camera by observing the three-dimensional point by means of the camera is publicly known as PNP (Perspective-n-Point). With use of PNP, each of the ranging devices 201A to 201D calculates relative position and posture of the ranging device 201 itself with respect to the other ranging devices 201.

For example, by receiving reflection light returning from a known object 202, the ranging device 201A acquires a coordinate value of a characteristic point on the object 202. In a similar manner, by receiving reflection light returning from the known object 202, the ranging device 201B also acquires a coordinate value of the characteristic point on the object 202. A PNP problem is solved with the coordinate values of the characteristic point obtained by the ranging devices 201A and 201B and with the coordinate value of a known three-dimensional point. Accordingly, the relative positions and postures of the ranging devices 201A and 201B are calculated.

Alternatively, an optimization problem is solved such that the difference between the surrounding environment shapes of the ranging devices 201A and 201B becomes minimum, whereby the relative posture of the ranging devices 201A and 201B can be obtained. This method is known as ICP (Iterative Clisest Point). ICP is described in "DIGITAL IMAGE PROCESSING [revised edition], Computer Graphic Arts Society" and Szymon. R and Marc. L, "Efficient Variants of the ICP Algorithm," Proceedings Third International Conference on 3-D Digital Imaging and Modeling, 2001, pp. 145-152, for example.

In the above-mentioned manner, the ranging devices 201A to 201D each calculate the relative position and posture. As a result, the relative relation among the positions and the postures of all the ranging devices 201A to 201D is obtained.

In step S66, the ranging devices 201A to 201D which are fixed to the ceiling each detect the phase difference of irradiation light, and the phase matching is performed.

As previously explained in the second embodiment depicted in FIG. 22, timings of light emission pulses applied from the ranging devices 201 are slightly deviated from one another even when frequency synchronization is achieved. Therefore, the phase difference needs to be calibrated.

Figure 31:
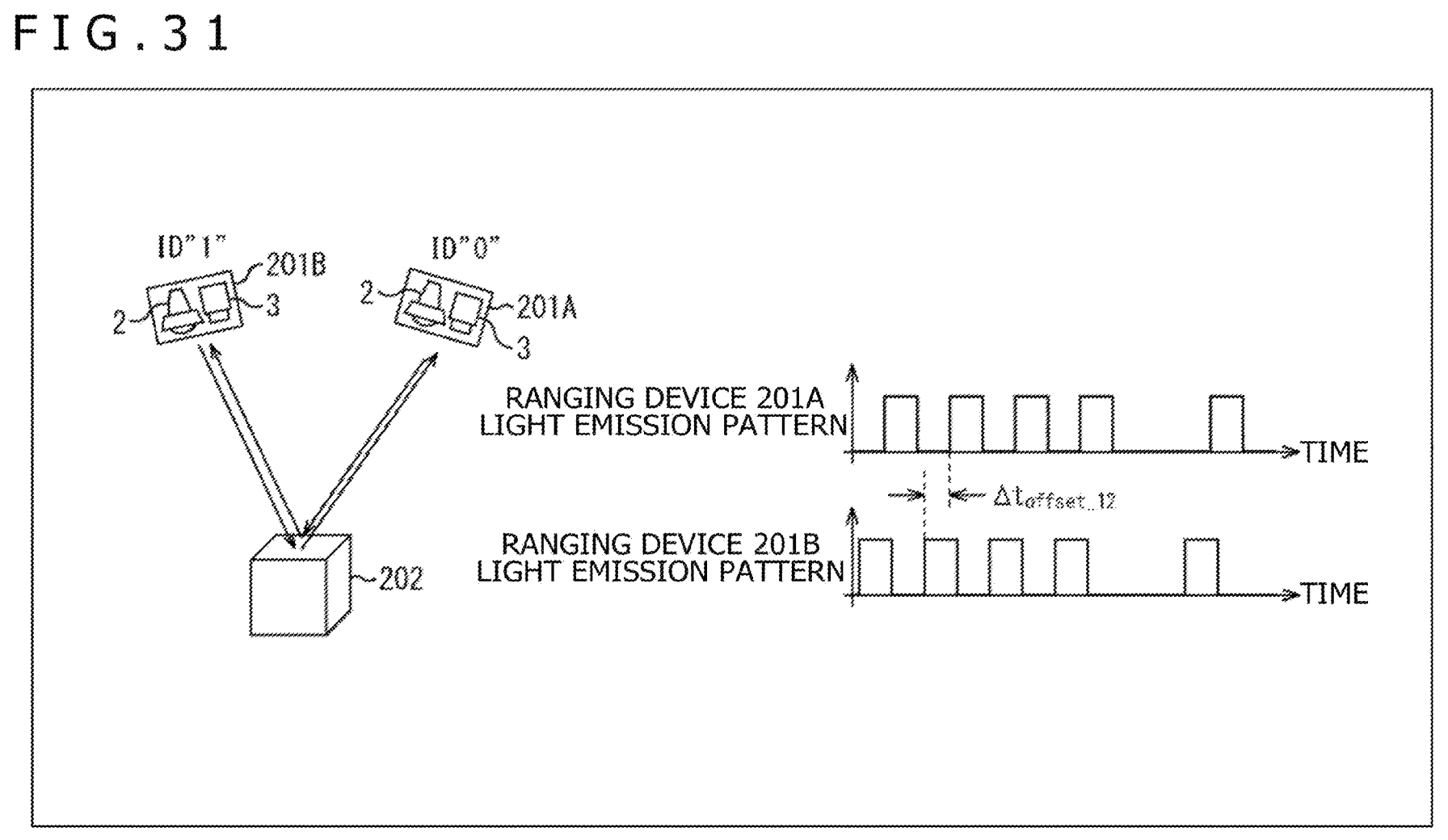

Specifically, the ranging devices 201A and 201B each apply irradiation light to the object 202 physically located in the same position, and receive reflection light, as illustrated in FIG. 31, for example.

When a deviation (phase difference) of light emission pulses applied from the ranging devices 201A and 201B is defined as $\Delta t_{offset\_12}$, time that is taken for light emitted by the ranging device 201A to be received by the ranging device 201B is obtained by the following expression (13).

$$\Delta t_{1\text{-}2} = \Delta t_d + \Delta t_{offset\_12} \tag{13}$$

On the other hand, time that is taken for light emitted by the ranging device 201B to be received by the ranging device 201A is obtained by the following expression (14).

$$\Delta t_{2\text{-}1} = \Delta t_d - \Delta t_{offset\_12} \tag{14}$$

Therefore, the deviation (phase difference) $\Delta t_{offset\_12}$ of light emission pulses applied from the ranging devices 201A and 201B can obtained by the following expression (15).

$$\Delta t_{offset\_12} = (\Delta t_{1\text{-}2} - \Delta t_{2\text{-}1})/2 \tag{15}$$

In the above-mentioned manner, the phase difference in each of the light sources 2 of the ranging devices 201A to 201D is detected, and the irradiation light phases of the ranging devices 201A to 201D are adjusted so as not to generate a phase difference. It is to be noted that calculation considering the phase difference may be conducted in later-stage signal processing, instead of adjustment of the irradiation light phases.

In step S67, the ToF sensor 52 of the ranging device 201E including only the ranging unit 3 receives reflection light resulting from irradiation light emitted by each of the ranging devices 201A to 201D, the ranging devices being fixed to the ceiling, and reflected by the object 202. The frequencies and phases of irradiation light emitted by the ranging devices 201A to 201D are in synchronization as a result of step S66. In addition, since the light source information is shared, from which ranging device ranging device, among the ranging devices 201A to 201D, received reflection light is emitted can be identified.

In step S68, the signal processing section 53 of the ranging device 201E calculates the distance to the object 202 on the basis of the phase difference of received reflection light from each of the ranging devices 201A to 201D. A method for calculating the distance to the object 202 will be explained later.

In the above-mentioned distance calculating process, when light source information regarding irradiation light applied from the ranging devices 201A to 201D which are fixed to the ceiling is already known and when phase synchronization and frequency synchronization are achieved, the phase difference of irradiation light applied from the ranging devices 201A to 201D is detected, whereby the position and the posture of the ranging device 201E can be calculated. This is similar to a case where a self-position is calculated on the basis of the difference among GNSS signals while the ranging devices 201A to 201D are regarded as GNSS satellites, for example.

In the third embodiment, by achievement of synchronization based on a received wireless signal, frequency synchronization between the drones 101A and 101B is achieved, as in the first embodiment. However, a method of achieving frequency synchronization with use of reflection light (master irradiation light) of a master ranging device 201, as disclosed in PTL 1, may be adopted.

<8. Distance Calculation Method Involving Reception of Reflection Light from Plurality of Light Sources>

In the first embodiment described above, for example, the ranging unit 3 of the ranging device 21E receives reflection light resulting from irradiation light emitted from the light source 2 of the ranging device 21A and reflected by the object 24, and reflection light resulting from irradiation light emitted from the light source 2 of the ranging device 21B and reflected by the object 24, so that the distance to the object 202 can be measured.

In the third embodiment described above, for example, the ranging unit 3 of the ranging device 201E receives reflection light resulting from irradiation light emitted from the light source 2 of the ranging device 201B and reflected by the object 202, and reflection light resulting from irradiation light emitted from the light source 2 of the ranging device 201D and reflected by the object 202, so that the distance to the object 202 can be measured.

Hereinafter, a method of calculating the distance to a predetermined object by receiving reflection light of irradiation light applied from a plurality of light sources 2 and reflected by the predetermined object will be explained.

For explanation, system arrangement including three light sources a to c, an object 301, and a ranging unit 302, as illustrated in FIG. 32 is assumed. A point D is a reflection position on the object 301 for pulse light applied from the light sources a to c. A point O is the origin of a camera coordinate system which is a coordinate system of the ranging unit 302.

The light sources a to c correspond to the light sources 2 of the ranging devices 21A, 21B, and 21D in the first embodiment, for example, and to the light sources 2 of the ranging devices 201A, 201B, and 201D in the third embodiment, for example. The object 301 corresponds to the object 24 in the first embodiment, and to the object 202 in the third embodiment. The ranging unit 302 corresponds to the ranging unit 3 of the ranging device 21E in the first embodiment, and to the ranging unit 3 of the ranging device 201E in the third embodiment.

In FIG. 32, three light sources a to c are located in positions $E_1$, $E_2$, $E_3$, respectively. The relative positions of the light sources a to c in a light source coordinate system is already known, but the positions where the three light sources a to c are located are unknown. The relative position of the ranging unit 302 with respect to the light sources a to c is unknown. The ranging unit 302 can establish frequency synchronization on the basis of wireless signals transmitted from the light sources a to c, but the phase deviation remains.

The ranging unit 302 calculates distances (distances from the light sources a to c to the ranging unit 302) with use of frames obtained on the basis of reflection light resulting from irradiation light emitted from the light sources a to c and reflected by the object 301. The distances from the light sources a to c to the ranging unit 302 are expressed by the following expression (16).

[Math. 10]

$$\text{Obs}(\overrightarrow{u_D},\overrightarrow{E_1})=|\overrightarrow{OD}|+|\overrightarrow{DE_1}|+C$$

$$\text{Obs}(\overrightarrow{u_D},\overrightarrow{E_2})=|\overrightarrow{OD}|+|\overrightarrow{DE_2}|+C$$

$$\text{Obs}(\overrightarrow{u_D},\overrightarrow{E_3})=|\overrightarrow{OD}|+|\overrightarrow{DE_3}|+C \tag{16}$$

In the expression (16), $u_D=(u_D, V_D)$ represents a pixel position to which the point D on the object 301 is projected, Obs $(u_D, E_1)$ represents a distance observed in the pixel position $u_D$ of the pixel array of the ranging unit 302 when the light source a in the position $E_1$ emits light, Obs $(u_D, E_2)$ represents a distance observed in the pixel position $u_D$ of the pixel array of the ranging unit 302 when the light source b in the position $E_2$ emits light, Obs $(u_D, E_3)$ represents a distance observed in the pixel position $u_D$ when the light source c in the position $E_3$ emits light, |OD| represents the magnitude (distance) of a vector connecting the ranging unit 302 to the object 301, $|DE_k|$ represents the magnitude (distance) of a vector connecting each of the light source in the positions $E_k$ (k=1, 2, or 3) to a reflection position on the object 301, and C represents an offset term that corresponds to a distance measurement error caused by a clock phase deviation between the light sources a to c and the ranging unit 302.

It is to be noted that the vector notation (arrow symbol ($\rightarrow$)) in the above expression (16) indicates a vector starting from the origin of a certain coordinate system, e.g. light source coordinate system. In the explanation of the expression in the present specification, the vector notation is omitted. It is to be noted that the vector notation is omitted in the explanation in the present specification hereinafter as well.

Thus, the ranging unit 302 calculates three calculation expressions of the distances from the three light sources a to c to the ranging unit 302. The expressions include (a) distance data |OD| between the ranging unit 302 and the object 301, (b) distance data $|DE_k|$ between the object 301 and each of the light sources a to c, and (c) an offset C that corresponds to a distance measurement error generated on the basis of the phase difference between the clock (sensor clock) of the ranging unit 302 and the clock (light source clock) of the light source a to c.

Figure 33:
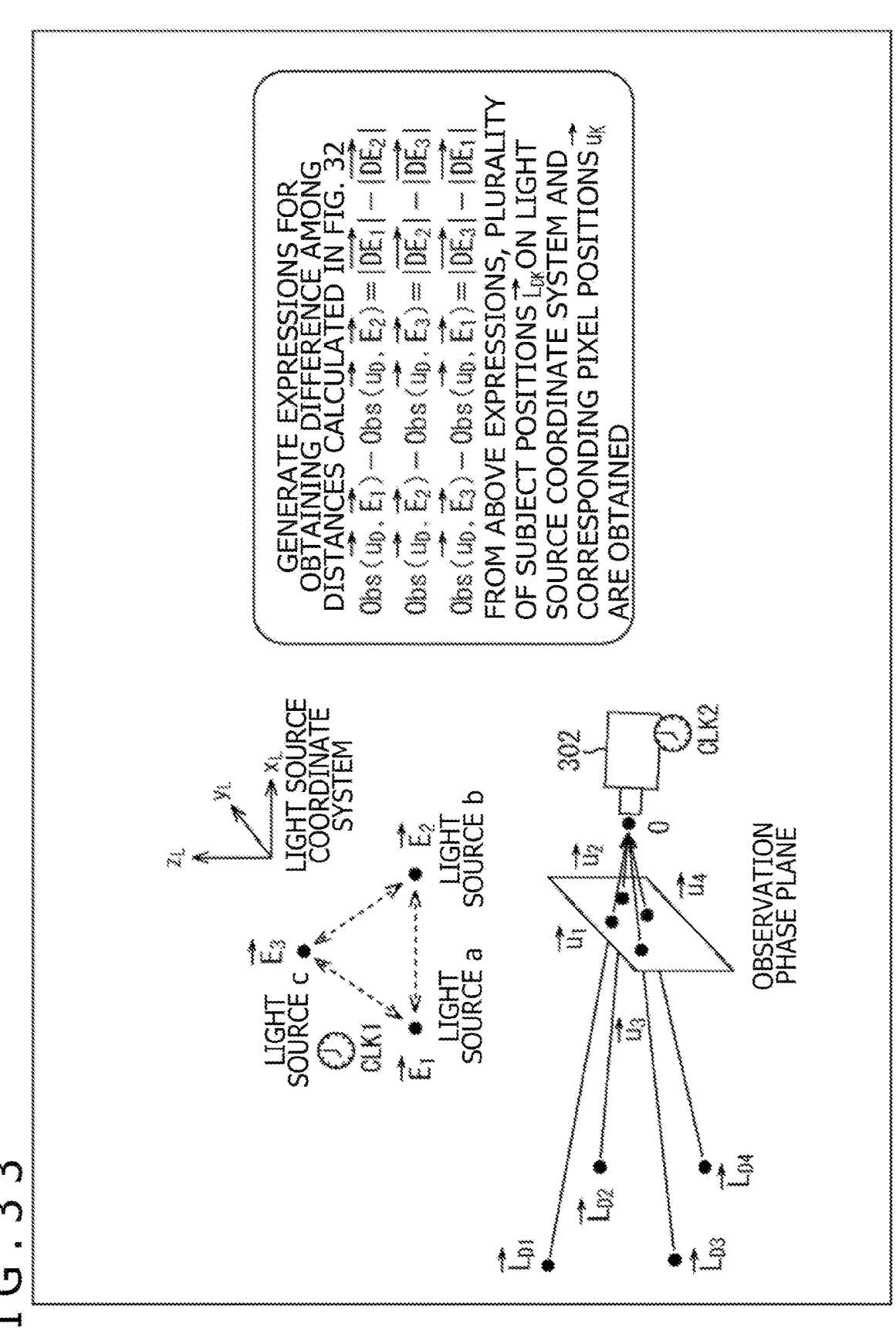
FIG. 33 is a diagram for explaining a distance calculation method involving reception of reflection light from a plurality of light sources.

Next, with use of the distance Obs $(u_D, E_1)$, the distance Obs $(u_D, E_2)$, and the distance Obs $(u_D, E_3)$ described above, the ranging unit 302 generates simultaneous equations in an expression (17) that includes calculation expressions for the difference between the distances, as illustrated in FIG. 33.

[Math. 11]

$$\text{Obs}(\overrightarrow{u_D},\overrightarrow{E_1})-\text{Obs}(\overrightarrow{u_D},\overrightarrow{E_2})=|\overrightarrow{DE_1}|-|\overrightarrow{DE_2}|$$

$$\text{Obs}(\overrightarrow{u_D},\overrightarrow{E_2})-\text{Obs}(\overrightarrow{u_D},\overrightarrow{E_3})=|\overrightarrow{DE_2}|-|\overrightarrow{DE_3}|$$

$$\text{Obs}(\overrightarrow{u_D},\overrightarrow{E_3})-\text{Obs}(\overrightarrow{u_D},\overrightarrow{E_1})=|\overrightarrow{DE_3}|-|\overrightarrow{DE_1}| \tag{17}$$

By solving the simultaneous equations of the expression (17), the ranging unit 302 obtains a plurality of subject positions $L_{Dk}$ (k=1, 2, 3, or 4) in the light source coordinate system, and the corresponding pixel position $u_D$. Since the positions of the light sources a to c viewed from the camera coordinate system are unknown, the expression (17) cannot be directly solved in terms of the camera coordinate system. However, since the positions of the light sources a to c in the light source coordinate system are already known, the expression (17) can be solved in terms of the light source coordinate system.

When the simultaneous equations of the expression (17) are solved in terms of the light source coordinate systems, plurality of subject positions $L_{DK}$ in the light source coordinate system and the corresponding pixel positions $u_D$ can be obtained. It is to be noted that the plurality of subject positions $L_{DK}$ include the respective positions $E_1$, $E_2$, and $E_3$ of the light sources a to c and a surface position on the object 301, for example.

It is to be noted that, in general, if the correspondence between a plurality of points in a certain coordinate system and pixel positions to which the points are projected by a camera is known, relative position and posture between the coordinate system and the camera coordinate system can be obtained. That is, when what is generally called a PnP problem is solved, the relative relation between the light source coordinate system and the camera coordinate system can be derived, and a subject position in the light source coordinate system can be converted to that in the camera coordinate system.

As a result of this process, the subject position $L_{Dk}$ in the camera coordinate system and the corresponding pixel position $u_D$ can be obtained. From photographed pixel positions of the light sources a to c, the respective positions $E_1$, $E_2$, and $E_3$ of the light sources a to c and the surface position on the object 301 can be obtained in terms of the camera coordinate system. Since the surface position on the object 301 is obtained in terms of the camera coordinate system, the distance to the object 301 can be calculated. That is, the distance from the ranging unit 302 to the object 301 can be calculated.

<9. Configuration of ToF Sensor>

Figure 34:
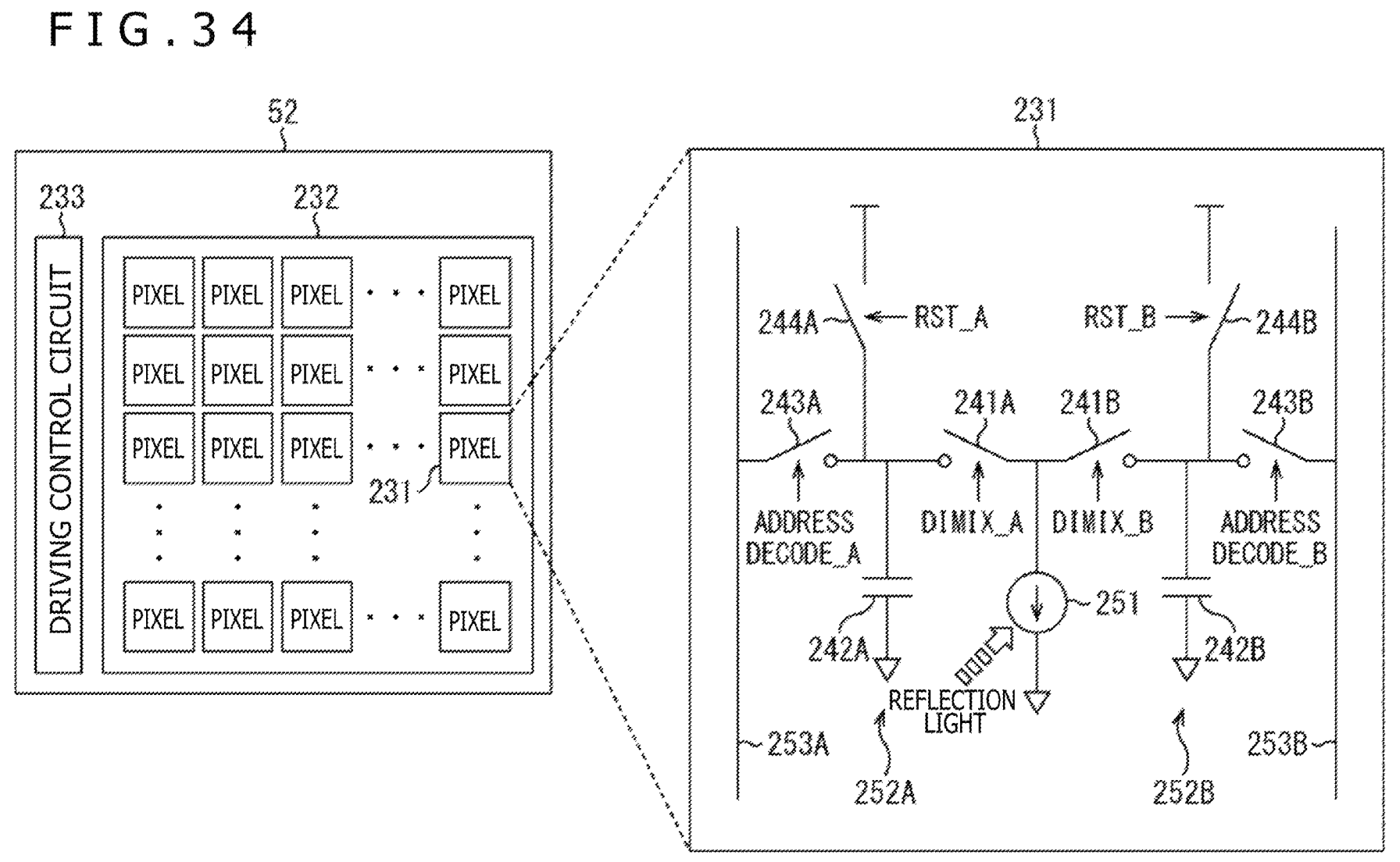

The configuration of the ToF sensor 52 will be explained. FIG. 34 illustrates a configuration example of a light reception section of the ToF sensor 52.

The ToF sensor 52 includes a pixel array section 232 in which pixels 231 that generate electric charges according to a light reception amount and that output signals corresponding to the electric charges are two-dimensionally arranged in a line direction and a row direction of a matrix form. The ToF sensor 52 also includes a driving control circuit 233 that is disposed in the peripheral region of the pixel array section 232.

The driving control circuit 233 outputs control signals (e.g. an allocation signal DIMIX, a selection signal ADDRESS DECODE, a reset signals RST, and the like which will be described later) for controlling driving of the pixels 231, on the basis of light emission pulse signals, etc.

Each pixel 231 includes a photodiode 251 and a first tap 252A and a second tap 252B that detect electric charges having undergone photoelectric conversion at the photodiode 251. In each pixel 231, electric charges generated by one photodiode 251 are allocated to a first tap 252A or a second tap 252B. Then, among the electric charges generated by the photodiode 251, an electric charge allocated to the first tap 252A is outputted as a detection signal A from a signal line 253A, while an electric charge allocated to the second tap 252B is outputted as a detection signal B from a signal line 253B.

The first tap 252A includes a transfer transistor 241A, an FD (Floating Diffusion) section 242A, a selection transistor 243A, and a reset transistor 244A. In a similar manner, the second tap 252B includes a transfer transistor 241B, an FD section 242B, a selection transistor 243B, and a reset transistor 244B.

Operation of each pixel 231 will be explained.

As illustrated in FIG. 2, irradiation light that has been modulated such that the on and off of the irradiation is repeated at a 1/f frequency is outputted from the light source 2, and reflection light thereof is received by the photodiode 251 with a delay of delay time $\Delta T$ corresponding to the distance to an object. In addition, with an allocation signal DIMIX_A, the on/off the transfer transistor 241A is controlled, and, with an allocation signal DIMIX_B, the on/off of the transfer transistor 241B is controlled. At the execution timing of the 0-degrees phase, the allocation signal DIMIX_A is a signal of the same phase (i.e. the 0-degrees phase) as that of irradiation light, and the allocation signal DIMIX_B is a signal of the phase (i.e. the 180-degrees phase) which is reversal of that of the allocation signal DIMIX_A. At the execution timing of the 90-degrees phase, the allocation signal DIMIX_A has a phase shifted by 90 degrees from that of the irradiation light, and the allocation signal DIMIX_B has a phase (i.e. the phase of 270 degrees) which is a reversal of that of the allocation signal DIMIX_A.

Therefore, in FIG. 34, an electric charge generated by reflection of reflection light at the photodiode 251 is transferred to the FD section 242A, according to the allocation signal DIMIX_A, when the transfer transistor 241A is on, and the electric charge is transferred to the FD section 242B, according to the allocation signal DIMIX_B, when the transfer transistor 241B is on. As a result, electric charges transferred via the transfer transistor 241A during a predetermined period in which application of irradiation light is cyclically performed at a 1/f frequency are sequentially accumulated in the FD section 242A, and electric charges transferred via the transfer transistor 241B are sequentially accumulated in the FD section 242B.

Then, when the selection transistor 243A is turned on according to the selection signal ADDRESS DECODE_A after the accumulation period for accumulating electric charges, an electric charge accumulated in the FD section 242A is read out via the signal line 253A, and a detection signal A corresponding to the amount of the read electric charge is outputted from the pixel array section 232. In a similar manner, when the selection transistor 243B is turned on according to a selection signal ADDRESS DECODE_B, an electric charge accumulated in the FD section 242B is read out via the signal line 253B, and a detection signal B corresponding to the amount of the read electric charge is outputted from the pixel array section 232. In addition, the electric charges accumulated in the FD section 242A are discharged when the reset transistor 244A is turned on according to a reset signal RST_A, and the electric charges accumulated in the FD section 242B are discharged when the reset transistor 244B is turned on according to a reset signal RST_B.

In the above-mentioned manner, in each pixel 231, an electric charge generated by reflection light received by the photodiode 251 is allocated to the first tap 252A or the second tap 252B according to the delay time $\Delta T$, and a detection signal A and a detection signal B are outputted.

The detection signal A and the detection signal B at the execution timing of the 0-degrees phase correspond to the electric charge $Q_0$ of the 0-degrees phase and the electric charge $Q_{180}$ of the 180-degrees phase in FIG. 3, respectively. The detection signal A and the detection signal B at the execution timing of the 90-degrees phase correspond to the electric charge $Q_{90}$ of the 90-degrees phase and the electric charge $Q_{270}$ of the 270-degrees phase in FIG. 3, respectively.

<10. Application to Mobile Body>

The technology according to the present disclosure (present technology) can be applied to various products. For example, the technology according to the present disclosure may be realized as an apparatus mounted on any type of mobile body, such as a car, an electric car, a hybrid electric car, a motorcycle, a bicycle, a personal mobility, an airplane, a drone, a ship, and a robot.

FIG. 35 is a block diagram depicting an example of schematic configuration of a vehicle control system as an example of a mobile body control system to which the technology according to an embodiment of the present disclosure can be applied.

The vehicle control system 12000 includes a plurality of electronic control units connected to each other via a communication network 12001. In the example depicted in FIG. 35, the vehicle control system 12000 includes a driving system control unit 12010, a body system control unit 12020, an outside-vehicle information detecting unit 12030, an in-vehicle information detecting unit 12040, and an integrated control unit 12050. In addition, a microcomputer 12051, a sound/image output section 12052, and a vehicle-mounted network interface (I/F) 12053 are illustrated as a functional configuration of the integrated control unit 12050.

The driving system control unit 12010 controls the operation of devices related to the driving system of the vehicle in accordance with various kinds of programs. For example, the driving system control unit 12010 functions as a control device for a driving force generating device for generating the driving force of the vehicle, such as an internal combustion engine, a driving motor, or the like, a driving force transmitting mechanism for transmitting the driving force to wheels, a steering mechanism for adjusting the steering angle of the vehicle, a braking device for generating the braking force of the vehicle, and the like.

The body system control unit 12020 controls the operation of various kinds of devices provided to a vehicle body in accordance with various kinds of programs. For example, the body system control unit 12020 functions as a control device for a keyless entry system, a smart key system, a power window device, or various kinds of lamps such as a headlamp, a backup lamp, a brake lamp, a turn signal, a fog lamp, or the like. In this case, radio waves transmitted from a mobile device as an alternative to a key or signals of various kinds of switches can be input to the body system control unit 12020. The body system control unit 12020 receives these input radio waves or signals, and controls a door lock device, the power window device, the lamps, or the like of the vehicle.

The outside-vehicle information detecting unit 12030 detects information about the outside of the vehicle including the vehicle control system 12000. For example, the outside-vehicle information detecting unit 12030 is connected with an imaging section 12031. The outside-vehicle information detecting unit 12030 makes the imaging section 12031 image an image of the outside of the vehicle, and receives the imaged image. On the basis of the received image, the outside-vehicle information detecting unit 12030 may perform processing of detecting an object such as a human, a vehicle, an obstacle, a sign, a character on a road surface, or the like, or processing of detecting a distance thereto.

The imaging section 12031 is an optical sensor that receives light, and which outputs an electric signal corresponding to a received light amount of the light. The imaging section 12031 can output the electric signal as an image, or can output the electric signal as information about a measured distance. In addition, the light received by the imaging section 12031 may be visible light, or may be invisible light such as infrared rays or the like.

The in-vehicle information detecting unit 12040 detects information about the inside of the vehicle. The in-vehicle information detecting unit 12040 is, for example, connected with a driver state detecting section 12041 that detects the state of a driver. The driver state detecting section 12041, for example, includes a camera that images the driver. On the basis of detection information input from the driver state detecting section 12041, the in-vehicle information detecting unit 12040 may calculate a degree of fatigue of the driver or a degree of concentration of the driver, or may determine whether the driver is dozing.

The microcomputer 12051 can calculate a control target value for the driving force generating device, the steering mechanism, or the braking device on the basis of the information about the inside or outside of the vehicle which information is obtained by the outside-vehicle information detecting unit 12030 or the in-vehicle information detecting unit 12040, and output a control command to the driving system control unit 12010. For example, the microcomputer 12051 can perform cooperative control intended to implement functions of an advanced driver assistance system (ADAS) which functions include collision avoidance or shock mitigation for the vehicle, following driving based on a following distance, vehicle speed maintaining driving, a warning of collision of the vehicle, a warning of deviation of the vehicle from a lane, or the like.

In addition, the microcomputer 12051 can perform cooperative control intended for automatic driving, which makes the vehicle to travel autonomously without depending on the operation of the driver, or the like, by controlling the driving force generating device, the steering mechanism, the braking device, or the like on the basis of the information about the outside or inside of the vehicle which information is obtained by the outside-vehicle information detecting unit 12030 or the in-vehicle information detecting unit 12040.

In addition, the microcomputer 12051 can output a control command to the body system control unit 12020 on the basis of the information about the outside of the vehicle which information is obtained by the outside-vehicle information detecting unit 12030. For example, the microcomputer 12051 can perform cooperative control intended to prevent a glare by controlling the headlamp so as to change from a high beam to a low beam, for example, in accordance with the position of a preceding vehicle or an oncoming vehicle detected by the outside-vehicle information detecting unit 12030.

The sound/image output section 12052 transmits an output signal of at least one of a sound and an image to an output device capable of visually or auditorily notifying information to an occupant of the vehicle or the outside of the vehicle. In the example of FIG. 35, an audio speaker 12061, a display section 12062, and an instrument panel 12063 are illustrated as the output device. The display section 12062 may, for example, include at least one of an on-board display and a head-up display.

Figure 36:
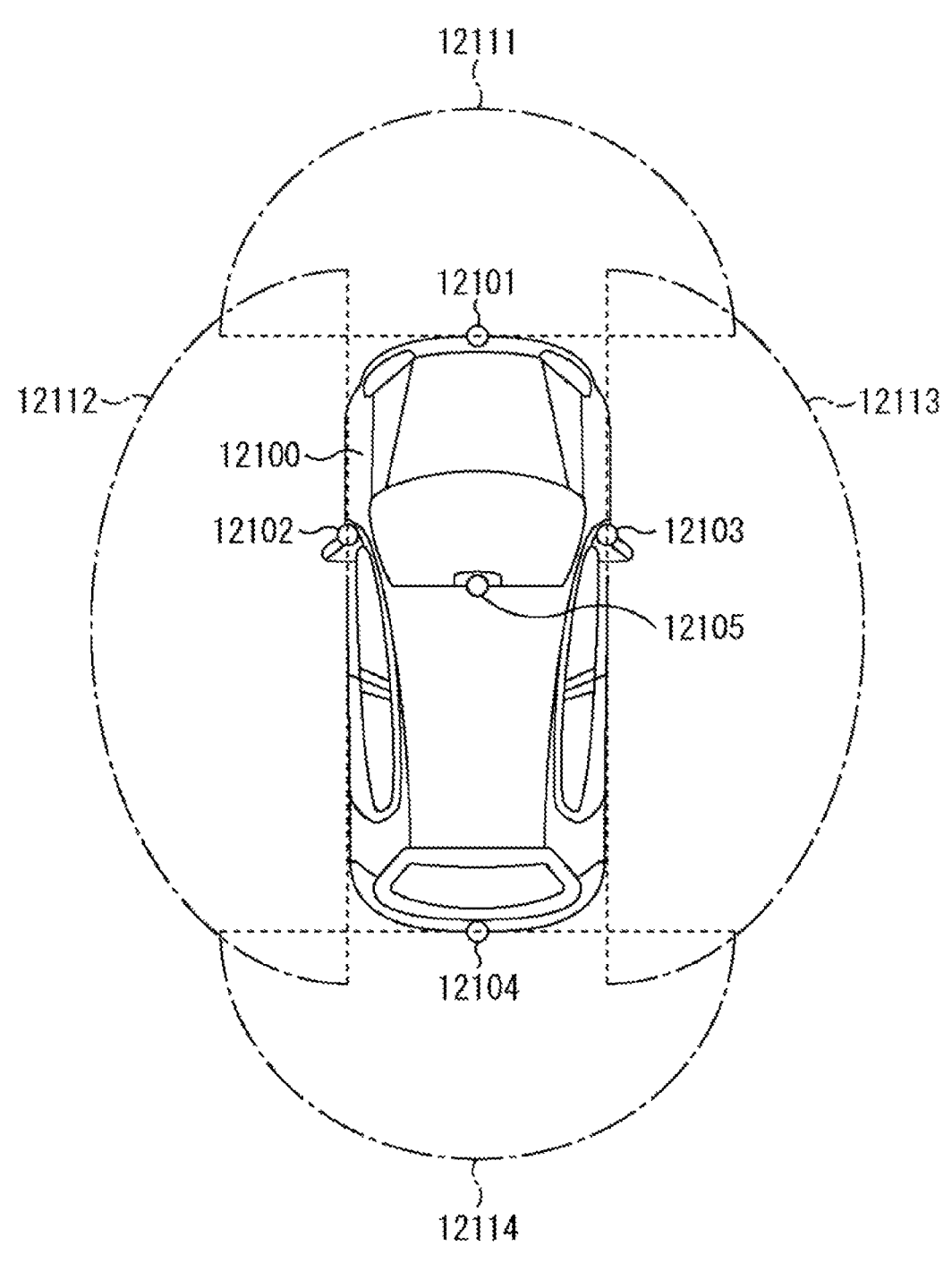
FIG. 36 is a diagram of assistance in explaining an example of installation positions of an outside-vehicle information detecting section and an imaging section.

FIG. 36 is a diagram depicting an example of the installation position of the imaging section 12031.

In FIG. 36, the imaging section 12031 includes imaging sections 12101, 12102, 12103, 12104, and 12105.

The imaging sections 12101, 12102, 12103, 12104, and 12105 are, for example, disposed at positions on a front nose, sideview mirrors, a rear bumper, and a back door of the vehicle 12100 as well as a position on an upper portion of a windshield within the interior of the vehicle. The imaging section 12101 provided to the front nose and the imaging section 12105 provided to the upper portion of the windshield within the interior of the vehicle obtain mainly an image of the front of the vehicle 12100. The imaging sections 12102 and 12103 provided to the sideview mirrors obtain mainly an image of the sides of the vehicle 12100. The imaging section 12104 provided to the rear bumper or the back door obtains mainly an image of the rear of the vehicle 12100. The imaging section 12105 provided to the upper portion of the windshield within the interior of the vehicle is used mainly to detect a preceding vehicle, a pedestrian, an obstacle, a signal, a traffic sign, a lane, or the like.

Incidentally, FIG. 36 depicts an example of photographing ranges of the imaging sections 12101 to 12104. An imaging range 12111 represents the imaging range of the imaging section 12101 provided to the front nose. Imaging ranges 12112 and 12113 respectively represent the imaging ranges of the imaging sections 12102 and 12103 provided to the sideview mirrors. An imaging range 12114 represents the imaging range of the imaging section 12104 provided to the rear bumper or the back door. A bird's-eye image of the vehicle 12100 as viewed from above is obtained by superimposing image data imaged by the imaging sections 12101 to 12104, for example.

At least one of the imaging sections 12101 to 12104 may have a function of obtaining distance information. For example, at least one of the imaging sections 12101 to 12104 may be a stereo camera constituted of a plurality of imaging elements, or may be an imaging element having pixels for phase difference detection.

For example, the microcomputer 12051 can determine a distance to each three-dimensional object within the imaging ranges 12111 to 12114 and a temporal change in the distance (relative speed with respect to the vehicle 12100) on the basis of the distance information obtained from the imaging sections 12101 to 12104, and thereby extract, as a preceding vehicle, a nearest three-dimensional object in particular that is present on a traveling path of the vehicle 12100 and which travels in substantially the same direction as the vehicle 12100 at a predetermined speed (for example, equal to or more than 0 km/hour). Further, the microcomputer 12051 can set a following distance to be maintained in front of a preceding vehicle in advance, and perform automatic brake control (including following stop control), automatic acceleration control (including following start control), or the like. It is thus possible to perform cooperative control intended for automatic driving that makes the vehicle travel autonomously without depending on the operation of the driver or the like.

For example, the microcomputer 12051 can classify three-dimensional object data on three-dimensional objects into three-dimensional object data of a two-wheeled vehicle, a standard-sized vehicle, a large-sized vehicle, a pedestrian, a utility pole, and other three-dimensional objects on the basis of the distance information obtained from the imaging sections 12101 to 12104, extract the classified three-dimensional object data, and use the extracted three-dimensional object data for automatic avoidance of an obstacle. For example, the microcomputer 12051 identifies obstacles around the vehicle 12100 as obstacles that the driver of the vehicle 12100 can recognize visually and obstacles that are difficult for the driver of the vehicle 12100 to recognize visually. Then, the microcomputer 12051 determines a collision risk indicating a risk of collision with each obstacle. In a situation in which the collision risk is equal to or higher than a set value and there is thus a possibility of collision, the microcomputer 12051 outputs a warning to the driver via the audio speaker 12061 or the display section 12062, and performs forced deceleration or avoidance steering via the driving system control unit 12010. The microcomputer 12051 can thereby assist in driving to avoid collision.

At least one of the imaging sections 12101 to 12104 may be an infrared camera that detects infrared rays. The microcomputer 12051 can, for example, recognize a pedestrian by determining whether or not there is a pedestrian in imaged images of the imaging sections 12101 to 12104. Such recognition of a pedestrian is, for example, performed by a procedure of extracting characteristic points in the imaged images of the imaging sections 12101 to 12104 as infrared cameras and a procedure of determining whether or not it is the pedestrian by performing pattern matching processing on a series of characteristic points representing the contour of the object. When the microcomputer 12051 determines that there is a pedestrian in the imaged images of the imaging sections 12101 to 12104, and thus recognizes the pedestrian, the sound/image output section 12052 controls the display section 12062 so that a square contour line for emphasis is displayed so as to be superimposed on the recognized pedestrian. The sound/image output section 12052 may also control the display section 12062 so that an icon or the like representing the pedestrian is displayed at a desired position.

One example of the vehicle control system to which the technology according to the present disclosure can be applied has been explained so far. The technology according to the present disclosure is applicable to the imaging section 12031 of the above-mentioned configuration. Specifically, the ranging device 21 described above can be used as the imaging section 12031. When the technology according to the present disclosure is applied to the imaging section 12031, distance information can be acquired. In addition, the acquired distance information can be used to enhance the safety of the driver and the vehicle.

The embodiments of the present technology are not limited to the above-mentioned ones. Various changes can be made within the gist of the present technology.

A plurality of aspects of the present technology explained in the present specification can independently and singly be implemented as long as there is no inconsistency. It goes without saying that freely-selected aspects of the present technology can be implemented in combination. For example, a part or the entirety of the present technology explained in any one of the embodiments can be implemented in combination with a part or the entirety of the present technology explained in another one of the embodiments. In addition, a freely-selected part or the entirety of the above-mentioned present technology can be implemented in combination with another technology which has not been explained previously.

In addition, for example, a configuration explained as one device (or one processing section) may be divided into a plurality of devices (or a plurality of processing sections). In contrast, a configuration explained above as a set of a plurality of device (or a plurality of processing sections) may be integrated into one device (or one processing section). Further, needless to say, a configuration other than the above-mentioned configurations may be added to the configuration of each device (or each processing section). Moreover, as long as the configuration or operation of an entire system is not changed, a partial configuration of a certain device (or a certain processing section) may be included into the configuration of another device (or another processing section).

Furthermore, the term "system" in the present specification means a set of multiple constituent components (devices, modules (components), etc.), whether or not all the constituent components are included in the same casing does not matter. Therefore, a set of multiple devices that are housed in separate casings and are connected over a network is a system, and a single device having multiple modules housed in a single casing is also a system.

It is to be noted that the effects described in the present specification are just examples, and thus, are not limitative. Effects other than those described in the present specification may be provided.

It is to be noted that the present technology can have the following configurations.

(1)

A ranging device including:

a reception section that generates, by executing a synchronization process on a transmission signal transmitted from a separate device through wireless communication, a signal synchronized with a synchronization clock signal of the separate device;

a reference clock generation section that generates, on the basis of the synchronization clock signal, a reference clock signal to be used as a reference for light emission from a light source; and a ToF sensor that receives, on the basis of the reference clock signal, reflection light resulting from irradiation light applied from the light source and reflected by an object.

(2)

The ranging device according to (1), in which the reception section receives, through the wireless communication, light source information regarding the irradiation light applied from the light source.

(3)

The ranging device according to (2), in which the light source information includes calibration data regarding the light source.

(4)

The ranging device according to (2) or (3), in which the light source information includes an operation mode.

(5)

The ranging device according to (4), in which the operation mode includes information indicating any one of a time division mode, a modulation frequency mode, or a light emission pattern mode.

(6)

The ranging device according to any one of (2) to (5), in which the light source information includes any one of a light emission time, light emission start time information, a modulation frequency, a light source wavelength, or a light emission pattern.

(7)

The ranging device according to any one of (1) to (6), in which the reception section receives a transmission signal transmitted from the separate device through wireless communication over a network.

(8)

The ranging device according to any one of (1) to (6), in which the reception section receives a GNSS signal as the transmission signal.

(9)

The ranging device according to any one of (1) to (8), further including:

a signal processing section that calculates a distance to the separate device on the basis of a detection result obtained by the ToF sensor.

(10)

The ranging device according to (9), further including:

a communication section that defines, as a first distance, the distance to the separate device and transmits the first distance to the separate device, and further, receives, as a second distance, a distance calculated by the separate device.

(11)

The ranging device according to (10), further including:

a distance calculation section that calculates a relative distance with respect to the separate device on the basis of the first distance and the second distance.

(12)

The ranging device according to any one of (1) to (11), in which the ToF sensor receives reflection light resulting from irradiation light applied from a plurality of the light sources and reflected by the object.

(13)

The ranging device according to (12), further including:

a signal processing section that calculates a distance to the object on the basis of a phase difference in irradiation light applied from a plurality of the light sources.

(14)

A ranging device including:

a communication section that transmits a transmission signal through wireless communication;

a reference clock generation section that generates, on the basis of a synchronization clock signal synchronized with the transmission signal, a reference clock signal to be used as a reference for light emission from a light source; and a light source that applies irradiation light on the basis of the reference clock signal.

(15)

A ranging device including:

a communication section that transmits and receives a transmission signal through wireless communication;

a reference clock generation section that generates, on the basis of a synchronization clock signal synchronized with the transmission signal, a reference clock signal to be used as a reference for light emission from a light source;

a light source that applies irradiation light on the basis of the reference clock signal; and a ToF sensor that receives, on the basis of the reference clock signal, reflection light resulting from irradiation light applied from a separate device and reflected by an object.

(16)

A light reception method for a ranging device, the method including:

by the ranging device, generating, by executing a synchronization process on a transmission signal transmitted from a separate device through wireless communication, a signal synchronized with a synchronization clock signal of the separate device;

generating, on the basis of the synchronization clock signal, a reference clock signal to be used as a reference for light emission from a light source; and receiving, on the basis of the reference clock signal, reflection light resulting from irradiation light applied from the light source and reflected by an object.

REFERENCE SIGNS LIST

1: Ranging system
2: Light source
3: Ranging unit
11: Ranging system
21 (21', 21A to 21E): Ranging device
23: Network
41: Clock source
42: Communication module
44: Reference clock generation section
45 Operation mode setting section
47: Laser emission section
48 Light source information acquisition section
49: Memory
50: Time synchronization section
51: Timing control section
52: ToF sensor
53: Signal processing section
61 Synchronization clock generation section
62: Signal transmission/reception section
81: GNSS reception section
82: Time information setting section
101 (101A, 101B): Drone
122: Position/posture calculation section
123: Communication section
124: Inter-light-source distance calculation section
141: Depth image generation section
142: External modulated light source detection section

The invention claimed is:

1. A ranging device comprising:

a memory storing a program;

at least one processor configured to execute the program to perform operations comprising:

generating, by executing a synchronization process on a transmission signal transmitted from a separate device through wireless communication, a signal synchronized with a synchronization clock signal of the separate device, generating, on a basis of the synchronization clock signal, a reference clock signal to be used as a reference for light emission from a light source, and receiving, through the wireless communication, light source information regarding irradiation light applied from the light source;

a time of flight (ToF) sensor that receives, on a basis of the reference clock signal, reflection light resulting from irradiation light applied from the light source and reflected by an object, wherein the light source is one of a plurality of light sources, the plurality of light sources are respectively separately located from each other, and the ToF sensor receives reflection light resulting from irradiation light applied from the plurality of light sources and reflected by the object; and calculating a distance to the object on a basis of a phase difference in irradiation light applied from the plurality of light sources.

2. The ranging device according to claim 1, wherein the light source information includes calibration data regarding the light source.

3. The ranging device according to claim 1, wherein the light source information includes an operation mode.

4. The ranging device according to claim 3, wherein the operation mode includes information indicating any one of a time division mode, a modulation frequency mode, or a light emission pattern mode.

5. The ranging device according to claim 1, wherein the light source information includes any one of a light emission time, light emission start time information, a modulation frequency, a light source wavelength, or a light emission pattern.

6. The ranging device according to claim 1, wherein the operations further comprise:

receiving a transmission signal transmitted from the separate device through wireless communication over a network.

7. The ranging device according to claim 1, wherein the operations further comprise:

receiving a GNSS signal as the transmission signal.

8. The ranging device according to claim 1, wherein the operations further comprise:

calculating a distance to the separate device on a basis of a detection result obtained by the ToF sensor.

9. The ranging device according to claim 8, wherein the operations further comprise:

defining, as a first distance, the distance to the separate device and transmits the first distance to the separate device, and receiving, as a second distance, a distance calculated by the separate device.

10. The ranging device according to claim 9, wherein the operations further comprise:

calculating a relative distance with respect to the separate device on a basis of the first distance and the second distance.

11. A light reception method for a ranging device, the method comprising:

by the ranging device, generating, by executing a synchronization process on a transmission signal transmitted from a separate device through wireless communication, a signal synchronized with a synchronization clock signal of the separate device;

generating, on a basis of the synchronization clock signal, a reference clock signal to be used as a reference for light emission from a light source;

receiving, through the wireless communication, light source information regarding irradiation light applied from the light source; and receiving, by a time of flight (ToF) sensor, on a basis of the reference clock signal, reflection light resulting from irradiation light applied from the light source and reflected by an object, wherein the light source is one of a plurality of light sources, the plurality of light sources are respectively separately located from each other, and the ToF sensor receives reflection light resulting from irradiation light applied from the plurality of light sources and reflected by the object; and calculating a distance to the object on a basis of a phase difference in irradiation light applied from the plurality of light sources.

12. A non-transitory computer readable medium storing a program for controlling a ranging device, the program being executable by at least one processor to perform operations comprising:

generating, by executing a synchronization process on a transmission signal transmitted from a separate device through wireless communication, a signal synchronized with a synchronization clock signal of the separate device;

generating, on a basis of the synchronization clock signal, a reference clock signal to be used as a reference for light emission from a light source;

receiving, through the wireless communication, light source information regarding irradiation light applied from the light source;

receiving, by a time of flight (ToF) sensor, on a basis of the reference clock signal, reflection light resulting from irradiation light applied from the light source and reflected by an object, wherein the light source is one of a plurality of light sources, the plurality of light sources are respectively separately located from each other, and the ToF sensor receives reflection light resulting from irradiation light applied from the plurality of light sources and reflected by the object; and calculating a distance to the object on a basis of a phase difference in irradiation light applied from the plurality of light sources.

13. The non-transitory computer readable medium according to claim 12, wherein the light source information includes calibration data regarding the light source.

14. The non-transitory computer readable medium according to claim 12, wherein the light source information includes an operation mode.

15. The non-transitory computer readable medium according to claim 14, wherein the operation mode includes information indicating any one of a time division mode, a modulation frequency mode, or a light emission pattern mode.

16. The non-transitory computer readable medium according to claim 12, wherein the light source information includes any one of a light emission time, light emission start time information, a modulation frequency, a light source wavelength, or a light emission pattern.

17. The non-transitory computer readable medium according to claim 12, wherein the operations further comprise:

receiving a transmission signal transmitted from the separate device through wireless communication over a network.

18. The non-transitory computer readable medium according to claim 12, wherein the operations further comprise:

receiving a GNSS signal as the transmission signal.

* * * * *